United States Patent [19]

Umebayashi

[11] Patent Number: 4,614,839
[45] Date of Patent: * Sep. 30, 1986

[54] ROAD-VEHICLE TELEPHONE APPARATUS

[75] Inventor: Kazuyuki Umebayashi, Tokyo, Japan

[73] Assignee: Aisin Seiki K.K., Aichi, Japan

[ * ] Notice: The portion of the term of this patent subsequent to Jun. 19, 2001 has been disclaimed.

[21] Appl. No.: 523,299

[22] Filed: Aug. 12, 1983

[30] Foreign Application Priority Data

Aug. 19, 1982 [JP] Japan ................. 57-143733
Aug. 20, 1982 [JP] Japan ................. 57-145308
Aug. 27, 1982 [JP] Japan ................. 57-148699

[51] Int. Cl.$^4$ ............................. H04M 1/23
[52] U.S. Cl. ................. 179/2 E; 179/90 AN
[58] Field of Search ............ 179/2 E-2 EC, 179/90 AN, 84 VF, 90 BD, 18 B, 18 DA; 455/89, 90, 602, 603, 606–608, 613, 614; 381/86, 43–45, 51–53

[56] References Cited

U.S. PATENT DOCUMENTS

| 4,255,618 | 3/1981 | Danner et al. | 381/77 X |
| 4,307,206 | 12/1981 | Messina | 179/84 VF X |
| 4,427,848 | 1/1984 | Tsakanikas | 179/84 VF X |
| 4,455,454 | 6/1984 | Umebayashi | 179/2 E |
| 4,456,903 | 6/1984 | Kishi et al. | 455/602 X |

FOREIGN PATENT DOCUMENTS 2844559 4/1980 Fed. Rep. of Germany .... 179/90 B

OTHER PUBLICATIONS

*Popular Electronics,* "New Telephone Devices Take Pain Out of Dialing", W. Salm, Feb. 1980, pp. 45–51.

*Primary Examiner*—Robert G. Lev
*Attorney, Agent, or Firm*—Sughrue, Mion, Zinn, Macpeak & Seas

[57] ABSTRACT

Dial keys and other keys for a telephone set are provided on an operation board mounted on a steering wheel so as to make an answer-back in accordance with dial operation. The answer-back is effected in terms of numeral values, dial codes or the name of the other party corresponding to each dial code in accordance with operation of the corresponding numeral keys. If a confirmation key is not operated within a predetermined time after an answer-back of the name of the other party, the shortened dial code is updated to another adjacent value to repeat such answer-back sequentially. The name of the other party is issued from a non-volatile memory which stores therein voices of the user.

20 Claims, 41 Drawing Figures

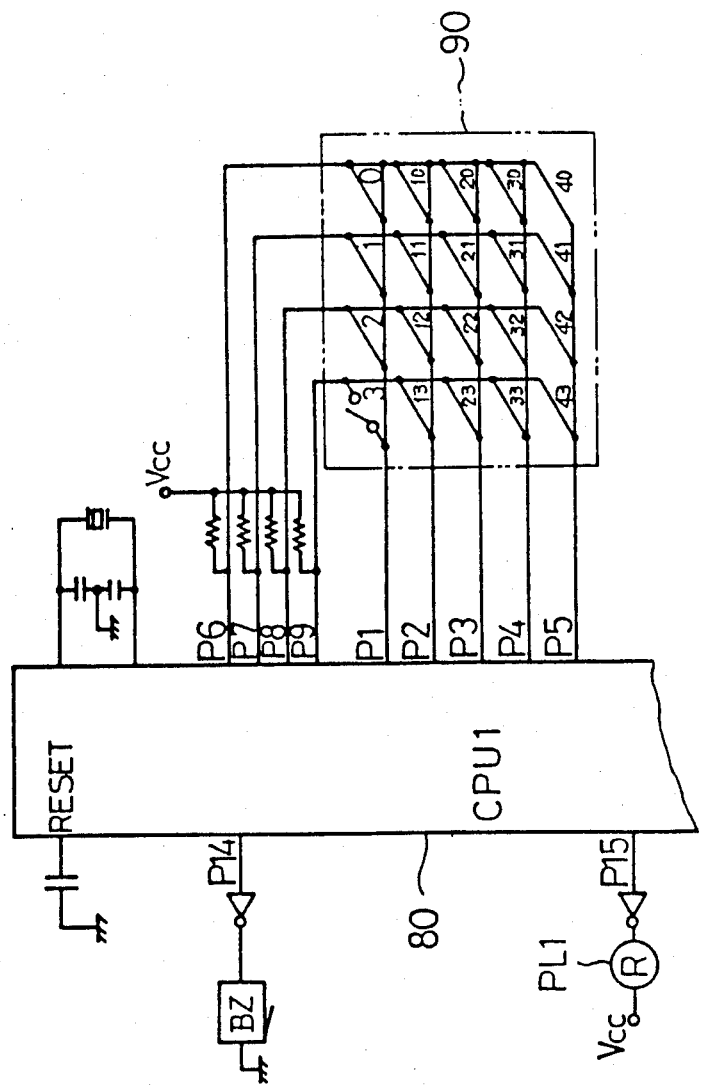

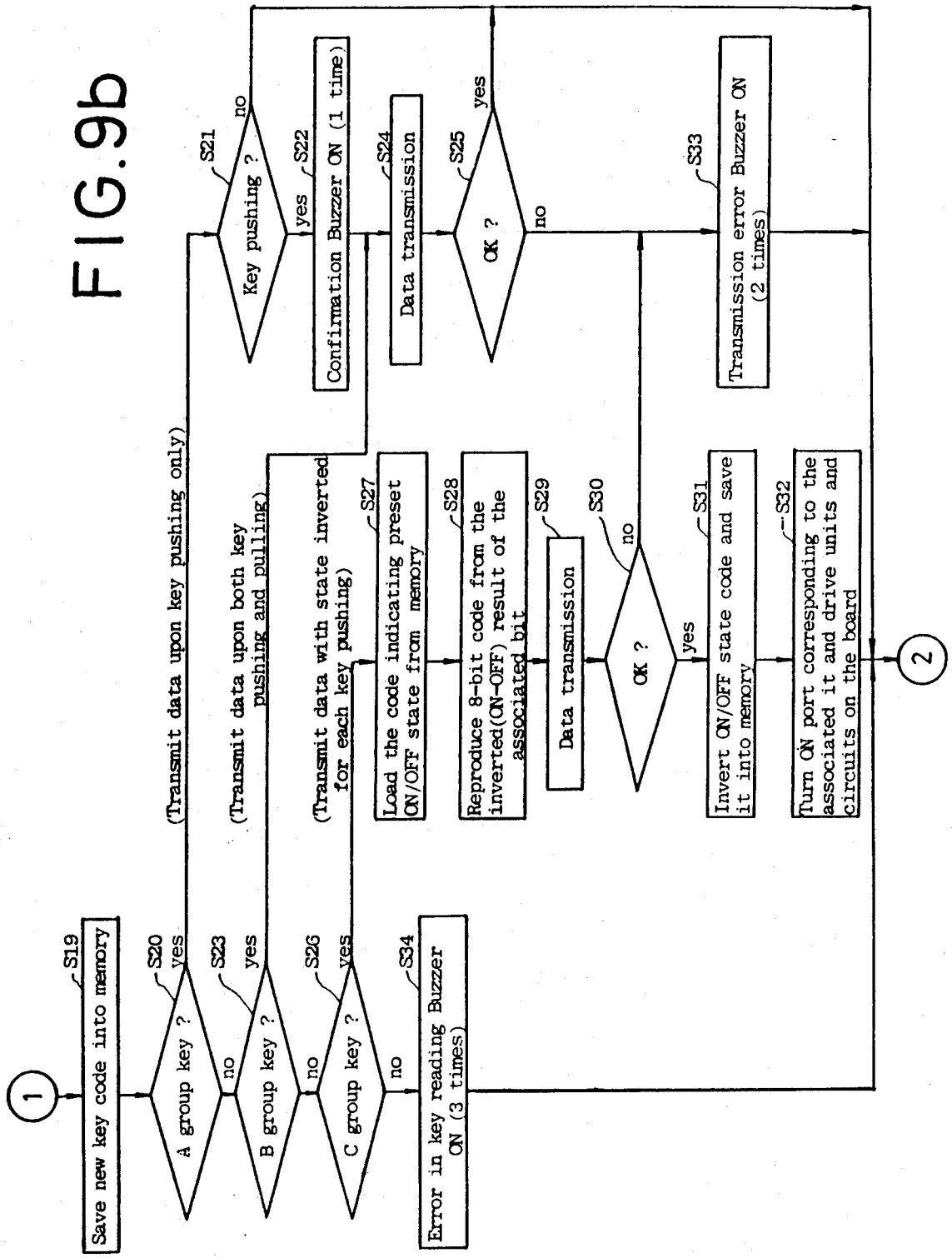

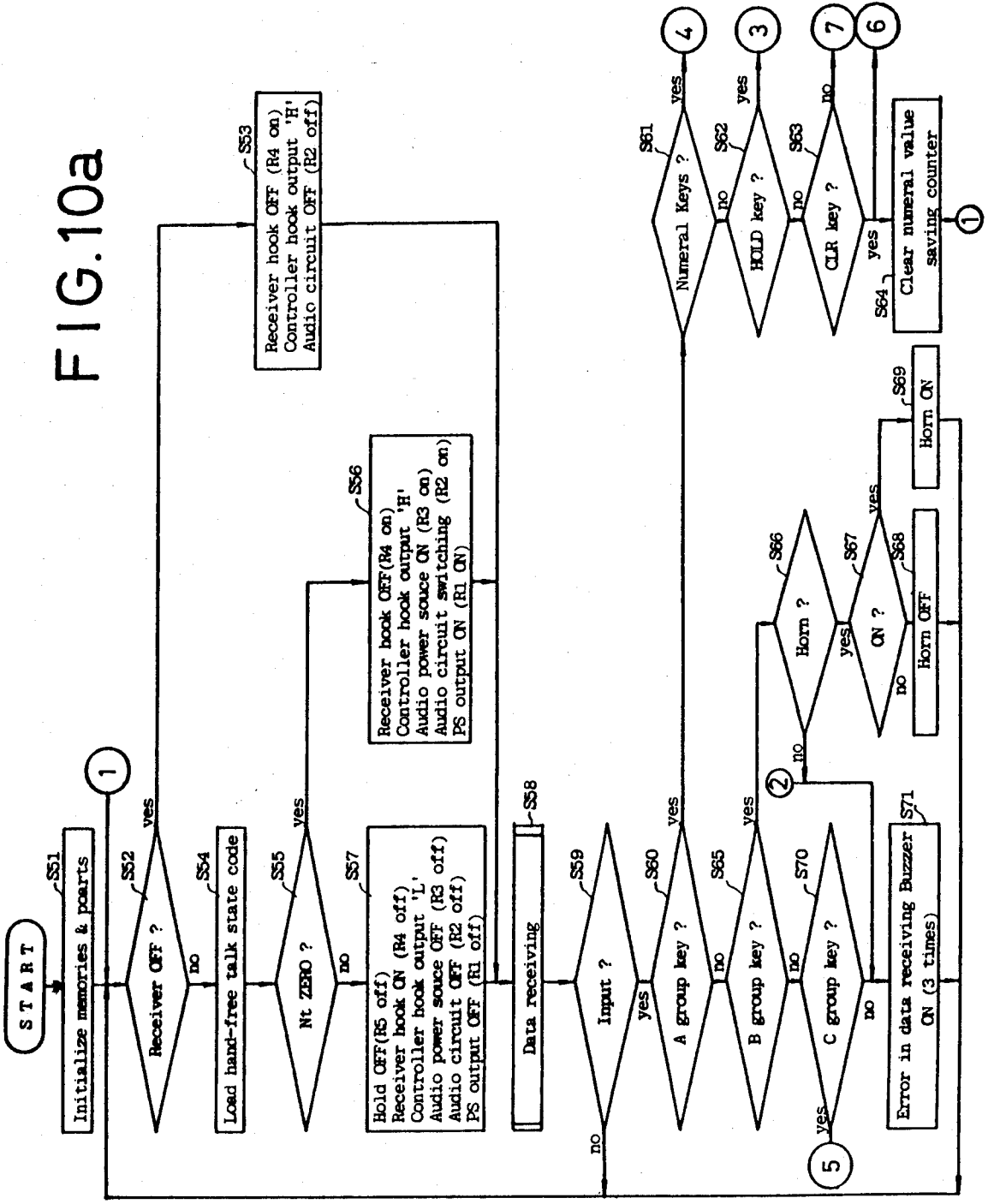

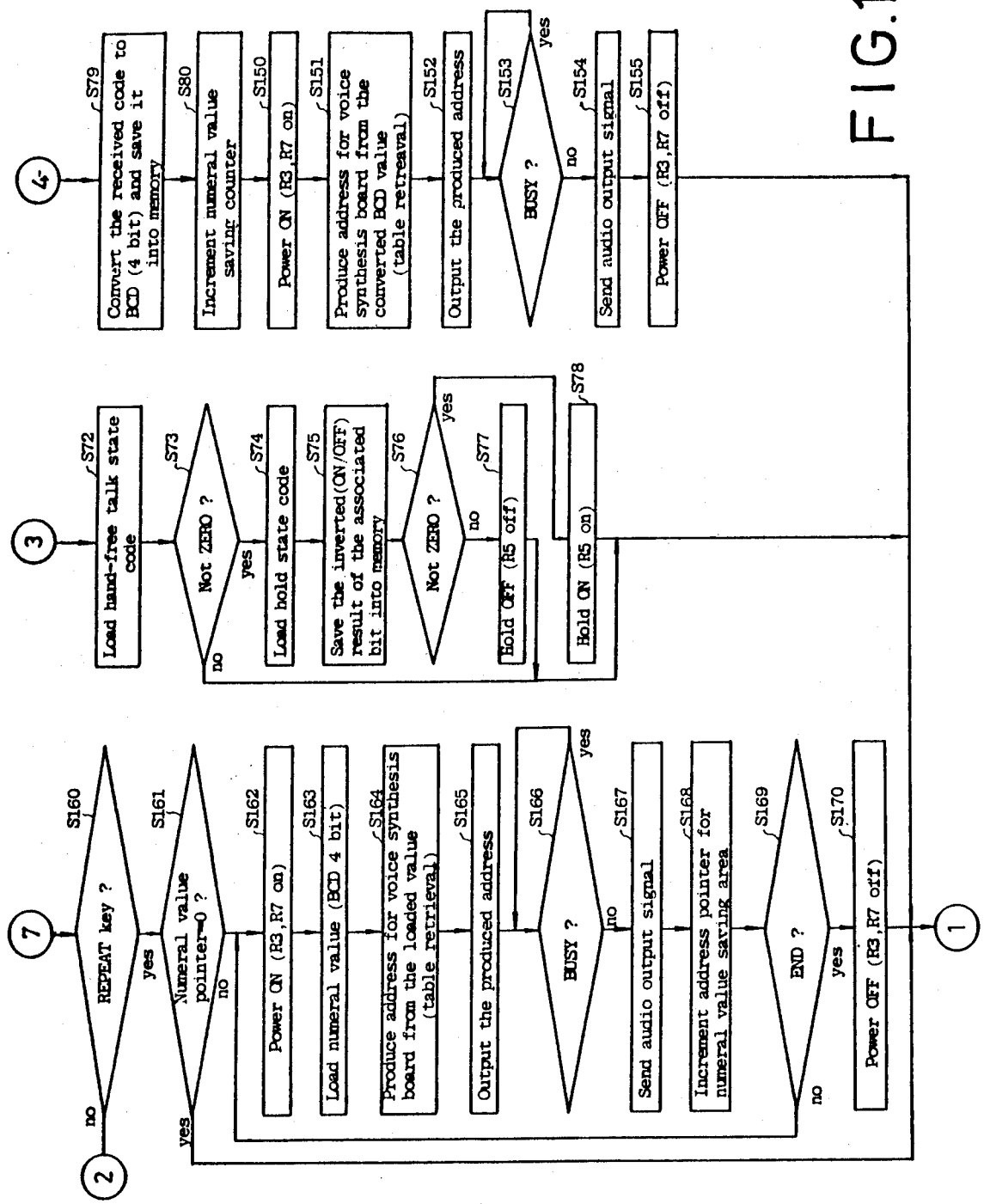

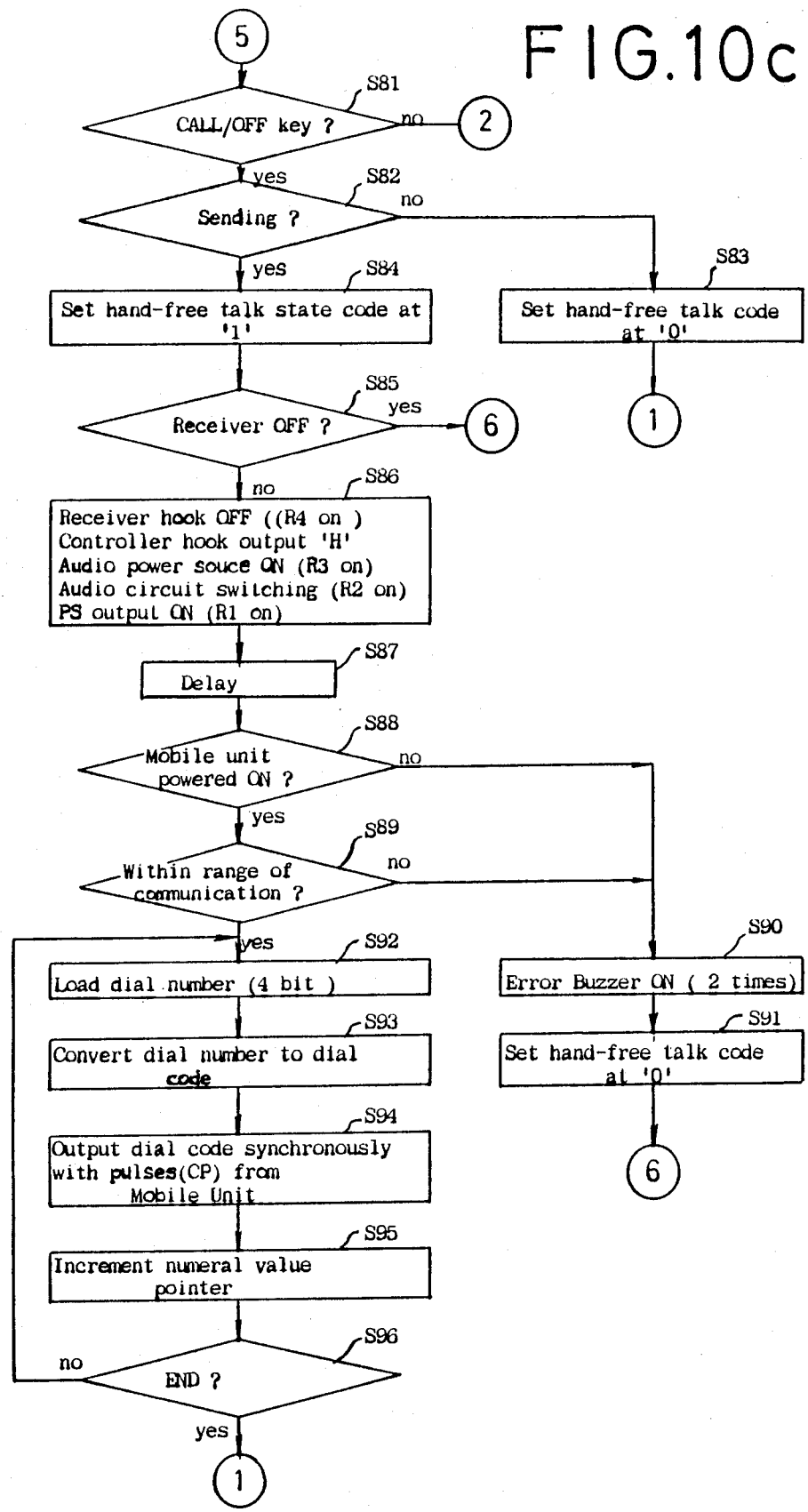

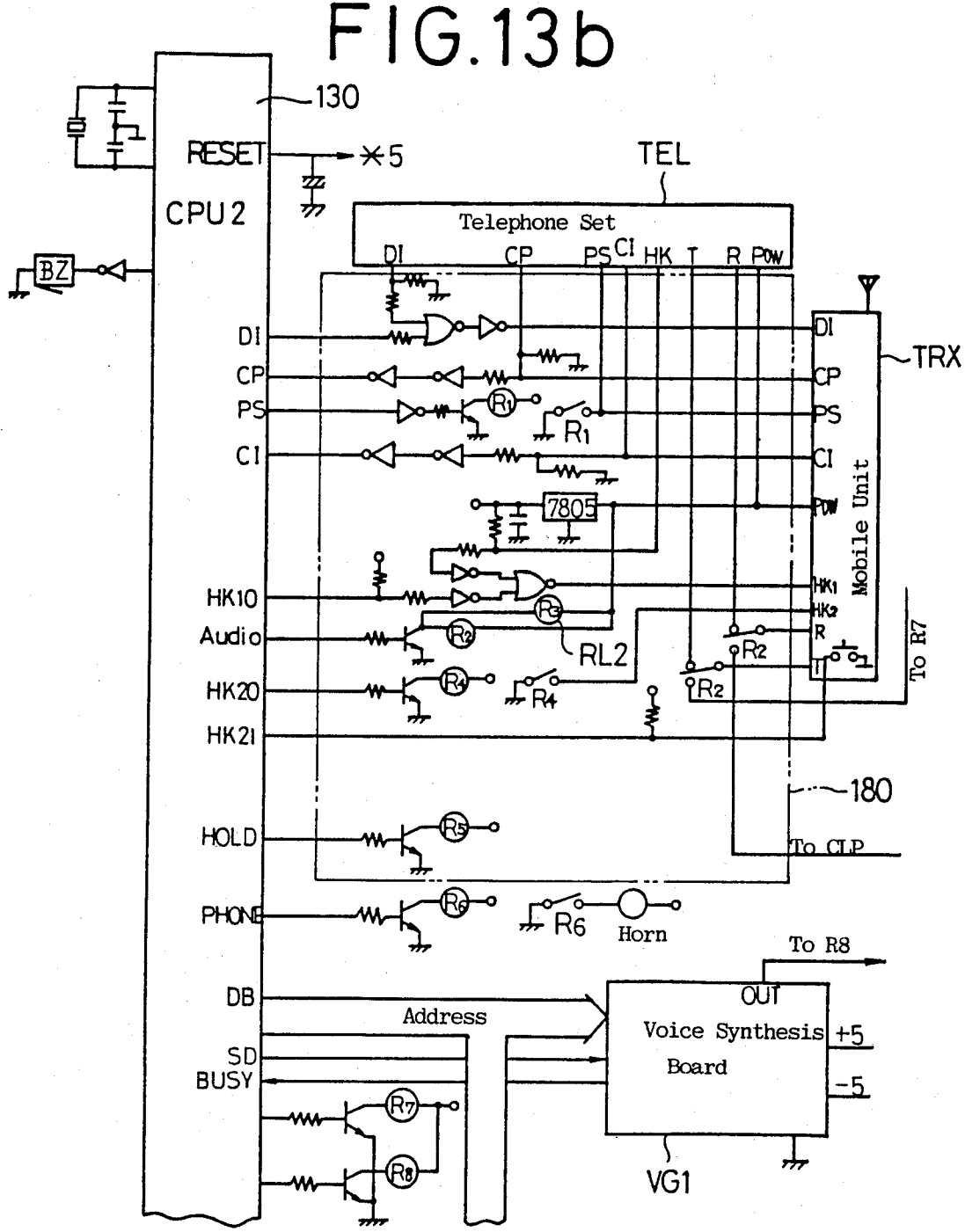

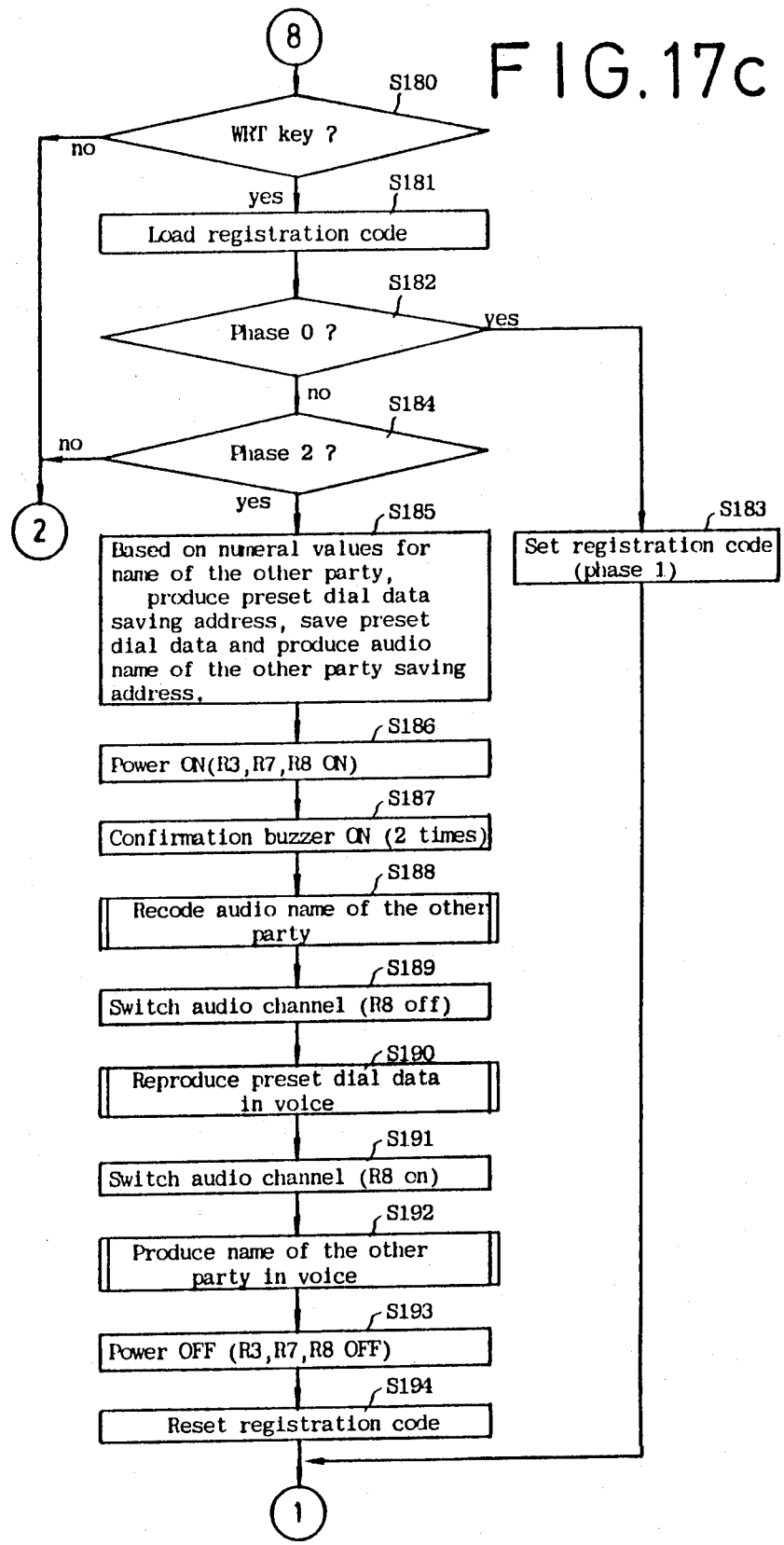

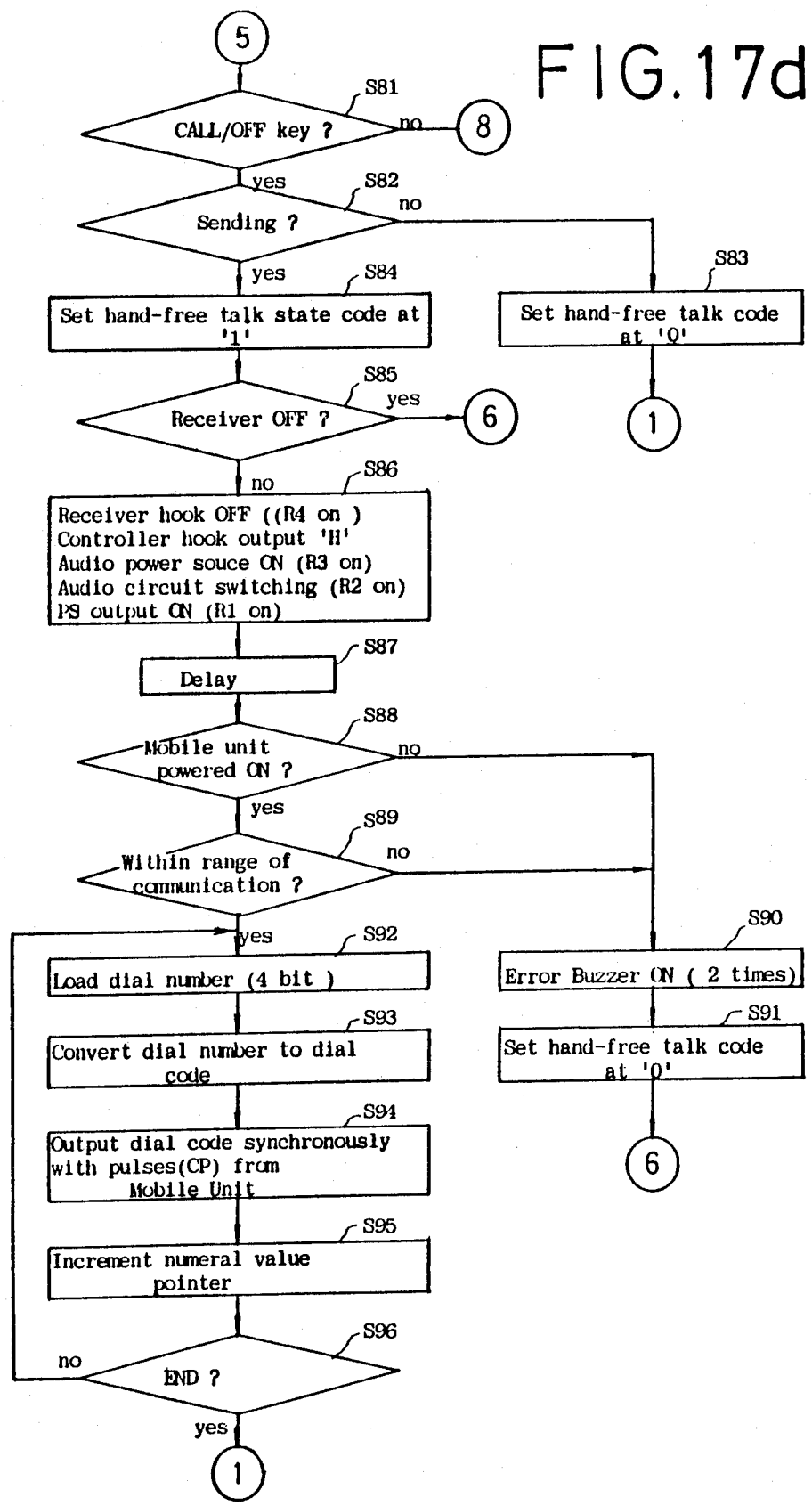

ROAD-VEHICLE TELEPHONE APPARATUS

BACKGROUND OF THE INVENTION

This invention relates to a telephone apparatus equipped on vehicles, and more particularly to a road-vehicle telephone apparatus which is dialed using dial keys provided on a steering operation board in the vicinity of a steering wheel.

In vehicles, since a steering wheel is positioned nearest to the driver, particularly to his hand, an operation board equipped with a variety of keys, switches or the like adapted to control and command road-vehicle apparatus and units is preferably mounted at the central portion of the steering wheel for the purpose of improving operability.

However, a steering mechanism adapted to transmit a rotational movement of the wheel to a steering shaft is complicated, so that it is difficult to wire signal cables for connecting the operation board mounted at the center of the steering wheel (i.e., steering operation board) to a stationary control unit. To facilitate such wiring work, pipes for wiring and/or slip rings for connection must be additionally mounted to the steering mechanism and arranged in a manner without intervening operation thereof. Further, since the mounting space allocated to the steering mechanism is limited, such wiring work will be quite difficult.

In view of the above, the applicant of this patent application has previously proposed an improved system (U.S. patent application Ser. No. 399,582 filed on July 19, 1982) wherein the operation board is connected to the stationary control unit using slip rings and brushes, thereby to transmit electric power and signals through such connection lines. With this, it is possible to supply the operation board with source power and to transmit much information generated therefrom without the need to use numerous lines.

In case a telephone apparatus is equipped on the vehicle, a telephone set is usually placed at the center between the driver's seat and the passenger seat in order that the persons sitting in the passenger seat or the rear seats can also use the telephone set. But when the driver attempts to operate a dial of the telephone set, he must have a receiver by one hand and operate the dial by the other hand, so that he is practically unable to dial a call while driving the vehicle. Therefore, the applicant of this patent application has previously proposed a dial signal transmission system for a steering operation board (U.S. patent application Ser. No. 440,660 filed on Nov. 10, 1982) wherein dial keys are provided on the steering operation board in the vicinity of the steering wheel to make it easy for the driver to dial a number. Even with such an improved system, however, the driver has to operate the dial keys by touch during driving of the vehicle and hence the dial keys are liable to be operated by mistake. Since such erroneous operation of the dial keys may trouble the called subscriber, it is preferred to dial a number only when the vehicle is stopped.

SUMMARY OF THE INVENTION

The first object of this invention is to provide a road-vehicle telephone apparatus such that the driver can operate dial keys safely and correctly even while driving the vehicle. The second object is to provide a road-vehicle telephone apparatus with which the content of a dial operation can be confirmed. A third object is to provide a road-vehicle telephone apparatus which permits dialing a call without picking up a receiver.

To achieve the above objects, this invention is featured in that dial keys are arranged on an operation board mounted to a steering wheel, a dial code in accordance with keying operation is applied to the telephone apparatus, and there is provided a voice synthesis device adapted to issue the numeral values in voice corresponding to the keys pushed in accordance with keying operation. In other words, an answer-back to confirm dial operation made on the telephone set is carried out in the form of a voice. With this, the driver can know which key has been operated, without keeping his eye upon the dial keys, so that the dial keys of the telephone apparatus may be operated safely and correctly even during driving of the vehicle.

When the driver operates the dial keys of the telephone set on the vehicle, he has to interrupt the operation and start to drive the car with both hands if there occurs any change in traffic condition (e.g., change of a signal) in the middle of such dial operation. In such case, most drivers may foreget how far the dial keys have been operated. According to a preferred embodiment of this invention, therefore, upon operation of a repeat key or the lapse of time longer than a predetermined period from keying operation, all of the numbers having been dialed up to the then time are issued to inform the driver of the content of dial operation.

Also, when using a road-vehicle telephone set, a transmitter is usually held by one hand during a telephone call. It is, however, dangerous that the driver drives the car one-handed. Thus, according to a perferred embodiment of this invention, an acoustic-electric conversion means such as a microphone is disposed on the steering operation board and an audio signal generated from the acoustic-electric conversion means is applied to the telephone apparatus. With this, it becomes possible for the driver to talk over the telephone without a need of using his hand.

In case an answer-back is made in the form of numbers, one must request a repeat of the numbers from the beginning once again if he fails to catch even one digit number due to, for example, noise from the outside, and it is troublesome to confirm all digits of a long telephone number. According to one preferred embodiment of this invention, therefore, there is provided the other party data storing means adapted to store the data in accordance with dial codes, i.e., the data on the other party, and such other party data is answered back in voice in accordance with the dial codes given by dial operation. Stated differently, if the name of the other party is previously stored in the form of audio data, such name of the other party is issued in voice upon dial operation. With this, the party to be called can be confirmed by the ear and this confirmation is made very readily and surely, so that it is not necessary for the driver to visually confirm the dial keys to be operated.

When the driver operates the dial keys of the road-vehicle telephone, a shortened dial code requiring a lesser number of key operations is usually utilized because the driver has to operate the dial keys by touch. According to a preferred embodiment of this invention, therefore, both registration of the other party data and output of the audio data are effected for shortened dial codes. The other party data is different individually depending on users and, hence, a memory of large capacity is necessary to store therein the other party data which will meet the demands of all users. Further, in case the audio data is stored with a character being as unit, connection between the adjacent characters of the announced voice becomes unnatural, so that it is hard to catch the voice readily. According to a preferred embodiment of this invention, therefore, the means for storing the other party data is formed of a non-volatile read-write memory and there is provided an acoustic-electric converter such as a microphone, thereby permitting registration of the voice of each user in the memory as individual data.

In addition, when the dial keys are operated by mistake, it is troublesome to press the keys from the beginning once again for the dial operation to phone the correct called party. According to a preferred embodiment of this invention, therefore, the generated dial code is updated to a next different one, if a dial code confirming operation allowing to the start of calling is not made within a predetermined period of time or if there occurs key operation making the generated dial code void. More specifically, when it is arranged by way of example such that the name of the other party is answered back in accordance with the dial code, the name of the other party is issued in voice upon the given keying operation in accordance with the dial code generated by such operation. Now, if the voiced name of the other party is different from the desired one, the generated dial code is updated to, for example, the adjacent shortened dial code and then the name of another called party is issued in voice in accordance with the updated dial code, in case the driver does not press the confirmation key. When he pressed the confirmation key at the time the voiced name of the other party coincides with the desired one, a call is effected with the dial code corresponding to the name of the other party voiced just prior to such keying operation. In this case, the dial code can be formed of either a shortened dial code or a usual dial code consisting of both the station number and the user number. But it is preferred to use a shortened dial code, because it has less variety of codes.

BRIEF DESCRIPTION OF THE DRAWINGS

FIG. 2b is a front view showing the steering wheel in FIG. 2a;

FIGS. 3a, 3b and 3c are block diagrams showing an electric circuit of the apparatus shown in FIG. 1 which is incorporated in an operation board on the steering wheel;

FIGS. 9a and 9b are flow charts showing the operation of a microcomputer 80 in FIG. 1;

FIGS. 10a, 10b and 10c are flow charts showing the operation of a microcomputer 130 in FIG. 1;

FIGS. 13a, 13b, 13c, 13d and 13e are block diagrams showing an electric circuit of the apparatus shown in FIG. 12 incorporated on the vehicle body side;

FIGS. 17a, 17b, 17c, 17d and 17e are flow charts showing the operation of a microcomputer equipped on the vehicle body side in the embodiment of FIG. 16.

DESCRIPTION OF PREFERRED EMBODIMENTS

Figure 1:
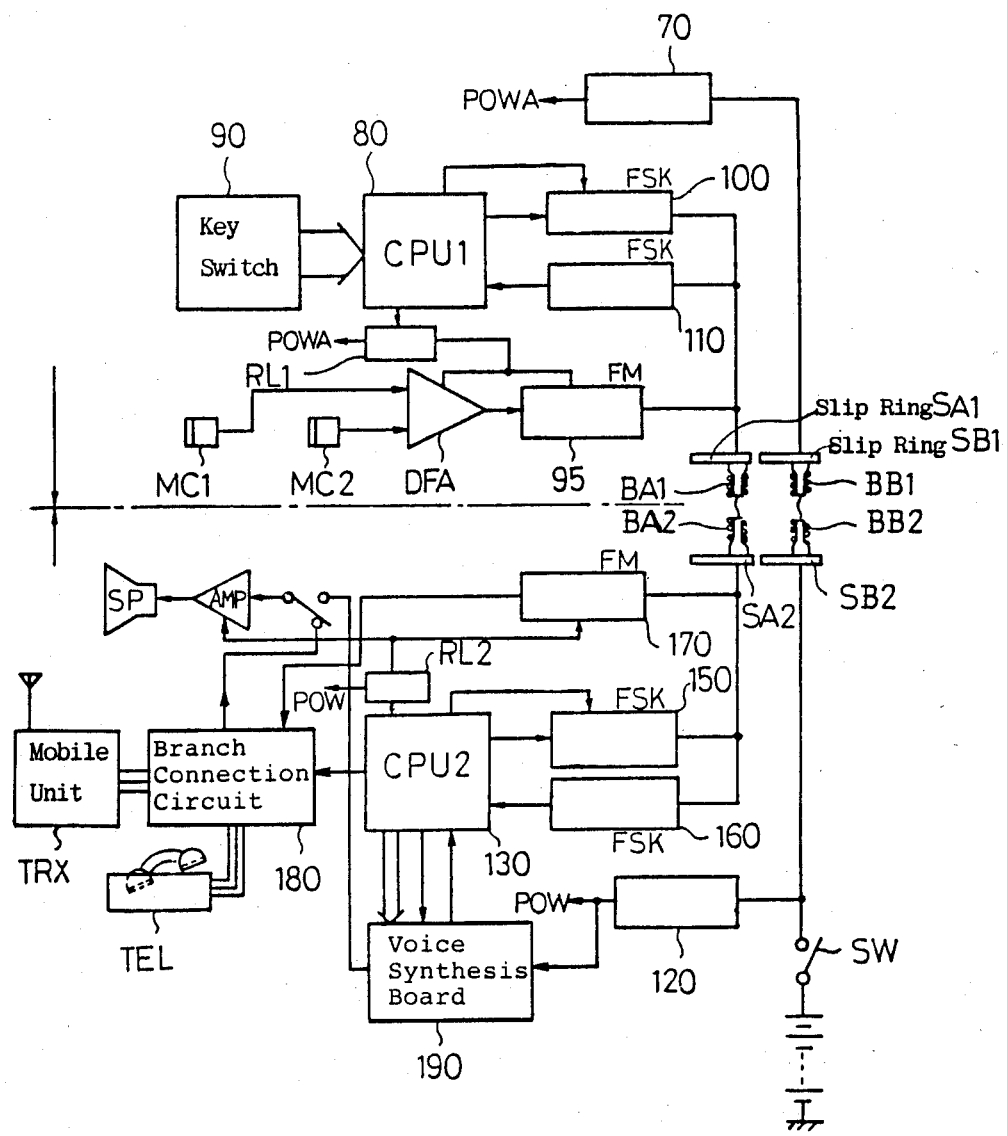
FIG. 1 is a schematic block diagram showing a signal transmission apparatus for a steering operation board according to one embodiment of this invention.

FIG. 1 shows a schmematic construction of one embodiment of this invention. The description will be made by referring to FIG. 1. In the illustrated embodiment, an operation board on a steering wheel comprises a constant-voltage power supply unit 70, a microcomputer unit 80 serving as a sending control device, a key switch 90, a second modulation circuit or FM modulation circuit 95, a first modulation circuit or FSK modulation circuit 100, an FSK demodulation circuit 110, an acoustic-electric conversion means such as microphones MC1 and MC2, a differential amplifier DFA, and a relay RL1.

These microphones MC1 and MC2 are disposed with a certain spacing therebetween directing in the same direction (i.e., toward the mouth of the driver), and their output terminals are respectively connected to the different input terminals of the differential amplifier DFA. With this, the DFA amplifies the difference level between a sound applied to the microphone MC1 and a sound applied to the microphone MC2, so that there can be obtained a larger output signal for sounds propagating in the arranging direction of MC1 and MC2, i.e., from the driver. In other words, noises coming from both sides are offset with each other, whereby only the signal corresponding to voices of the driver is largely amplified and then applied to the FM modulation circuit 95.

Also in the illustrated embodiment, a control unit on the vehicle body side comprises a constant-voltage power supply unit 120, a microcomputer unit 130, an FSK modulation circuit 150, an FSK demodulation circuit 160, an FM demodulation circuit 170, a telephone set TEL, a mobile unit or radio communication unit TRX for the telephone set, a connection switching means or branch connecting circuit 180, a voice synthesis board 190, an amplifier AMP, a speaker SP, a relay RL2, etc.

An output terminal of the FSK modulation circuit 100, an input terminal of the FSK demodulation circuit 110 and an output terminal of the FM modulation circuit 95 are connected to a slip ring SA1, while an output terminal of the FSK modulation circuit 150, an input terminal of the FSK demodulation circuit 160 and an input terminal of the FM demodulation circuit 170 are connected to a slip ring SA2. These slip rings SA1 and SA2 are electrically connected to each other through brushes BA1 and BA2. To a transmission path constituting another system, i.e., slip rings SB1, SB2 and brushes BB1, BB2, a load-vehicle battery is connected through an ignition key switch SW.

Figure 2A:
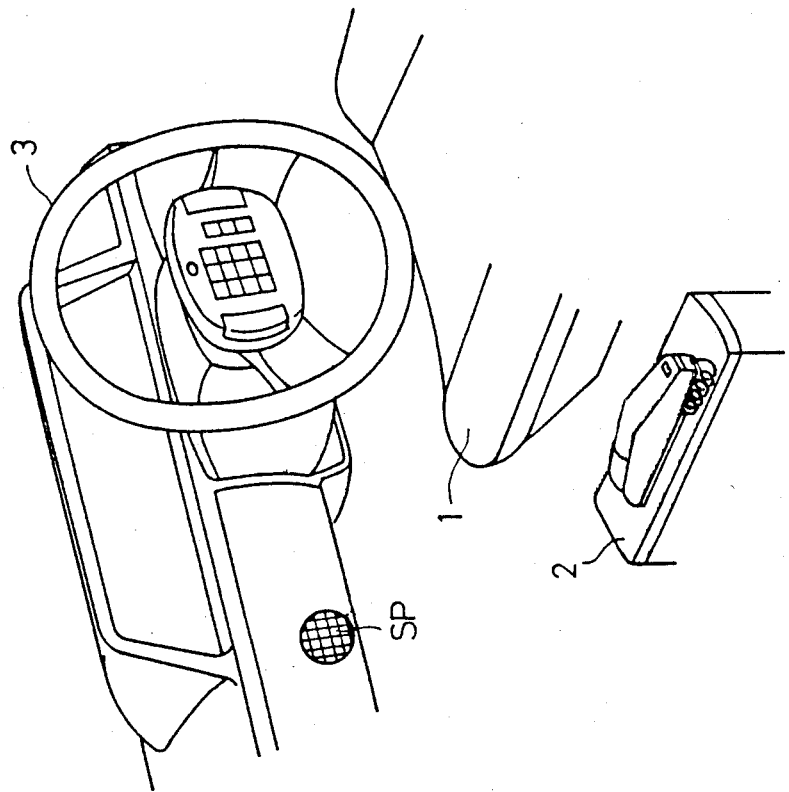
FIG. 2a is a perspective view showing the surroundings of a steering wheel and a driver's seat of an automotive vehicle equipped with the apparatus shown in FIG. 1.
Figure 2B:
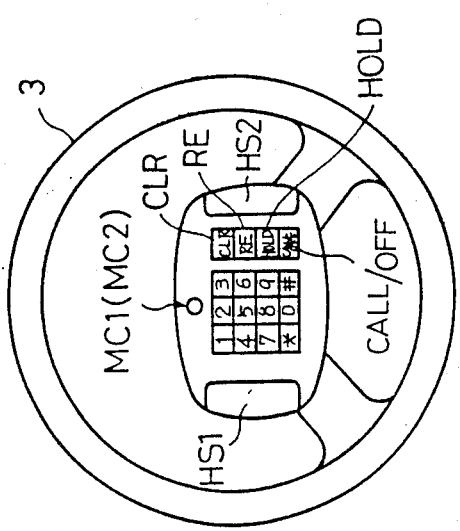

FIG. 2a shows the surroundings of the driver's seat of the vehicle equipped with the apparatus shown in FIG. 1, and FIG. 2b shows an external appearance of the steering wheel. Referring now to FIGS. 2a and 2b, the telephone set 2 (TEL) is placed to the left of the driver's seat 1 and the speaker SP is disposed in front of the seat 1. An operation panel is mounted at the center of a steering wheel 3 in a floating relation with respect to the same. The operation panel includes twelve key switches 0 to 9, * and # identical to those on a push button type phone, horn switches HS1 and HS2 on both sides, a clear key CLR, a repeat key RE, a hold key HOLD, a call-offkey CALL/OFF and the microphone MC1. The microphone MC2 is disposed behind the microphone MC1.

Figure 2C:
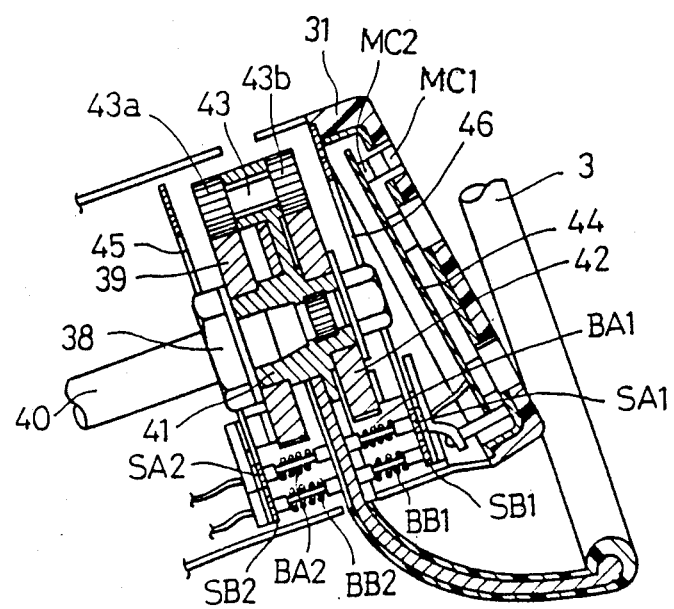
FIG. 2c is a side sectional view showing a mounting structure of the steering wheel and the associated parts in FIG. 1.

FIG. 2c shows a mounting structure of the steering wheel 3 and the steering operation board onto the vehicle body. Referring now to FIG. 2c, a support 38 is fixed to a support 41 and it rotatably supports a gear 39. The gear 39 is fixed to the vehicle body. The support 41 is rigidly mounted to a steering shaft 40, while the steering wheel 3 is coupled to the support 41. The support 41 rotatably supports both gears 39 and 42. The reference numeral 43 designates a connecting member which is provided at both ends thereof with gears 43a and 43b having an equal number of teeth and which is rotatably supported by the support 41. The gears 43a and 43b are in mesh with the gears 39 and 42, respectively. A printed circuit board 44 and an operation panel 31 of the steering operation board are rigidly attached to the gear 42. The gears 39 and 42 have the same number of teeth.

With such structure, the operation panel 31 and the associated parts are not rotated upon turning operation of the steering wheel 3. In this embodiment, when the steering wheel 3 is turned, the support 41 and the steering shaft 40 are rotated to effect the steering operation. But, since the gears 43a and 43b as well as the gears 39 and 42 have the same number of teeth, respectively, a relative movement amount (angle) between the support 41 and the gear 39 becomes equal to that between the support 41 and the gear 42, those relative movements being caused by an arcuate movement of the connecting member 43 along with rotation of the support 41. Therefore, the gear 42 is not rotated relative to the gear 39, also because the latter is fixed in position. As a result, the operation panel 31 will not be rotated, even when the steering wheel 3 is turned.

The reference numeral 45 designates a disc rigidly attached to the vehicle body, which disc includes on its surface facing the steering wheel 3 a pair of metal slip rings SA2 and SB2 in concentric relation. The numeral 46 designates a disc rigidly attached to the steering operation board, which disc includes on its surface facing the gear 42 a pair of metal slip rings SA1 and SB1 in concentric relation. The brushes BA1, BA2, BB1 and BB2 are secured to the steering wheel 3 at positions opposite to the slip rings SA1, SA2, SB1 and SB2, respectively.

One pair of brushes BA1 and BA2 as well as the other pair of brushes BB1 and BB2 are electrically connected to each other, respectively. Each of the brushes BA1, BA2, BB1 and BB2 comes into contact with the corresponding slip ring by virtue of a resilient force of a compressed coil spring. The slip rings SA1 and SB1 are connected to the steering operation board through lead wires. The steering shaft 40 is grounded and electrically connected to an earth line of the steering operation board.

Figure 3B:
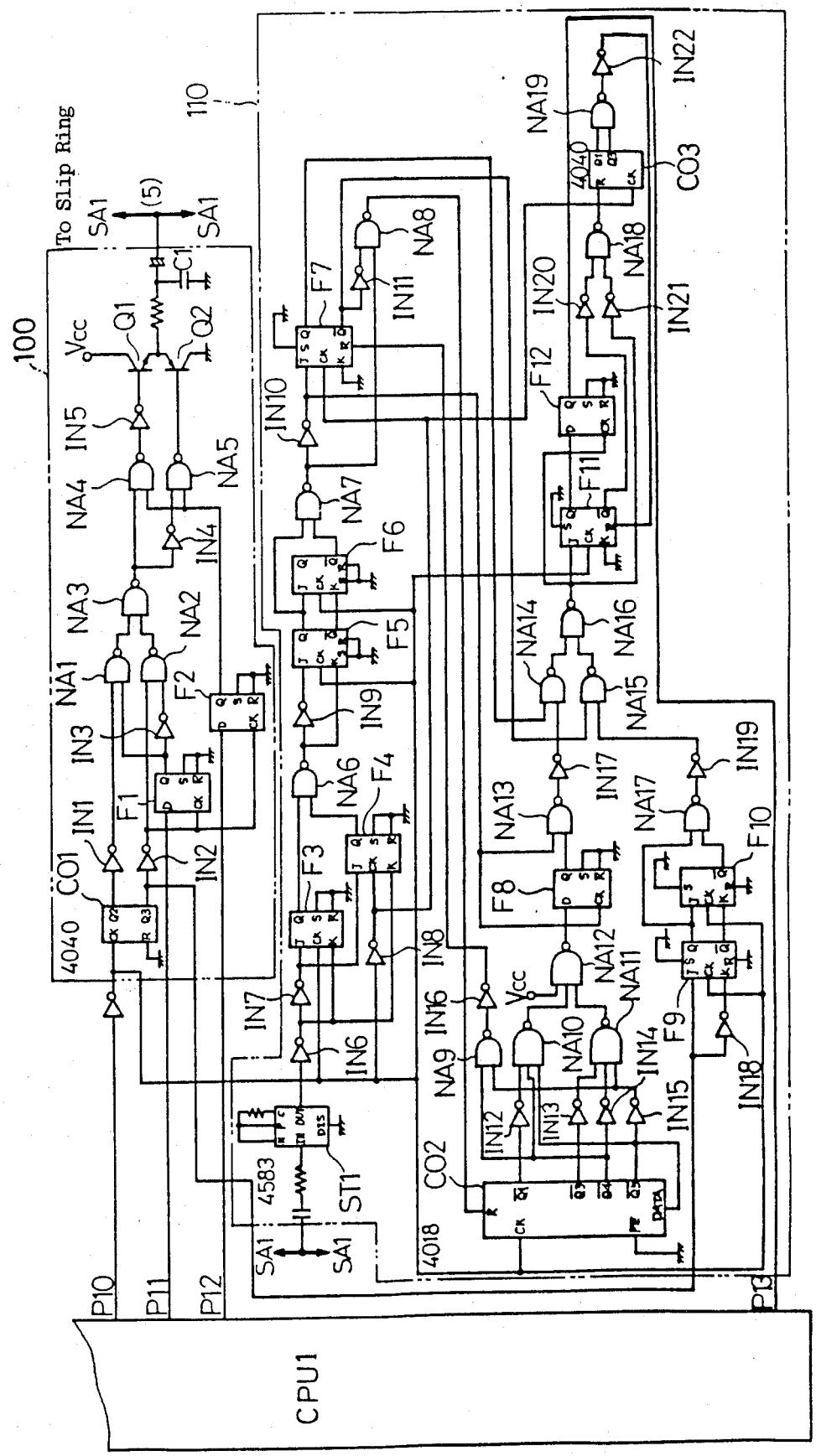
Figure 3C:
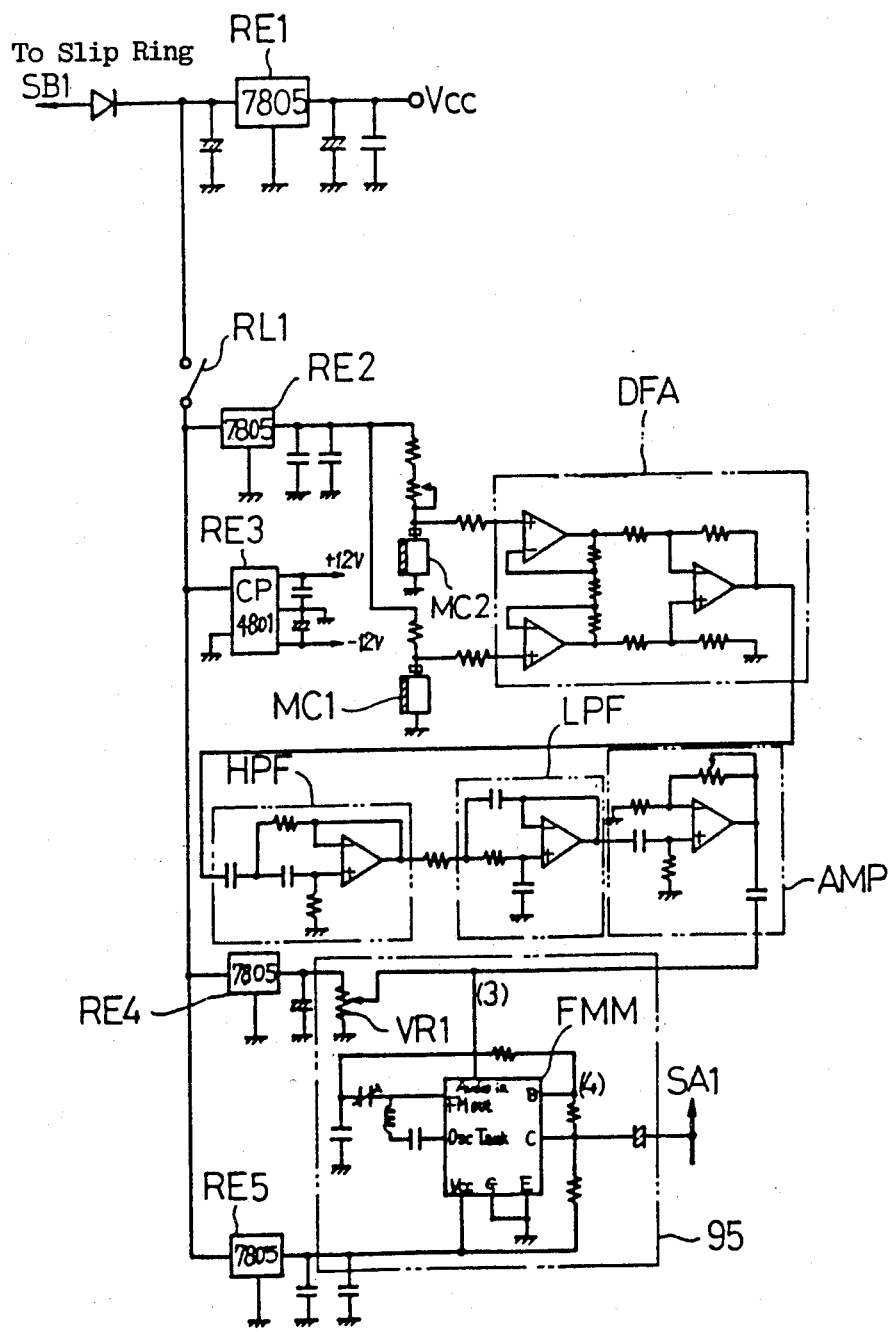

FIGS. 3a, 3b and 3c show the construction of an electric circuit incorporated in the steering operation board. The description will be first made by referring to FIGS. 3a and 3b. The key switch 90 comprises a number of switches which are connected to five output ports P1 through P5 and four input ports P6 through P9 of the microcomputer 80 in the form of a matrix. The contact of each of these switches is opened and closed upon when the corresponding key on the operation panel 31 is operated.

The FSK modulation circuit 100 has its input terminals connected to three output ports P10, P11 and P12 of the microcomputer 80, and has its output terminal connected to the slip ring SA1. As seen from the figures, the FSK modulation circuit 100 comprises a counter CO1, D-type Flip-Flops F1, F2, NAND gates NA1 through NA5, inverters IN1 through IN5, trahsistors Q1, Q2, etc.

The FSK demodulation circuit 110 has its input terminal connected to the slip ring SA1 and has its output terminal connected to an input port P13 of the microcomputer 80. As seen from the figures, the FSK demodulation circuit 110 comprises a Schmitt trigger ST1 (MC14583 made by Motorola Co.), a counter CO2 (MC14018 made by Motorola Co.), CO3, NAND gates NA6 through NA19, inverters IN6 through IN22, etc. From the standpoint of function, the FSK demodulation circuit 110 is composed of a waveform shaping/differentiation circuit comprising ST1, F3, F4, F5, F6, NA6, NA7, IN6 through IN10, etc., an external input priority circuit comprising F7, CO2, F8, NA8 through NA16 and IN11 through IN17, a reference signal generating circuit comprising F9, F10, NA17, IN18 and IN19, and a frequency discrimination circuit comprising F11, F12, CO3, NA18, NA19 and IN20 through IN22.

A buzzer BZ is connected to an output port P14 of the microcomputer 80 via an inverter, and the relay RL1 is connected to an output port P15 thereof via an inverter.

Referring now to FIG. 3c, the relay RL1 has one contact connected to a power source line leading from the slip ring SB1 and has the other contact connected to constant-voltage circuits RE2, RE3, RE4 and RE5. An output terminal of a power supply circuit comprising a 3-terminal constant-voltage circuit RE1 or the like and a capacitor is directly connected to the power source line of the electric circuit shown in FIG. 3a.

In this connection, the RE3 is formed of a switching type constant-voltage circuit (CP4801) and generates a stable voltage of ±12 V for operational amplifiers. The microphones MC1 and MC2 are connected to the differential amplifier DFA formed of an operational amplifier. An output terminal of the differential amplifier DFA is connected to a high-pass filter HPF formed of an operational amplifier. Then, an output terminal of the HPF is connected to a low-pass filter LPF formed of an operational amplifier. An output signal from the low-pass filter LPF is amplified by the amplifier AMP and then applied to an input terminal Audio-in of the FM modulator FMM through a capacitor.

To the input terminal Audio-in of the FMM is also applied the given DC bias voltage through a variable resistor VR1. The variable resistor VR1 is to set the center frequency of an FM modulation wave. The FM modulator FMM is formed of a single integrated circuit, and the FM modulation circuit 95 comprises the FMM and an electric coil, capacitors, resistors and so on which are connected to the corresponding terminals of the FMM. An output terminal C of the FM modulator FMM is connected to the slip ring SA1 through a capacitor.

Figure 4A:
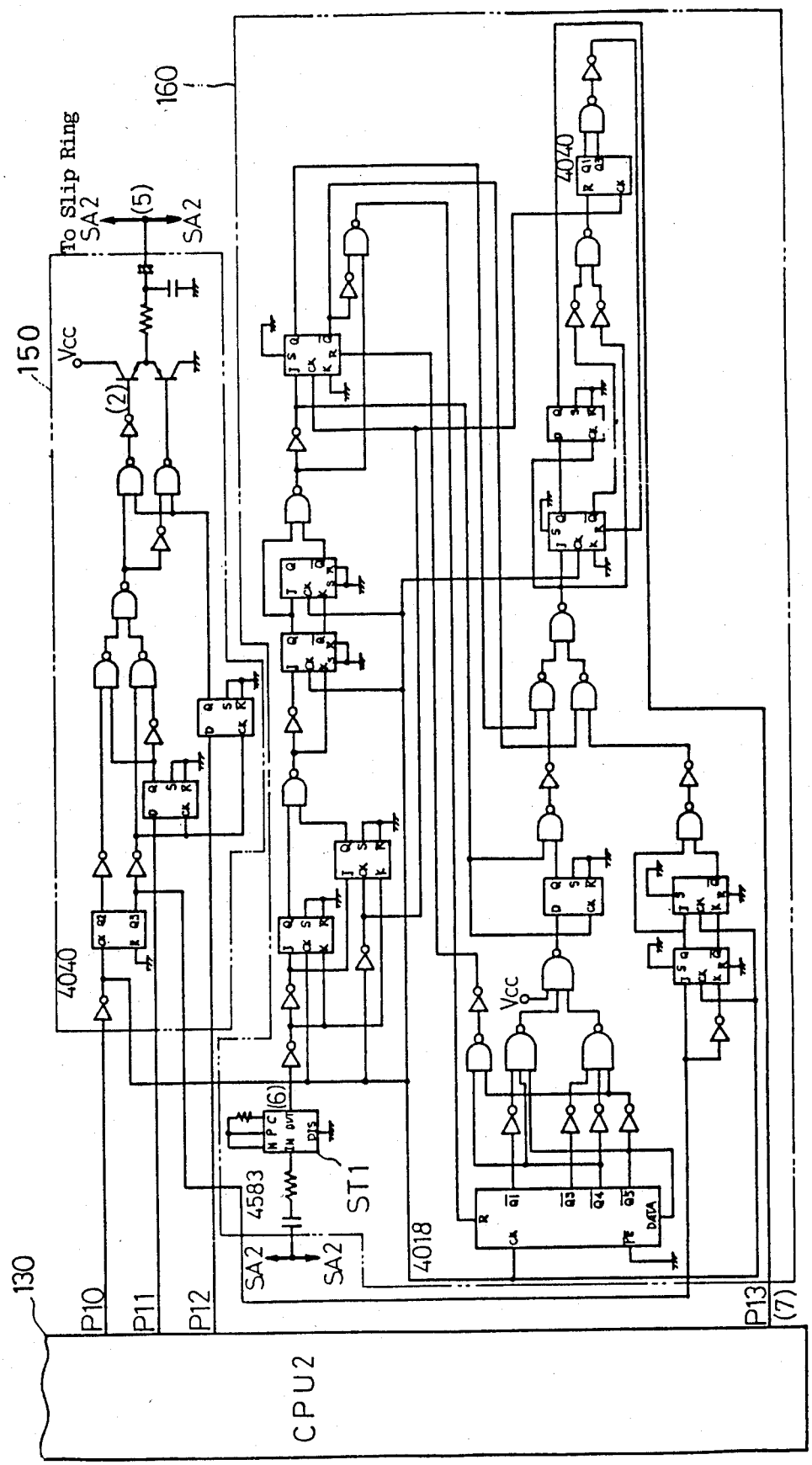
FIGS. 4a, 4b and 4c are block diagrams showing an electric circuit of the apparatus shown in FIG. 1 which is incorporated on the vehicle body side.
Figure 4B:
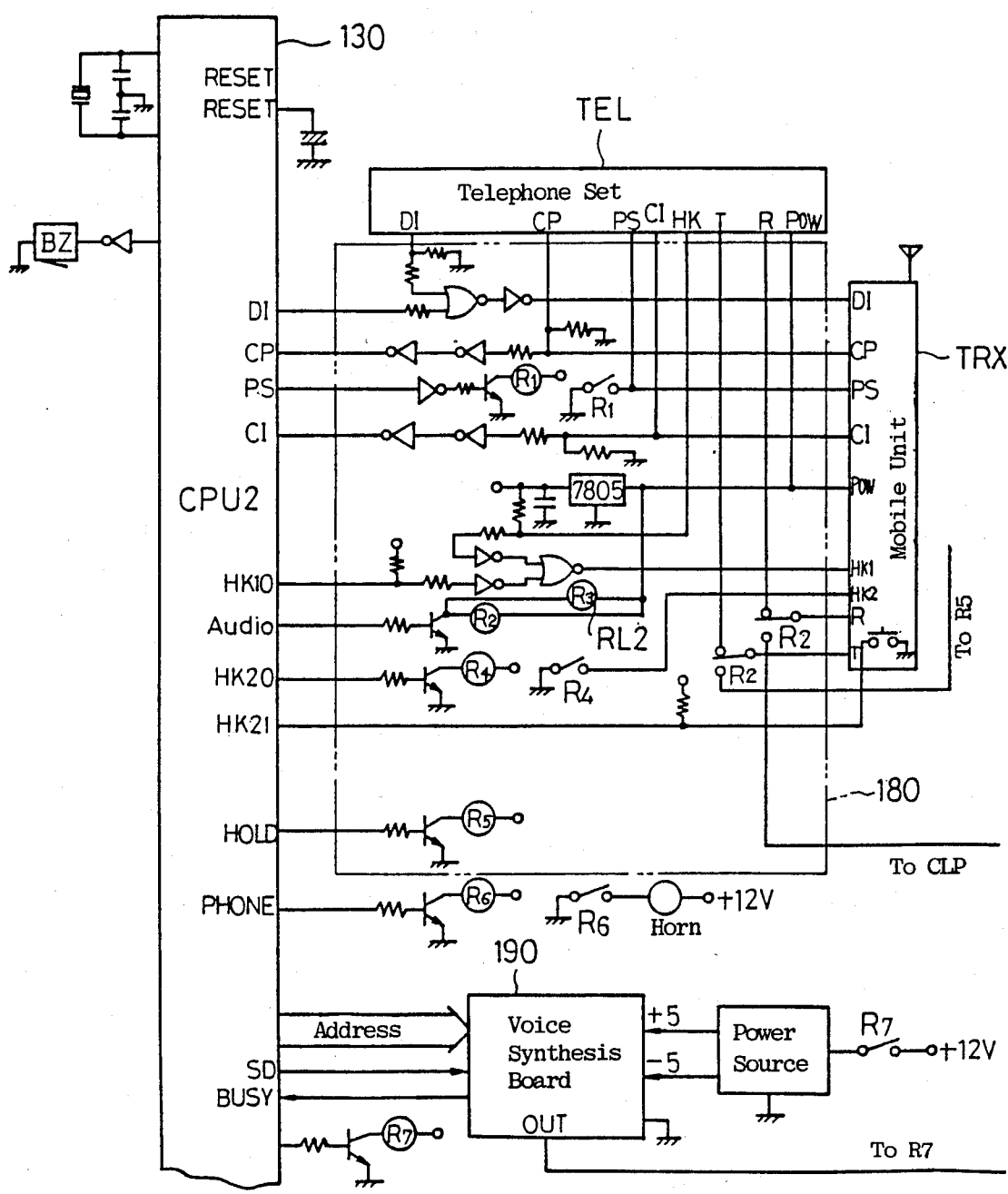
Figure 4C:
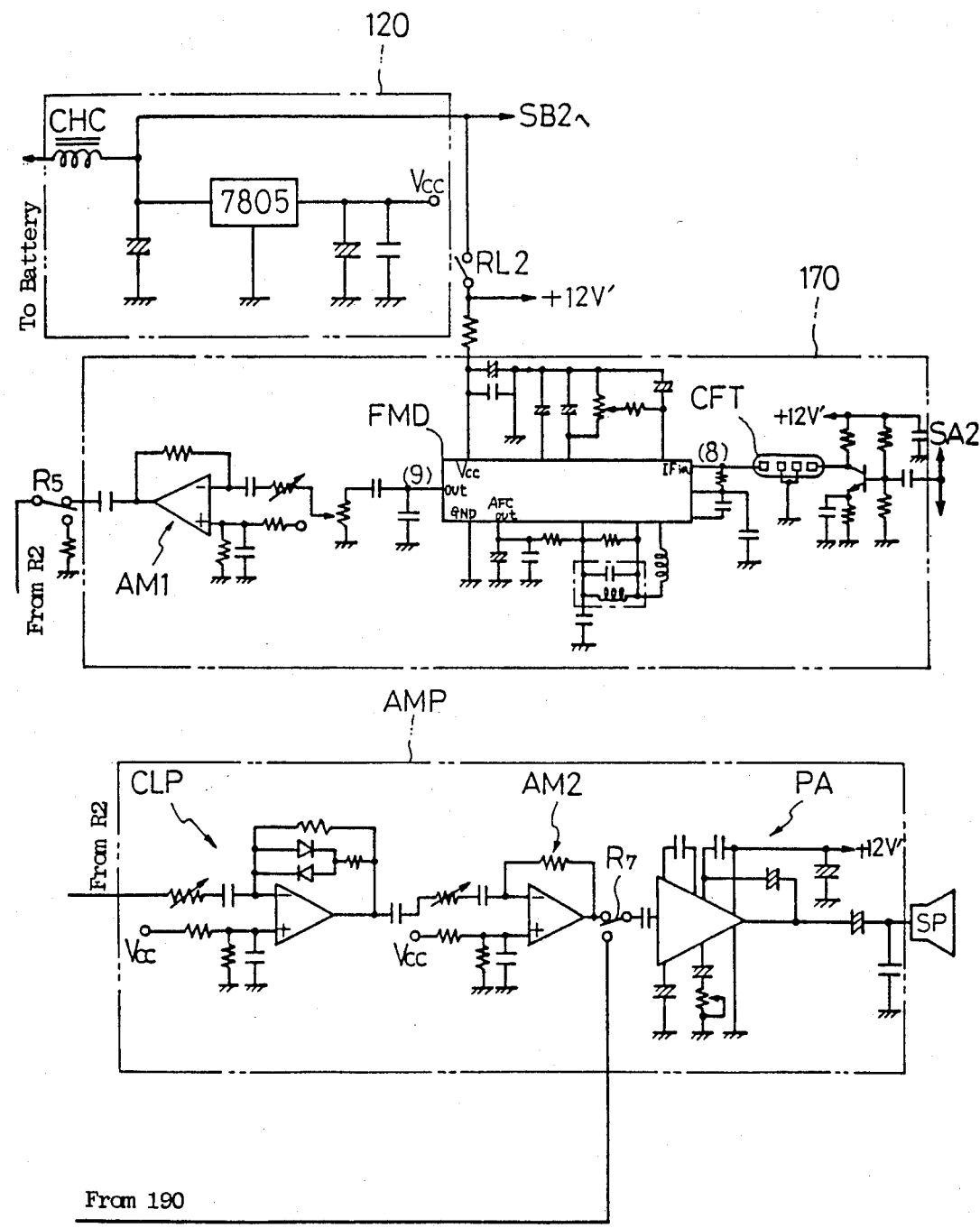

FIGS. 4a, 4b and 4c show an electric circuit incorporated in the control unit on the vehicle body side. Referring now to FIGS. 4a, 4b and 4c, the FSK modulation circuit 150 and the FSK demodulation circuit 160 are connected to the microcomputer 130. An output terminal of the FSK modulation circuit 150 and an input terminal of the FSK demodulation circuit 160 are connected to the slip ring SA2. The FSK modulation circuit 150 and the FSK demodulation circuit 160 are respectively constructed in the same manner as the FSK modulation circuit 100 and the FSK demodulation circuit 110.

The constant-voltage power supply circuit 120 includes an electric coil CHC for blocking the high frequency component, the CHC having one end connected to the load-vehicle battery through the ignition key switch SW and the other end connected to the slip ring SB2. An input terminal of the FM demodulation circuit 170 is connected to the slip ring SA2. As seen from the figures, the FM demodulation circuit 170 comprises a ceramic filter CFT, an integrated circuit FMD adapted to demodulate an FM signal, a low frequency amplifier AM1, etc. Power source for the FM demodulation circuit 170 is supplied thereto through a contact of the relay RL2. An output terminal of the FM demodulation circuit 170 is connected to a contact of a Relay R5.

The amplifier AMP connected to the speaker SP comprises a clipper CLP, a audio frequency amplifier AM2 and a power amplifier PA. The power amplifier PA is of an output transformerless (OTL) type. An input terminal of the amplifier AMP is connected to one contact of the relay R2. An output terminal of the low frequency amplifier AM2 is connected to an input terminal of the power amplifier PA through one contact of a relay R7. An address line, SD line and a BUSY line of the audio synthesis board 190 are connected to the microcomputer 130. An audio signal output terminal OUT of the audio synthesis board 190 is connected to the other contact of the relay R7.

To other ports of the microcomputer 130 are connected the branch connection circuit 180, a transistor for controlling a relay R6 adapted to drive the horn, a transistor for driving the relay R7, and an inverter for driving the buzzer BZ. To the branch connection circuit 180 are connected the telephone set TEL, mobile unit TRX, FM demodulation circuit 170 and the amplifier AMP.

In a block of the telephone set TEL, designated at DI is a dial code output terminal, CP is an output terminal for clock pulses of 1200 baud, PS is an input terminal for power source ON/OFF control, CI is an input terminal for a restriction command signal ("0": call enable, "1": call disable), HK is an output terminal for a hook signal (ON hook/OFF hook), T is an output terminal for the transmitted data signal, R is an input terminal for the received audio signal, and POW is a power source terminal. In the mobile unit TRX, designated at HK1 and HK2 are input terminals for the hook signal. The branch connection circuit 180 includes the relays R1, R2, R3 (RL2), R4 and R5 which are controlled by the microcomputer 130.

Operation of the FSK modulation circuit 100 (or 150) will be now described schematically by referring to FIG. 3a. To the input terminal of the FSK modulation circuit 100 is applied a pulse signal of constant period (T/4) from the output port P10 of the microcomputer 80. The counter CO1 divides the frequency of the applied pulse signal to generate a pulse signal of period T at its output terminal Q2 and a pulse signal of period 2T at its output terminal Q3. The pulse signal of period 2T is also applied to the later-described FSK demodulation circuit 110.

The output port P11 of the microcomputer 80 serves as an output terminal for the data to be transmitted. The Flip-Flop F1 sets at its output terminal Q a level in accordance with the data from the port P11 (data "1": high level H, data "0": low level L) in synchronous relation with rising of the pulse signal of period 2T applied to its clock input terminal CLK.

Therefore, with the data assuming "1", the output terminal Q of F1 becomes H, so that the pulse signal of period T from Q2 of CO1 appears at an output terminal of the NAND gate NA3 through the NAND gate NA1. With the data assuming "0", the output terminal Q of F1 becomes L, so that the pulse signal of period 2T from Q3 of CO1 appears at the output terminal of the NAND gate NA3 through the NAND gate NA2. The output port P12 of the microcomputer 80 issues a signal used in output enable/disable control for an FSK signal to the transmission path.

When the port P12 assumes a high level H, an output terminal Q of the Flip-Flop F2 becomes a high level H in synchronous relation with the pulse of period 2T issued from CO1. With this, the gates NA4 and NA5 are opened and the signal of period T or 2T from the output terminal of NA3 is applied to the transistors Q1 and Q2 through NA4, IN5 and IN4, NA5, respectively. Upon rising or falling of the signal thus applied, either one of the transistors Q1 and Q2 is turned ON thereby to charge and discharge a capacitor C1. Thus, positive and negative pulse-like signals are generated at the slip ring SA1 in accordance with rising and falling of the pulse signal. When the port P12 assumes a low level L, the output terminal Q of F2 turns to L and both gates NA4 and NA5 are closed, so that a low level L and a high level H are respectively applied to the transistors Q1 and Q2. In this state, both transistors Q1 and Q2 are turned OFF together and issue no signal to the slip ring SA1.

Figure 5A:
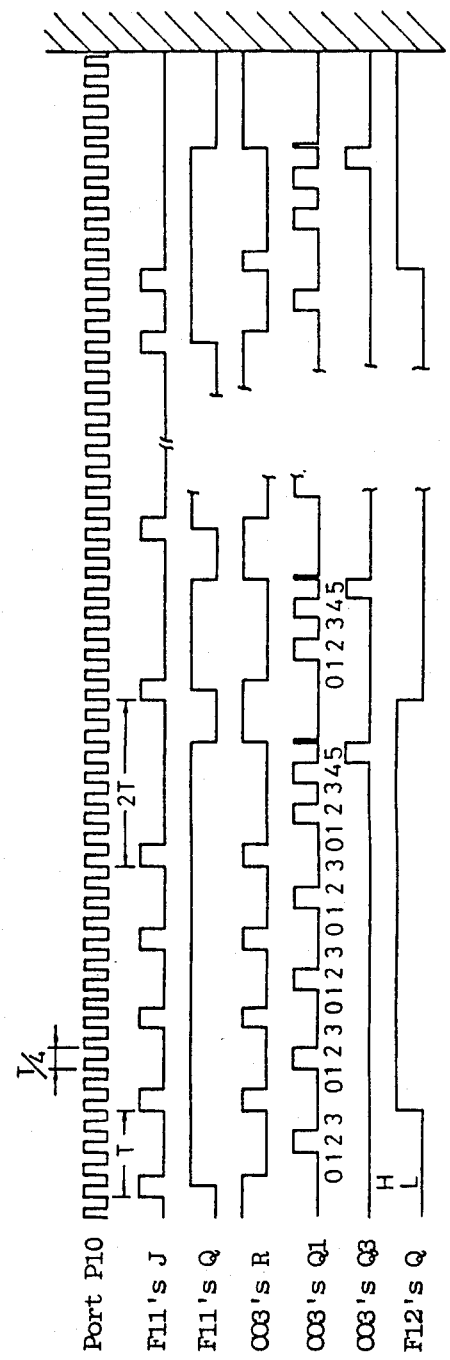
FIGS. 5a, 5b and 5c are timing charts showing the operation of FSK demodulation circuits 110 and 160 in FIG. 1.

FIG. 5a shows schematically timing of the FSK frequency discrimination circuit in FIGS. 3a and 4a. Operation of this circuit will now be described by referring to FIG. 5a.

To clock input terminals CK of the Flip-Flop F11 and the counter CO3 are applied clock pulses of period T/4 from the port P10 of the microcomputer at all times. An FSK signal from the outside is applied to a J input terminal of F11, a clock input terminal of the Flip-Flop F12 and other input terminals. In this embodiment, the FSK signal is arranged such that it has a period of T with the data assuming "1" (high level H) and has a period of 2T with the data assuming "0" (low level L). In the initial state, the counter CO3 is being reset.

When the J input terminal of F11 turns to a high level upon coming of the FSK signal, Q and $\overline{Q}$ output terminals of F11 are respectively set to H and L in synchronous relation with the clock pulses (T/4). With this, the counter CO3 is released from its reset state and it starts to count the clock pulses (T/4).

In case of the FSK signal of T period, the FSK signal turns to H at the time when the counter CO3 counts the numbers 0, 1, 2 and 3, and the counter CO3 is reset once again. At the same time, the Flip-Flop F12 sets a level present at its input terminal D, i.e., H, to its output terminal Q, so that a high level H in accordance with the data "1" is issued at the output terminal of F12 as a demodulated output signal.

In case of the FSK signal of period 2T, the counter CO3 counts the numbers 0, 1, 2, 3, 4 and 5 and at the count 5 it applies a reset signal to the Flip-Flop F11 through the NAND gate NA19 and the inverter IN22. Upon this, F11 is reset to assume L at its output terminal Q and H at its output terminal $\overline{Q}$. As a result, the counter CO3 is also reset. Subsequently, when the FSK signal turns to a high level H, the Flip-Flop 12 sets an output level L of F11 at its output terminal Q, i.e., demodulation output terminal. Thus, with the predetermined FSK signal being applied, this frequency discrimination circuit serves to demodulate the applied signal and then outputs the data.

However, if a noise or so similar to the FSK signal of period T should be applied to the frequency discrimination circuit, an output terminal Q of the Flip-Flop F5 is set to H in response to the noise and a high level H is output as a demodulated output signal. And in case no signal and noise is applied thereto after that, the Q output terminal of the Flip-Flop F12 will be held in the state being set to a high level H.

If such state continues over a predetermined time, the microcomputer 80 (or 130) connected to the demodulation circuit judges that the data has come and then starts to read the data by mistake. To prevent such erroneous operation, according to this embodiment there are provided a reference signal generating circuit and an external input priority circuit.

Figure 5B:
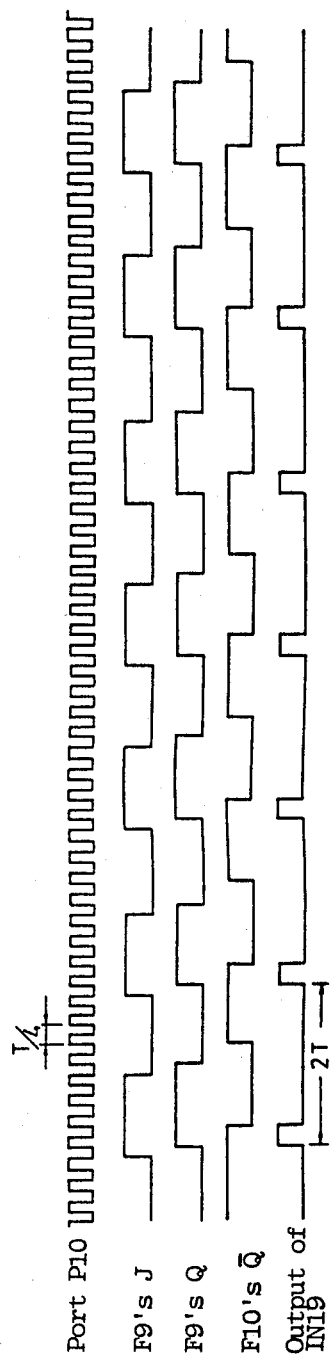

FIG. 5b shows timing in operation of the reference signal generating circuit. Referring now to FIG. 5b, clock pulses of T/4 period from the port P10 are applied to the clock input terminals CK of the Flip-Flops F9 and F10 and, at the same time, the frequency is divided by eight in the counter CO1 of the FSK modulation circuit 100 (or 150) to attain a pulse signal of 2T period which is applied to a J input terminal of F9, etc.

The Flip-Flops F9 and F10, etc. operates as a differentiation circuit, and a reference signal of pulse width (period of high level H) T/4 and period 2T is obtained at the output terminal of the inverter IN19. Since this reference signal has a period of 2T, the frequency discrimination circuit judges the reference signal as the data of "0" when applied to the frequency discrimination circuit, so that the demodulation output circuit is set to a low level L.

Figure 5C:
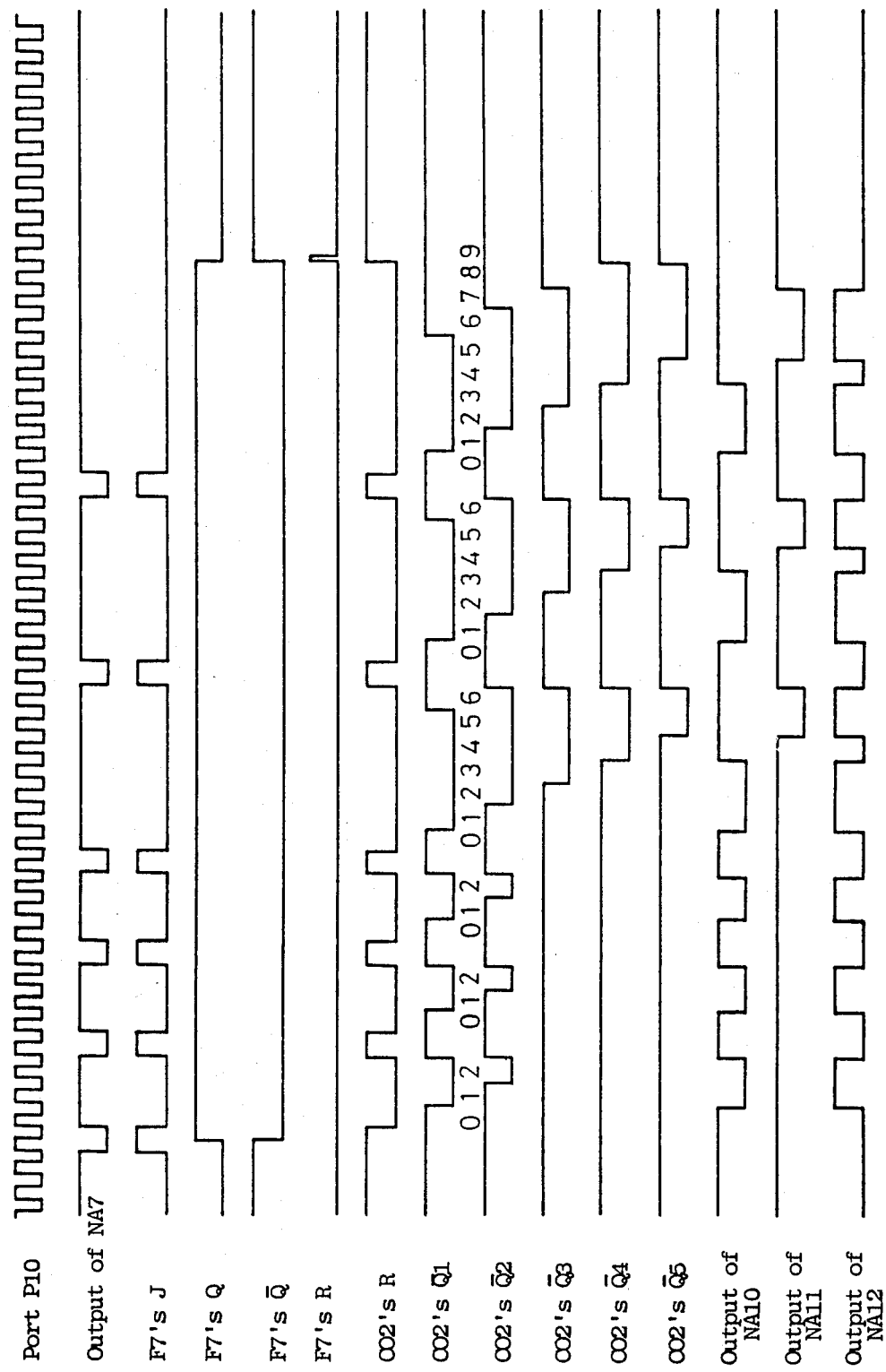

FIG. 5c shows timing in operation of the external input priority circuit. The description will be now made by referring to FIG. 5c. The FSK signal from the waveform-shaping/differentiation circuit (i.e., signal output from NA7) is applied to the inverter IN10 and the NAND gate. An output signal of the inverter IN10 is applied to the Flip-Flops F7, F8 and the NAND gate NA13, while an output signal from the NAND gate NA8 is applied to a reset input terminal of the counter CO2. To clock input terminals CK of the counter CO2 and the Flip-Flop F7 are applied clock pulses of period T/4.

When the FSK signal is applied to the external input priority circuit and an input terminal of the inverter IN10 assumes a low level L, output terminals Q and $\overline{Q}$ of the Flip-Flop F7 are respectively set at H and L in synchronous relation with the clock pulses of period T/4. Signals from the output terminals Q and $\overline{Q}$ of F7 are applied to the NAND gates NA14 and NA15, respectively.

The NAND gates NA14, NA15 and NA16 constitute a signal selecting circuit which applies selectively the FSK signal and the reference signal from the reference signal generating circuit to the aforesaid frequency discrimination circuit in accordance with the states of the output terminals Q and $\overline{Q}$ of the Flip-Flop F7. When the Q terminal of the Flip-Flop F7 is set at H, the FSK signal is applied to the frequency discrimination circuit from the inverter IN17. Meanwhile, when the output terminal $\overline{Q}$ of F7 is set at L, the counter CO2 is released from the reset state and hence it starts to count the clocks.

In case of the FSK signal of period T, after counting the numbers 0, 1, 2 and 3, the counter CO2 is now reset in accordance with the state of the subsequent FSK signal and starts to count the numbers 0, 1, 2, and 3 once again. In case of the FSK signal of period 2T, after the Flip-Flop F7 is set, the counter CO2 counts the numbers 0, 1, 2, 3, 4, 5 and 6 and then it is reset.

More specifically, in the presence of the FSK signal, since a reset signal H is not applied to the reset input terminal R of the Flip-Flop F7 in both cases of the FSK signal having period of T and 2T, the output terminals Q and $\overline{Q}$ of F7 are respectively held in the H and L state. In such state, since a high level H is issued at the output terminal Q of the Flip-Flop F8 in the predetermined timing, the FSK signal input to the inverter IN10 is applied to the NAND gate NA14 through the NAND gate NA13 and the inverter IN17.

At this time, a high level of H is applied to the other input terminal of the NAND gate NA14, so that the FSK signal is applied to the frequency discrimination circuit through both NA14 and NA15. Also on this occasion, one input terminal of the NAND gate NA15 assumes a low level L, whereby the reference signal fed from the reference signal generating circuit is not issued from NA15.

In the absence of the FSK signal, since the counter CO2 will not be reset at the count 6, it continues to count the numbers 0, 1, 2, 3, 4, 5, 6, 7, 8 and 9. When the counted value reaches 9, i.e., when it has lapsed 3T from starting of the count, a high level (reset level) H is applied to the reset input terminal R of the Flip-Flop F7 through the NAND gate NA9 and the inverter IN16, thereby to reset F7.

In this way, the output terminals Q and $\overline{Q}$ of the Flip-Flop F7 are inverted to L and H, respectively. With the terminal $\overline{Q}$ of F7 assuming H, a reset signal is applied to the counter CO2. This reset signal will be continued until a low level L is next applied to the inverter IN10 and the terminal Q of F7 is set at L once again. Upon inversion of levels at the output terminals Q and $\overline{Q}$ of the Flip-Flop F7, the NAND gate NA14 is closed and the NAND gate NA15 is opened instead, whereby the reference signal from the inverter IN19 is now applied to the frequency discrimination circuit through the NAND gate NA16.

Figure 6:
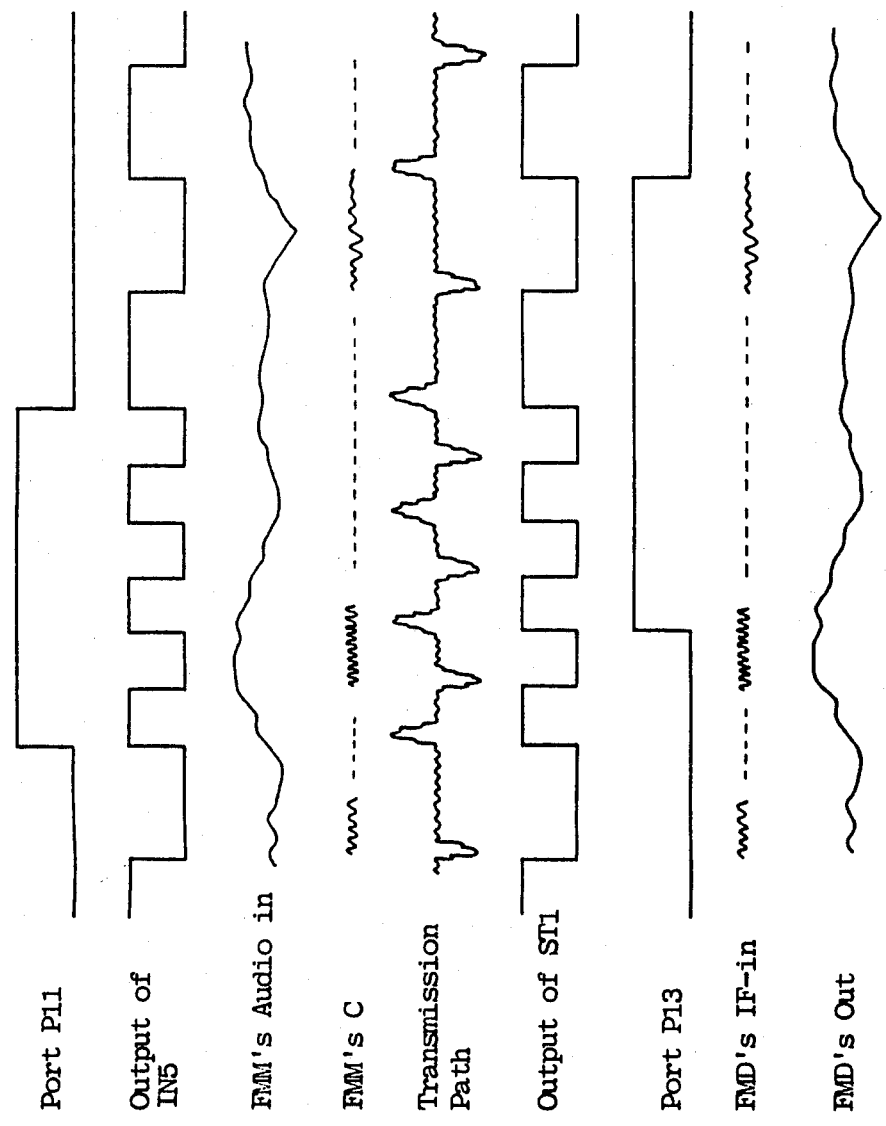
FIG. 6 is a view showing schematic wave forms of signals at the respective parts of the apparatus shown in FIG. 1.

FIG. 6 shows schematically signal waveforms in a entire apparatus. Referring now to FIG. 6, the description will be given for the case of transmitting signals from the steering operation board as shown in FIGS. 3a, 3b and 3c to the apparatus as shown in FIGS. 4a, 4b and 4c. As previously noted, in the state where the output port P12 of the microcomputer 80 holds a high level H and clock pulses of period T/4 are applied to P10, when a level H or L is set at the output port P11 in accordance with the data to be transmitted, a pulse signal of period T or 2T corresponding to the set level, i.e., FSK signal, appears at the output terminal of the inverter IN5 and other terminals. Therefore, upon rising and falling of the FSK signal, there generates a positive or negative signal in the transmission system including the slip ring SA1.

On the other hand, when voices are input to the microphones MC1 and MC2, an audio signal is amplified by the differential amplifier DFA and then applied to the Audio-in terminal of the FM modulator FMM via the high-pass filter HPF, the low-pass filter LDF and the amplifier AMP. With this, a sinusoidal signal of relatively small amplitude modulated in its frequency with the audio signal appears at the output terminal of the FM modulation circuit 95, and this sinusoidal signal is applied to the transmission path including the slip ring SA1 through a capacitor.

Accordingly, there appears in the transmission path a superimposed signal comprising the FSK signal and the sinusoidal FM signal modulated with the audio signal. This superimposed signal is applied to the apparatus on the vehicle body side through the slip ring SA2.

Then, the superimposed signal is applied to the FSK demodulation circuit 160. The FSK demodulation circuit 160 takes only the positive or negative pulse component out of the superimposed signal through the Schmitt trigger ST1 in a binary fashion to convert it into an FSK signal, demodulates the FSK signal to the data of "1" or "0" in accordance with the period of the FSK signal, and then applies the data to the input port P13 of the microcomputer 130.

At the same time, the superimposed signal is also applied to the FM demodulation circuit 170 from the transmission path. The FM demodulation circuit 170 takes only the FM modulated signal out of the applied signal through a ceramic filter CFT and then applies it to an integrated circuit FMD for FM demodulation. The circuit FMD serves to demodulate the original audio signal from the FM modulated wave and to apply the demodulated audio signal to the amplifier AM1.

Figure 7:
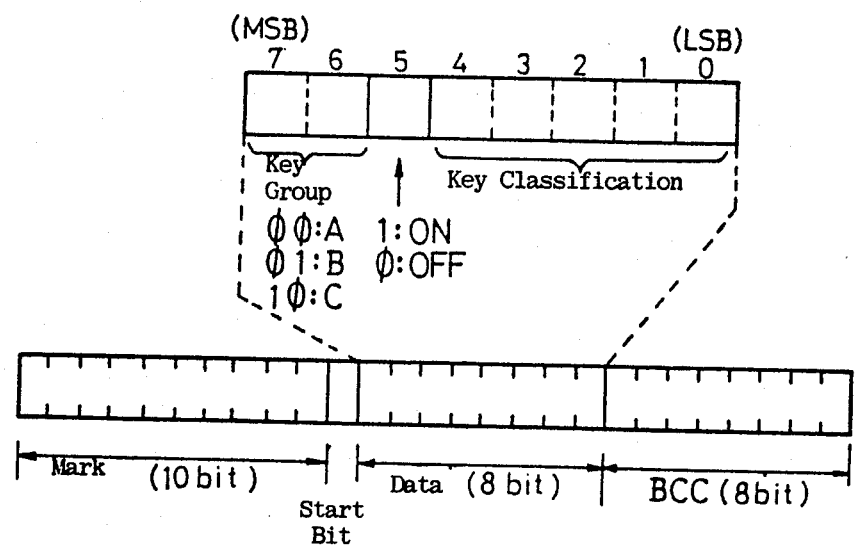
FIG. 7 is a block diagram showing the construction of a data train of a signal (FSK) transmitted by the apparatus shown in FIG. 1.

FIG. 7 shows a construction of the signal which is applied to the FSK modulation circuits 100 and 150 from the microcomputers 80 and 130 respectively in this embodiment. The signal is composed of a mark signal of the first 10 bits (high level: "1"), a start bit of the subsequent 1 bit, the data of 8 bits, and a BCC code of 8 bits. As to the 8-bit data, the bits 0 to 4 designate the kind of keys, the bit 5 designates ON/OFF of keys ("1"; ON, "0"; OFF), and the bits 6 and 7 designate the group of keys.

In this embodiment, the keys are divided into three groups; the group A represented by "00", the group B represented by "01" and the group C represented by "10". Referring now back to FIG. 2b, the key group A includes the numeral keys (0 to 9), # and * keys clear key CLR, repeat key RE and the hold key HOLD, the key group B includes the horn keys HS1 and HS2, and the key group C includes the call-off key CALL/OFF.

Figure 8:
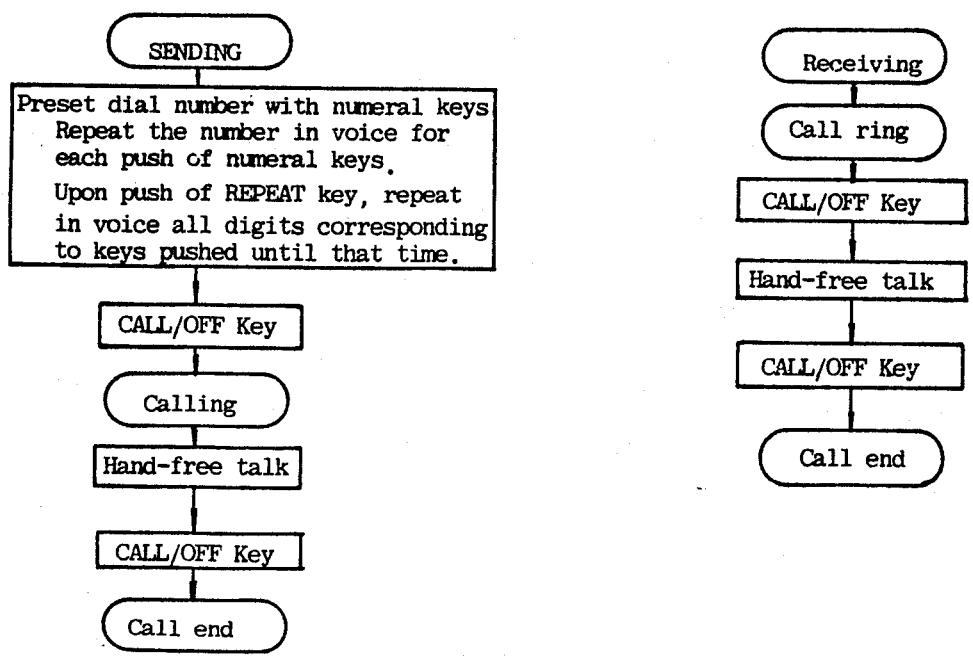
FIG. 8 is a flow chart schematically showing both sending operation and receiving operation when a telephone call is made by a telephone set incorporated in the apparatus shown in FIG. 1.

FIG. 8 shows schematically operation of the apparatus in case of actuating the load-vehicle telephone into the sending and receiving modes from the steering operation board. The description will be now made by referring to FIG. 8.

Sending Operation

The telephone number of the other party is input using the numeral keys and * and # keys on the steering wheel operation board. Upon this, the microcomputer stores the key-input telephone number. At the time of keying input, every time any one of the numeral keys 0 to 9 is operated, the microcomputer 130 commands the voice synthesis baord 190 to issue audio output, so that voices corresponding to the respective numerals, e.g., "4", "3" . . . , are issued from the speaker SP in accordance with the keys operated. When the repeat key RE is operated after completion of the keying input, voices corresponding to all the numeral keys having been operated are issued in due order from the beginning, for example, 4 - 3 - 8 - 9.

The microcomputer waits for operation of the call-off key CALL/OFF.

When the call-off key CALL-OFF is operated, the other party corresponding to the stored telephone number is called automatically. When the called party takes up the receiver (i.e., off the hook), the apparatus comes into the state permitting a hand-free talk. In this connection, with the hold key HOLD being operated, the relay R5 is actuated and the transmitter, namely, the microphones MC1 and MC2 on the steering wheel, is interrupted from the mobile unit TRX, whereby it is stopped to send voices from the vehicle.

When the call-off key CALL/OFF is operated once again, this is judged as completion of a telephone call and communication is ended.

Receiving Operation

When the road-vehicle telephone set is called from the other party, there sounds a call ring.

It waits for operation of the call-off key CALL/OFF.

When the call-off key CALL/OFF is operated, the apparatus comes into the same state as where the receiver is being taken up in the normal case, so that voices of the other party are issued from the speaker SP and the microphones MC1 and MC2 on the steering operation board are connected to the road-vehicle telephone set as a transmitter. When the call-off key CALL-OFF is operated once again, this is judged as completion of a telephone call and communication is ended.

Figure 9A:
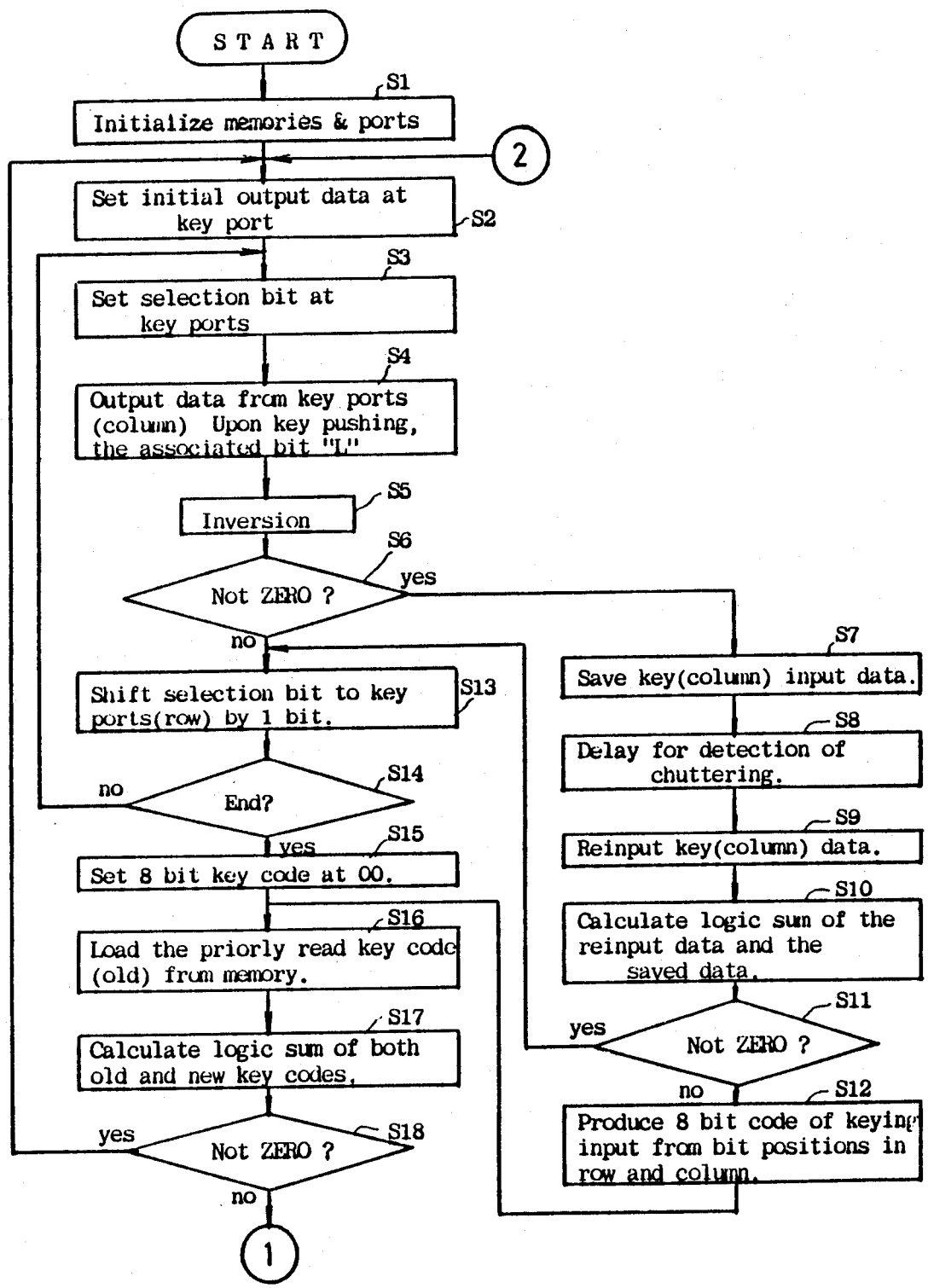

FIGS. 9a and 9b show operation of the steering operation board as shown in FIGS. 3a, 3b and 3c. Operation steps of the steering operation board will be now described in detail by referring to FIGS. 9a and 9b.

S1. The state of each output port of the microcomputer 80 is set at the initial level with the content of the memory being at the initial value. With this processing, the output port P12 assumes a low level L and output of the FSK signal is inhibited.

S2. The data issued to the key reading signal output ports, i.e., P1 to P5, is set at the initial value. This initial data is selected such that the bits corresponding to the output ports connected to rank lines of the key matrix allowing the start of reading assume "0" (i.e., low level L) and other bits assume "1" (i.e., high level H). In this embodiment, it is arranged that the bit corresponding to the port P1 assumes "0" and the bits corresponding to the ports P2, P3, P4 and P5 assume "1".

S3. The predetermined data is output to the ports P1 to P5. Upon this, certain ones among those ports P1 to P5 indicate a low level L and remaining ports indicate a high level H.

S4. Levels at the input ports P6 to P9 connected to column lines of the key matrix are read out. Referring to FIG. 3a since the input ports P6 to P9 are pulled up to the power source line Vcc through resistors and the respective keys are connected in the form of a matrix between the output ports P1 to P5 and the input ports P6 to P9, levels at the input ports P6, P7, P8 and P9 indicate respectively L, H, H and H in such timing that a low level L is set at the output port P1, for example, when the key 0 of the key matrix 90 is pressed.

S5. Each bit value 1/0 of the data read in the step S4 is inverted. Namely, the complement is obtained for each bit.

S6. The key reading data obtained in the step S5 is compared with the numeral 0. If the data equals to 0, this indicates the absence of keying input, so that the flow is forwarded to the step S13. In other cases, it is forwarded to the step S7.

S7. The key reading data is saved (or stored) in the predetermined memory.

S8. In order to avoid an influence of mechanical vibrations of key contacts, i.e., chattering, it waits a predetermined period of time (e.g., 10 msec) enough for such vibrations to be fully attenuated.

S9. Levels at the ports P6 to P9 are read once again.

S10. The logical sum of the value read in the step S9 and the value saved into the memory in the step S7 is calculated for each bit.

S11. It is checked whether the calculated result in the step S10 is 0 or not. If the calculated value is not 0, this is judged as that there is no keying input and hence the flow is forwarded to the step S13. Otherwise, it is forwarded to the step S12.

S12. A key code of 8 bits corresponding to the pressed keys is generated based on the bits of data "0" in the key reading rank signal data issued to the output ports P1 to P5 and the data read from the ports P6 to P9.

S13. The bits of data "0" in the key reading rank signal data issued to the output ports P1 to P5 are shifted to the adjacent bits, respectively.

S14. It is checked whether one cycle of key reading scan is completed or not. If the scan is not yet completed, the flow returns to the step S3 and the subsequent processing.

S15. Since there occurs no keying input, an 8-bit code 00H (Hexadecimal notation) is set as a key code.

S16. The key code obtained at the time of previous key reading scan is loaded from the memory.

S17. The logical sum of the previous key code loaded in the step S16 and the new key code obtained by the present key reading scan is calculated for each bit.

S18. It is checked whether the calculated result is 0 or not. If it is 0, i.e., if there is no key operation, the flow returns to the step S2. In other cases, the flow comes into the step S19.

S19. Newly generated key code is stored in the memory at the predetermined address.

S20. It is checked whether the key code belongs to the key group A or not.

S21. It is checked whether the keys are pushed or pulled. In order that the keys in the group A, i.e., numeral keys, * key, # key, clear key CLR, repeat key RE and the hold key HOLD, are made effective only when they are pushed, the flow jumps to the step S2 when the keys are pulled.

S22. For confirmation of keying input, the buzzer is buzzed one time.

S23. It is checked whether the pushed keys belong to the group B or not. The keys of the group B, i.e., horn keys HS1 and HS2, are made effective in both cases they are pushed and pulled.

S24. The data of the generated key code is sent out to the transmission path to inform the apparatus on the vehicle body side of the presence of keying input. This processing will be described later in more detail.

S25. It is checked whether the data has been sent out correctly or not in the data transmission of the step S24.

S26. It is checked whether the pushed keys belong to the group C or not. As to the key of the group C, i.e., call-off key CALL/OFF, the data representing the inverted ON/OFF state of the key is transmitted every time the key is pushed.

S27. The data indicating the present ON/OFF state of the call-off key CALL/OFF is loaded from the memory.

S28. A new key code corresponding to the inverted ON/OFF state of the call-off key CALL/OFF is produced based on the key code and the data loaded in the step S27. For example, when the call-off key has been turned on in the previous operation, the present keying operation produces the key code data indicating the off state of the call-off key.

S29. Similar to the step S24.

S30. It is checked whether the data has been sent out correctly in the data transmission of the step S29.

S31. The content of the memory storing the ON/OFF state of the call-off key CALL/OFF is inverted.

S32. In accordance with the state of the call-off key CALL/OFF, the relay RL1 connected to the output port P15 of the microcomputer 80 undergoes ON/OFF control. Upon this, the FM modulation circuit 95 and other parts are controlled.

S33. Since there occurs an error in data transmission, the buzzer BZ is buzzed two times to inform the driver of error occurrence.

S34. Since there occurs an error in key reading, the buzzer is buzzed three times to inform the driver of error occurrence.

FIGS. 10a, 10b and 10c show operation of the apparatus on the vehicle body as shown in FIGS. 4a, 4b and 4c. Its operation steps will be now described in order by referring to FIGS. 10a, 10b and 10c.

S51. The content of the memory is initialized and the state of each output port of the microcomputer 130 is set at the initial level. With this processing, the output port P12 assumes a low level L, so that output of the FSK signal is inhibited.

S52. It is checked whether the receiver of the telephone set TEL is off or not.

S53. Since the receiver of the telephone set TEL is off, a high level H is issued at the output port HK20 to turn the relay R4 ON, H is issued at the output port HK10, and a low level L is issued at the output port Audio thereby to set the relays R2 and R3 (RL2) OFF. Upon this, the telephone set TEL becomes usable to be operated in the same manner as that of the normal road-vehicle telephone set.

S54. The content of the memory storing the command of hand-free talk from the steering wheel operation board is loaded.

S55. It is checked whether there exists the command of hand-free talk or not. In the initial state, the flow is forwarded to the step S57 because a hand-free talk is not commanded. But, when the call-off key CALL/OFF on the steering wheel operation board is set ON (CALL), it is forwarded to the step S56 by the presence of the command of hand-free talk.

S56. A high level H is issued at the output port HK20 to turn the relay R4 ON, H is set at the output port HK10, H is set at the output port Audio to turn the relays R2 and R3 (RL2) ON, and a low level L is issued at the output port PS to turn the relay R1 ON. Upon this, both telephone unit TEL and the mobile unit TRX are powered-on, the power source of the FM demodulation circuit 170 is turned ON, and the amplifier AMP is connected to the voice receiving line of the mobile unit TRX.

S57. A low level L is issued at the output port HOLD to turn the relay R5 OFF, L is issued at the output port HK20 to turn the relay R4 OFF, L is set at the output port HK10, L is issued at the output port Audio to turn the relays R2 and R3 (RL2) OFF, and a high level H is issued at the output port PS to set the relay R1 OFF. Upon this, the power sources of the telephone set TEL, the mobile unit TRX and the FM demodulation circuit 170 are turned OFF, and the telephone set TEL is connected to the mobile unit TRX.

S58. The data from the steering operation board is received. This will be described later in more detail.

S59. It is judged whether data tarnsmission generated by keying operation on the steering operation board has come or not actually from the steering operation board.

S60. It is judged whether the transmitted data corresponds to the key code of the group A or not.

S61. It is judged whether the key code corresponds to the numeral keys, * key or # key or not.

S62. It is judged whether the key code corresponds to the hold key HOLD or not.

S63. It is judged whether the key code corresponds to the clear key CLR or not.

S64. The address counter of the memory for storing the key codes corresponding to the numeral keys which have been transmitted until that time, is cleared. Namely, the numeral keying inputs until that time are cancelled.

S65. It is judged whether the key code corresponds to the group B or not.

S66. It is judged whether the key code corresponds to the horn keys HS1 and HS2 or not.

S67. Does the key code correspond to key switch-on?

S68. Since the horn key is pulled, the horn is set OFF.
S69. Since the horn key is pushed, the horn is set ON.

S70. It is checked whether the key code corresponds to the group C or not.

S71. Since the key code received as data does not correspond to any one of the groups A, B and C, this is processed as an error in data receiving and the buzzer BZ is buzzed three times.

S72. The content of the memory for storing the command of hand-free talk from the steering operation board is loaded.

S73. It is checked whether the data loaded in the step S72 commands a hand-free talk or not.

S74. The content of the memory for storing the command from the hold key HOLD is loaded.

S75. The data state of 1/0 (i.e., ON/OFF) loaded in the step S74 is inverted and then stored in the original memory. Thus, if there has been no hold command in advance, the predetermined bit of the data is set at "1", i.e., the hold-on command.

S76. It is checked whether there is the hold-on command or not.

S77. Since hold-off is commanded, L is issued at the output port HOLD to set the relay R5 OFF. Upon this, the signal output terminal of the FM demodulation circuit 170 is connected to the sending voice input terminal T of the mobile unit TRX, whereby it becomes possible to talk through the microphones MC1 and MC2 on the steering wheel.

S78. Since hold-on is commanded, H is issued at the output port HOLD to set the relay R5 ON. Upon this, the output terminal of the FM demodulation circuit 170 is disconnected from the mobile unit TRX.

S79. Since the key code corresponding to the numeral keys has come, the code is converted to the BCD (Binary Coded Decimal) code in accordance with the numeral values of the pushed numeral keys and then stored in the memory at the predetermined address.

S80. The content of the counter specifying the memory address which stores the BCD code corresponding to the numeral keys therein is incremented.

S150. Both relays R3 and R7 are turned ON, so that the voice synthesis board 190 is powered-on and the signal output terminal OUT of the voice synthesis board 190 is connected to the input port of the power amplifier PA.

S151. With reference to a BCD/voice-code-address conversion table in the ROM, address of the voice code to be output to the voice synthesis board 190 is produced based on the BCD code corresponding to the numeral keys which was attained in the step S79.

S152. The address code attained in the step S151 is sent to the voice synthesis board 190.

S153. A level of the signal line BUSY leading from the voice synthesis board 190 is checked. Then, it waits until the signal line becomes free of the BUSY state (i.e., state incapable of receiving the audio output command).

S154. The signal line SD is set at an audio output command level. Upon this, the voice synthesis board 190 reads the audio data in accordance with the specified address and converts it into an analog audio signal which is issued at the output terminal OUT.

S155. Both relays R3 and R7 are turned OFF, so that the power source of the voice synthesis board 190 is turned OFF and the input terminal of the power amplifier PA is connected to the output terminal of the amplifier AM2.

S160. It is judged whether the coming key code corresponds to the repeat key RE or not.

S161. It is checked whether the content of the address counter (pointer) in the memory for storing the key codes corresponding to the numeral keys having been transmitted until that time is 0 or not, the content being in accordance with the number of key operations. In other words, it is checked whether there exists no numeral keying input or not. If the content is not 0, the flow is forwarded to the step S162.

S162. Both relay R3 and R7 are turned ON, so that the voice synthesis board 190 and other parts are powered-on and the signal output terminal OUT of the voice synthesis board 190 is connected to the input terminal of the power amplifier PA.

S163. The content of the memory specified by the address pointer and locating in the memory area for storing the BCD code attained in the step S79 is loaded. The content of the address pointer is arranged that the first content has a value indicating the head address in the memory area for storing the BCD code.

S164. With reference to the BCD/voice-code address conversion table in the ROM, address of the voice code to be output to the voice synthesis board 190 is produced based on the BCD code loaded in the step S163.

S165. The address data obtained in the step S164 is output to the voice synthesis board 190.

S166. A level of the signal line BUSY leading from the voice synthesis board 190 is checked. Then, it waits until the signal line becomes free of the BUSY state (i.e., state incapable of receiving the audio output command).

S167. The signal line SD is set at an audio output command level. Upon this, the voice synthesis board 190 reads the audio data in accordance with the specified address and converts it into an analog audio signal which is issued at the output terminal OUT.

S168. The content of the address pointer is incremented. In other words, the content of the address pointer is updated to a value of the address for storing the BCD code corresponding to the keys operated subsequent to the keys whose corresponding BCD code has been output in voice at the present time.

S169. It is checked whether the content of the address pointer has exceeded or not the last address of the memory for storing the BCD codes corresponding to the input keys.

S170. Both relay R3 and R7 are turned OFF to stop power supply to the voice synthesis board 190 or other parts, and the output terminal of the amplifier AM2 is connected to the input terminal of the power amplifier PA.

S81. It is checked whether the key code coming from the steering operation board indicates operation of the call-off key CALL/OFF or not.

S82. It is judged whether the key code indicates the ON (CALL) state of the call-off key or not.

S83. Since the call-off key is set OFF, the content of the memory for storing the command of hand-free talk is set 0 (hand-free talk OFF).

S84. Since the call-off key is set CALL, the content of the memory for storing the command of hand-free talk is set "1" (hand-free talk ON).

S85. It is checked whether the receiver of the telephone set TEL is taken off or not.

S86. H is issued at the output port HK20 to turn the relay R4 ON, H is set at the output port HK10, H is issued at the output port Audio to turn both relays R2 and R3 (RL2) ON, and L is issued at the output port PS to set the relay R1 ON. Upon this, the power sources of both telephone set TEL and mobile unit TRX are turned ON, the power source of the FM demodulation circuit 170 is turned ON, and the amplifier AMP is connected to the voice receiving line of the mobile unit TRX.

S87. It waits for a given time allowing actuation of the relays as well as allowing the mobile unit to come into the predetermined operation state from power-on.

S88. It is checked whether the mobile unit TRX is powered-on or not.

S89. It is checked whether the vehicle locates in an area permitting communication or not (i.e., whether the transmitted wave can reach the other party or not). This is judged by checking whether the output terminal CI of TRX indicates a call enable level or not.

S90. Since there occurs any trouble or the vehicle locates in an area disabling communication, the buzzer BZ is buzzed two times to inform the driver of error occurrence.

S91. The content of the memory for storing the command of hand-free talk is set to "0" (hand-free talk off).

S92. The content of the memory for storing the 4-bit BCD code corresponding to the numeral values input by the numeral keys is read out from the address specified by the numeral pointer (address counter) and then loaded in the predetermined register.

S93. The BCD code obtained in the step S92 is converted into the same code as the dial code produced by the telephone set TEL.

S94. The dial code obtained in the step S93 is output to the DI terminal sequentially in synchronous relation with a pulse signal issued from the CP terminal of the mobile unit TRX.

S95. The value of the numeral pointer is incremented.

S96. It is checked whether all of the BCD codes are completely read out of the memory or not. This is judged by checking the value of the numeral pointer. If not completed, the flow returns to the step S92 to read out the BCD code from the next numeral pointer.

Figure 11A:
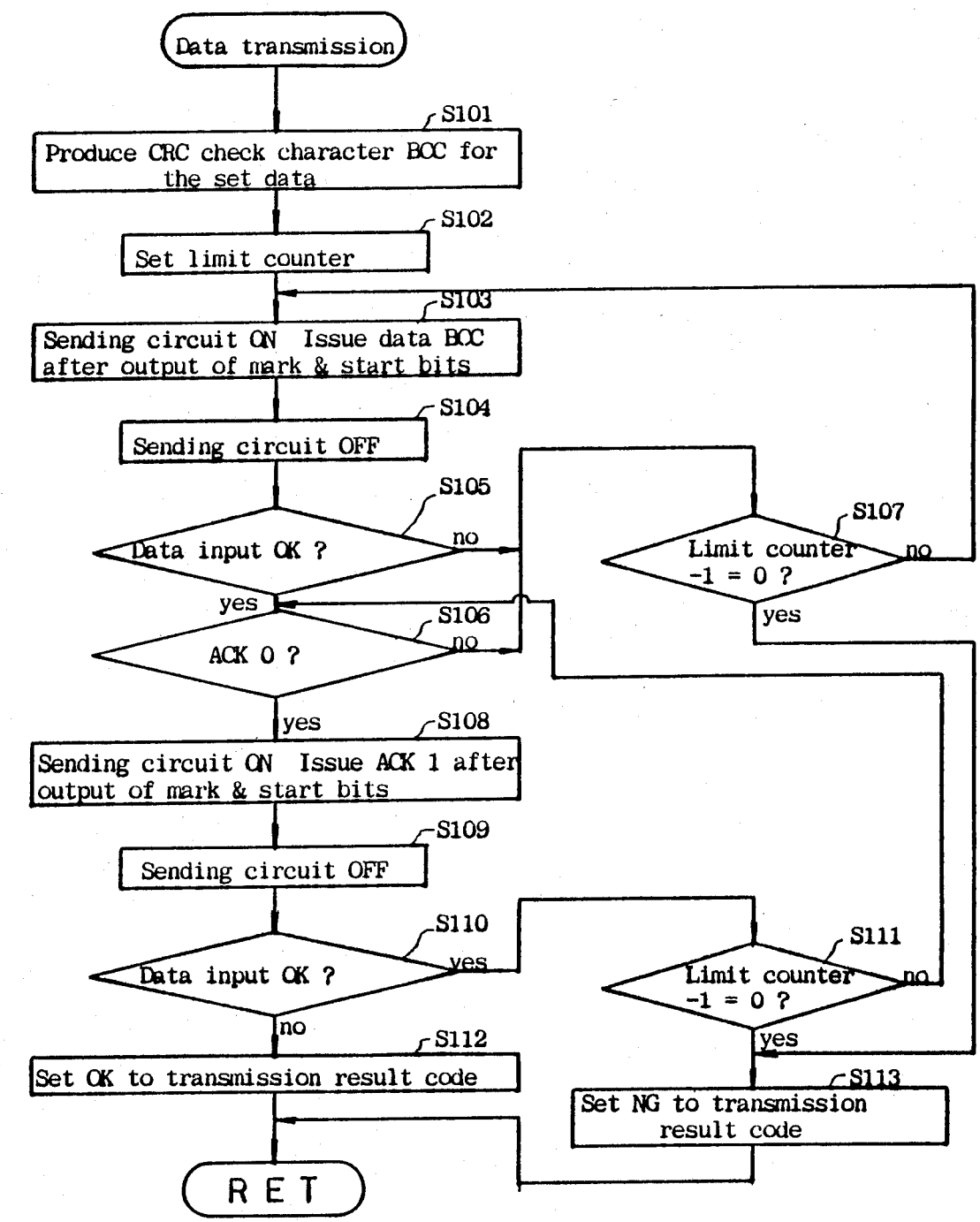
FIG. 11a is a flow chart showing the data transmitting (sending) operation of the microcomputer 80 in FIG. 1.

FIG. 11a shows data transmission (sending) operation of the microcomputer 80 in detail. Its operation steps will be now described in order by referring to FIG. 11a.

S101. An 8-bit CRC check character BCC is produced in accordance with the data to be transmitted.

S102. A limit counter adapted to limit the number of data transmissions is set at a predetermined value.

S103. The output port P12 is set at H to permit output of the FSK signal. The respective bit data comprising the mark signal, start bit, transmitted data and the BCC code are set at the output port P11 in synchronous relation with the clocks.

S104. L is set at the output port P12 to inhibit output of the FSK signal.

S105. It is checked whether there is data input from the FSK modulation circuit on the other party side. If there is no data input, the flow is forwarded to the step S107.

S106. It is checked whether the data sent from the other party is an acknowledgment ACK0 indicating data receipt confirmation or not. As described later, upon receipt of the data the receiving side outputs ACK0 to the sending side.

S107. The value of the limit counter is decremented, and it is checked whether the resultant value is 0 or not. If not 0, the flow returns to S103, while if 0, it comes into S113.

S108. H is set at the output port P12 once again to permit output of the FSK singal. Then, the respective bit data comprising the mark signal, start bit and the acknowledgment ACK1 indicating confirmation of ACK0 are output sequentially in synchronous relation with the clocks.

S109. L is set at the output port P12 to inhibit output of the FSK signal.

S110. It is checked whether the FSK signal has arrived from the other party (receiving side) or not. As described later, the receiving side stops to output the FSK signal upon receiving an acknowledgment ACK1 from the sending side after dispatch of the acknowledgment ACK0. But, receiving no ACK1, the other party outputs the FSK signal including ACK0 once again. Accordingly, arrival of the FSK signal from the receiving side means herein that the data ACK1 from the sending side has not yet been received by the receiving side.

S111. Since the data ACK1 has not yet been received by the receiving side, the value of the limit counter is decremented and then it is checked whether the resultant value is 0 or not. If not 0, the flow is returned to the step S106 to transmit the data ACK1 once again, while if 0, it comes into the step S113.

S112. Since the data transmission has been completed within the predetermined number of times set in the limit counter, "OK" is set to the transmission result code.

S113. Although the data transmission has been performed in the predetermined number of times set in the limit counter, both data and acknowledgment ACK1 are not transmitted correctly. Thus, "NG" is set to the transmission result code.

Figure 11B:
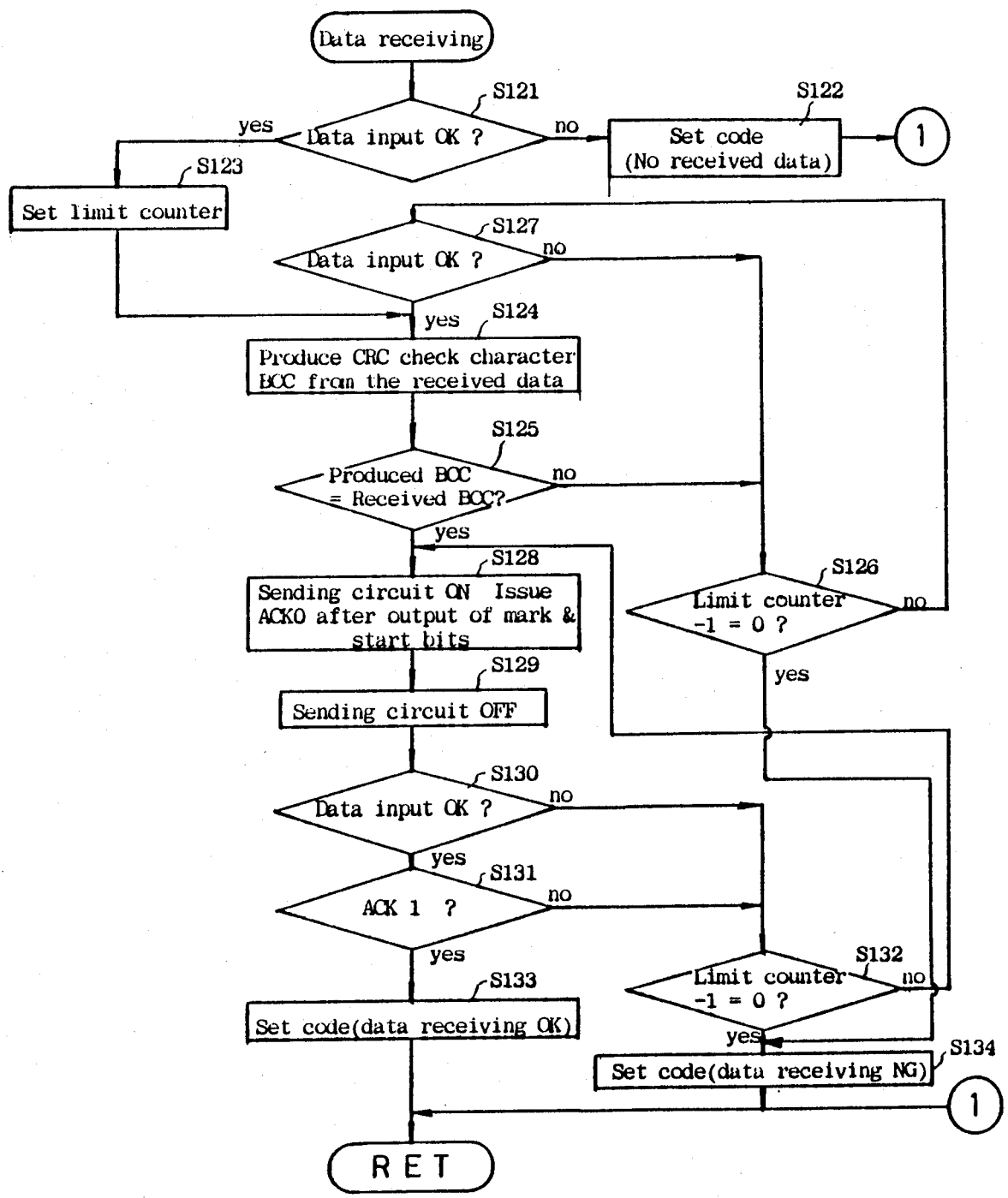
FIG. 11b is a flow chart showing the data receiving operation of the microcomputer 130 in FIG. 1.

FIG. 11b shows data receiving operation of the microcomputer 130 in detail. Its operation steps will be now described by referring to FIG. 11b.

S121. It is checked whether the FSK signal has been received or not, i.e., whether the data has arrived at the input port P13 or not.

P122. Since no data has arrived at the input port P13, the code corresponding to no data receipt is set in the data receiving memory.

S123. A predetermined value is set in the limit counter adapted to limit the number of data receiving operations in data transmission at one time.

S124. The CRC check character BCC is produced from the received data.

S125. Both BCC values produced from the received data and in the step S124 are compared with each other. If both values are equal, this is judged as that the data has been received correctly, and then the flow is forwarded to the step S128. Otherwise, it is forwarded to the step S126.

S126. Since there occurred an error, the limit counter is decremented and it is checked whether the resultant value is 0 or not. If not 0, the flow is returned to S127, while if 0, it comes into S134.

S127. It is checked whether there exists data input or not. If there exists the received data, the flow is forwarded to S124. Otherwise, it is forwarded to S126.

S128. Since the data has been received correctly, H is set at the output port P12 to permit output of the FSK signal. The respective bit data comprising the mark signal, start bit and the acknowledgment ACK0 are output sequentially in synchronous relation with the clocks.

S129. L is set at the output port P12 to inhibit output of the FSK signal.

S130. It is checked whether the FSK signal has been received on the receiving side.

S131. It is checked whether the received data is or not the acknowledgment ACK1 from the sending side to be dispatched in response to the acknowledgment ACK0 from the receiving side. If it is ACK1, the flow is forwarded to S133. Otherwise, it is forwarded to S132.

S132. The content of the limit counter is decremented, and then it is checked whether the resultant value is 0 or not. If not 0, the flow is returned to S128, while if 0, it comes into S134.

S133. Since the data transmission has been completed within the predetermined number of times set in the limit counter, "OK" is set to the transmission result code.

S134. Although the data transmission has been performed in the predetermined number of times set in the limit counter, both data and acknowledgement ACK1 are not transmitted correctly. Thus, "NG" is set to the transmission result code.

In the above-mentioned embodiment, although audio answer-back is effected only for the numeral keys, such audio answer-back may be also effected for the call-off key CALL-OFF, the hold key HOLD or other keys by using a voice synthesis board of large memory capacity.

Another embodiment of this invention will be described hereinafter.

Figure 12:
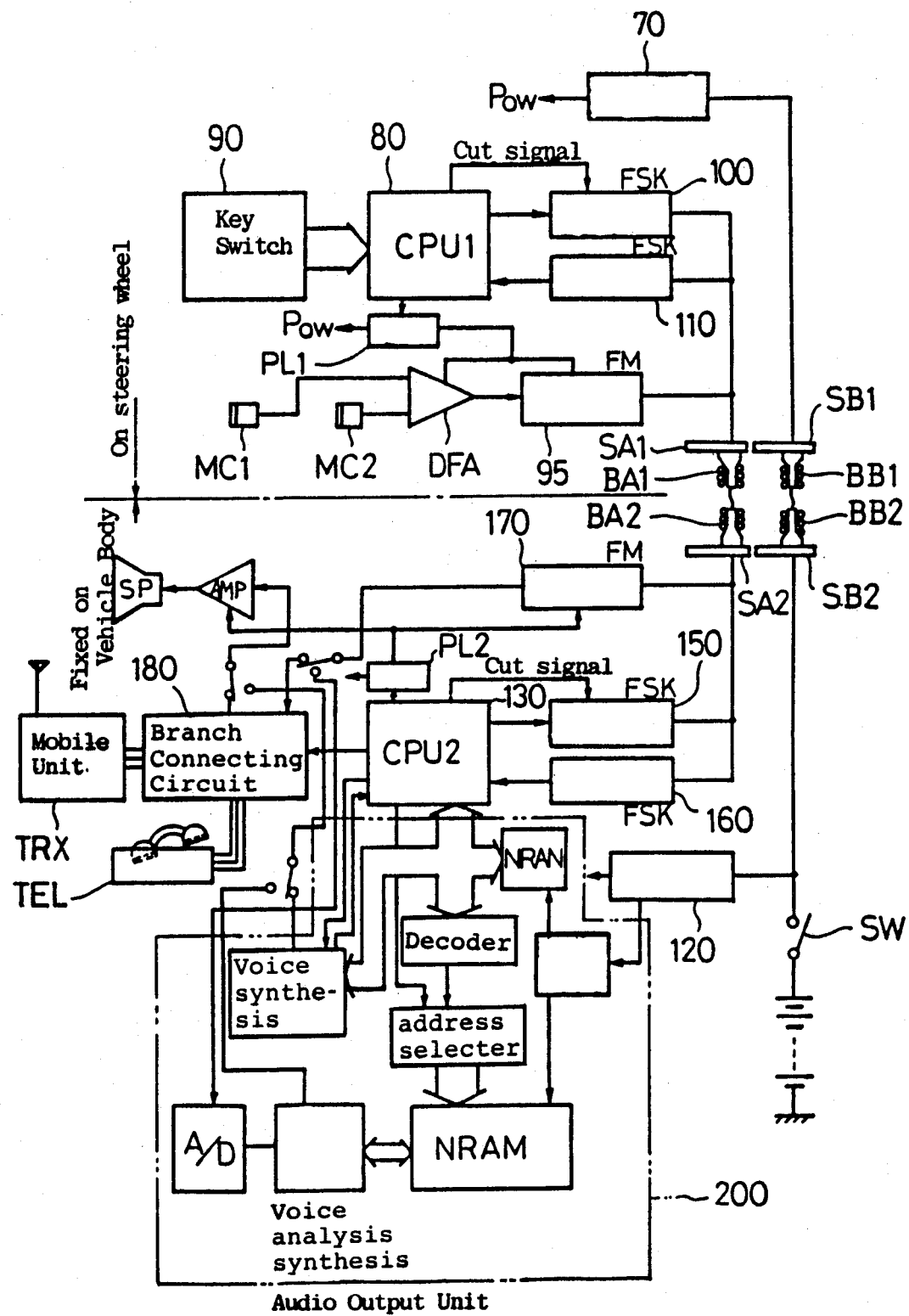
FIG. 12 is a block diagram showing a signal transmission apparatus according to another embodiment of this invention.

FIG. 12 shows a schematic construction of another embodiment. The description will be now made by referring to FIG. 12. In this embodiment, the steering wheel operation board comprises a constant-voltage power source unit 70, a microcomputer unit 80 serving as a transmission control unit, a key switch 90, a second modulation circuit or FM modulation circuit 95, a first modulation circuit or FSK modulation circuit 100, an FSK demodulation circuit 110, an acoustic-electric conversion means such as microphones MC1 and MC2, a differential amplifier DFA and a relay RL1.

The control unit on the vehicle body side, according to this embodiment, comprises a constant-voltage power source unit 120, a microcomputer unit 130, an FSK modulation circuit 150, an FSK demodulation circuit 160, an FM demodulation circuit 170, a telephone set TEL, a mobile unit or radio communication unit TRX for the telephone set, a connection switching means or branch connecting circuit 180, a voice output unit 200 including a means for storing the data on the other party and a voice synthesis means, an amplifier AMP, a speaker SP, a relay RL2, etc.

An output terminal of the FSK modulation circuit 100, an input terminal of the FSK demodulation circuit 110 and an output terminal of the FM modulation circuit 95 are connected to a slip ring SA1, while an output terminal of the FSK modulation circuit 150, an input terminal of the FSK demodulation circuit 160 and an input terminal of the FM demodulation circuit 170 are connected to a slip ring SA2. The slip rings SA1 and SA2 are electrically connected to each other through brushes BA1 and BA2. To a transmission path constituting another system, i.e., slip rings SB1, SB2 and brushes BB1, BB2, is connected a road-vehicle battery through an ignition key switch SW. The voice output unit 200 is controlled by the microcomputer 130.

In this embodiment, although not shown in the figure, the key switch 90 on the steering wheel operation board includes a write key WRT in place of the repeat key. Both construction and operation of the steering wheel operation board are substantially same as those in above-mentioned embodiment.

FIGS. 13a, 13b, 13c, 13d and 13e show an electric circuit of the control unit on the vehicle body side. The portion different from the foregoing embodiment will be now desdribed.

The reference symbol VG1 designates a voice synthesis board included in the voice output unit 200. The voice synthesis board VG1 serves as a unit adapted to issue voices corresponding to the numeral values 0 to 9, and an address line, SD line and a BUSY line of the board VG1 are connected the microcomputer 130. An audio signal output terminal OUT of the voice synthesis board VG1 is connected to an input terminal of the power amplifier PA through contacts of both relays R8 and R7. To plural ports DB of the microcomputer 130 are connected the electric circuit as shown in FIGS. 13d and 13e in addition to the address line of the voice synthesis board VG1.

Figure 13A:
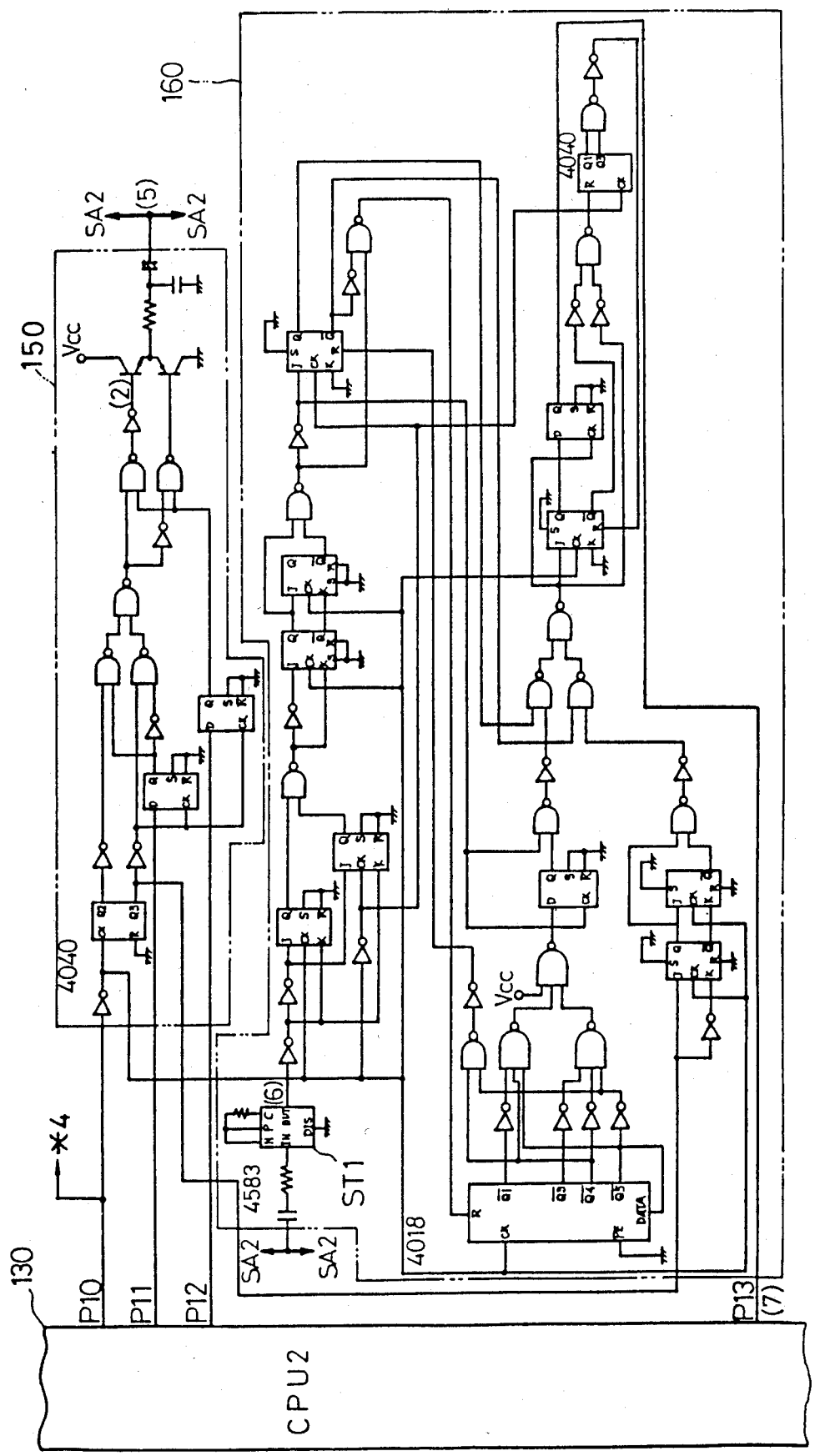
Figure 13C:
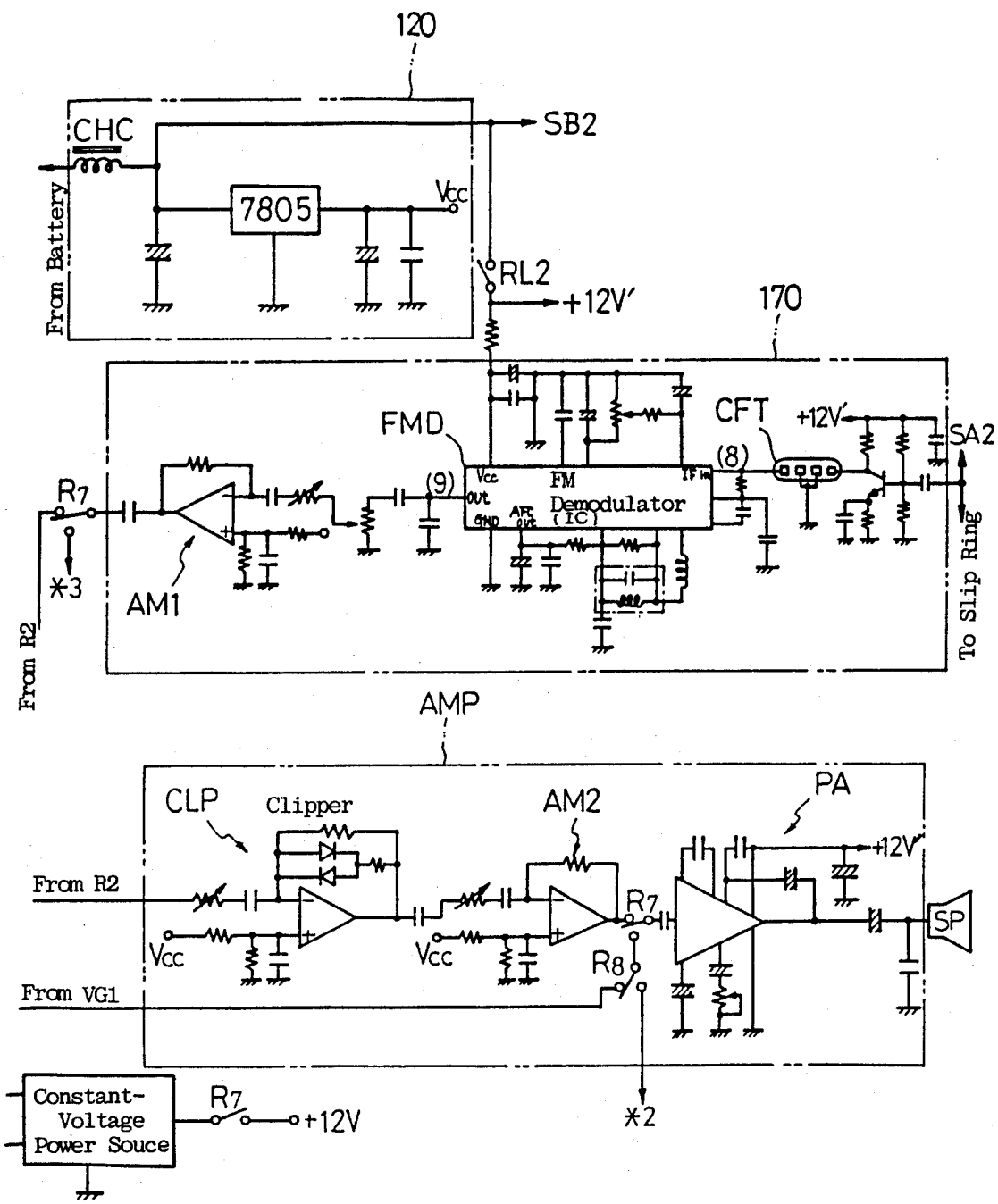
Figure 13D:
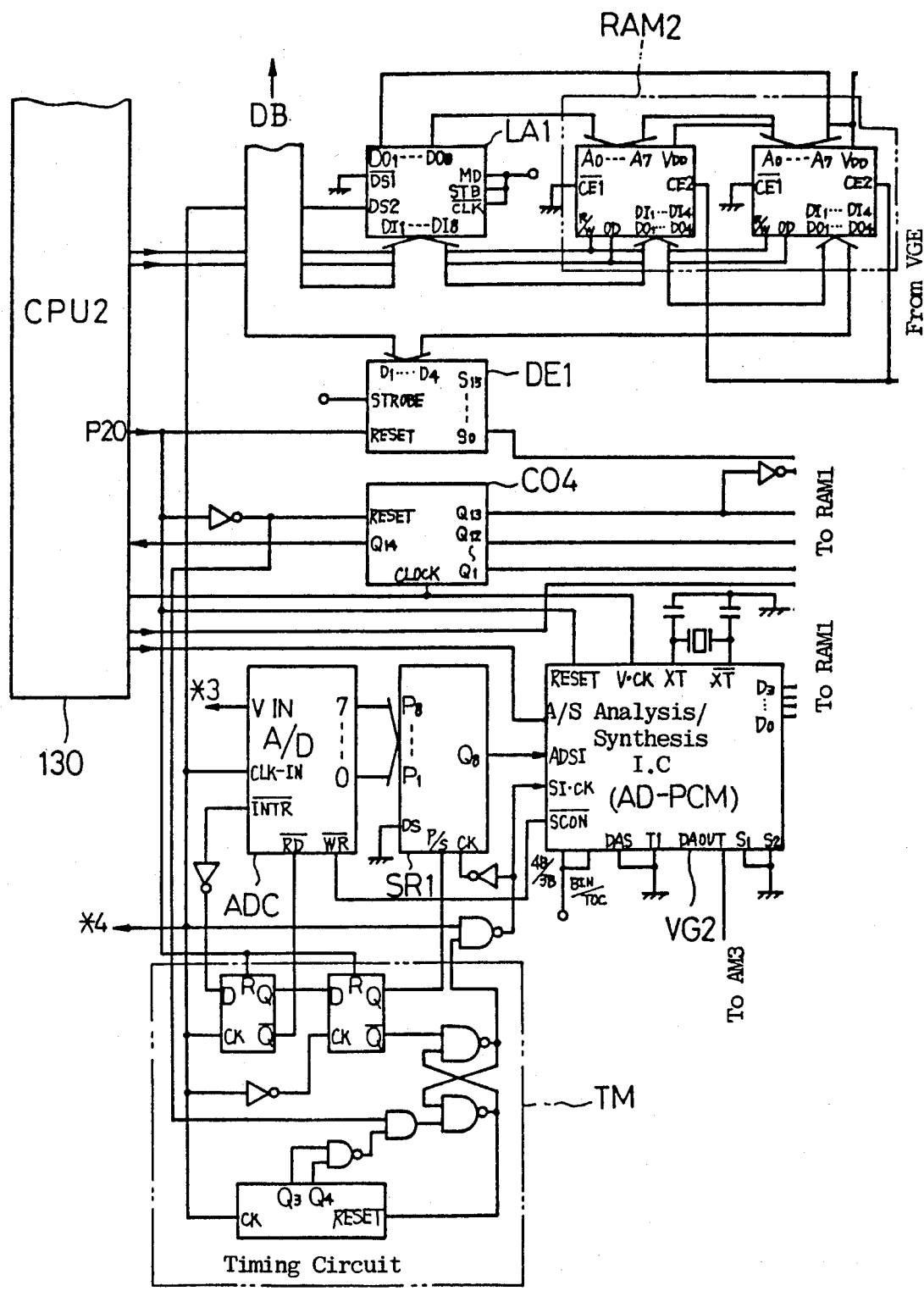
Figure 13E:
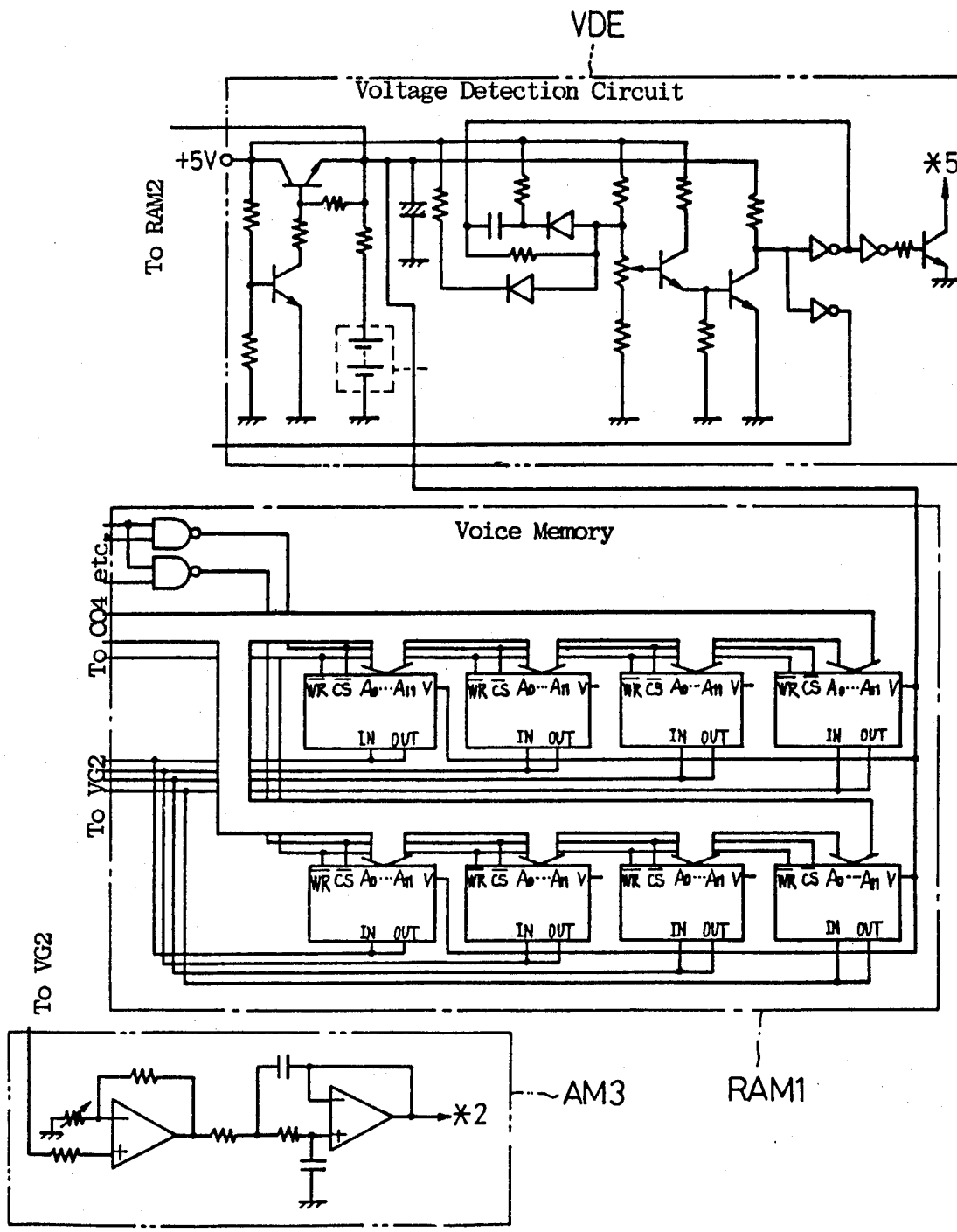

FIGS. 13d and 13e show an electric circuit of the voice output unit 200 except for the voice synthesis board VG1. The description will be by referring to FIGS. 13d and 13e. In brief, this circuit comprises an integrated circuit VG2 having both functions of voice analysis and voice synthesis, a voice memory RAM1, a dial code memory RAM2, a voltage detection circuit VDE, an 8-bit analog/digital converter ADC, a shift register SR1 of serial-in/parallel-out type, a timing circuit TM, an amplifier AM3 including a low-pass filter, a counter CO4, a decoder DE1, a latch LA1, etc.

The dial code memory RAM2 is composed of two sets of CMOS-RAM's of 256×4 bits configuration. Address lines of the dial code memory RAM2 are connected to output terminals of the latch LA1, while input terminals thereof are connected to the ports DB of the microcomputer 130. The dial code memory RAM2 serves to store the numeral values of shortened dial codes in the predetermined addresses.

An analog signal input terminal VIN of the analog/-digital signal converter ADC is connected to the output terminal of the FM demodulation circuit 170 through a contact of the relay R7. 8-bit output terminals of ADC are connected to input terminals of the shift register SR1, and a serial signal output terminal Q8 of SR1 is connected to an input terminal ADSI of the integrated circuit VG2. An analysis/synthesis input terminal of the integrated circuit VG2 for selecting either one of voice analysis and synthesis functions is connected to an output port of the microcomputer 130. An audio signal output terminal DAOUT of VG2 is connected to the input terminal of the power amplifier PA through the amplifier AM3 and both relays R8 and R7.

The voice memory RAM1 is composed of one unit including eight 4K-bit CMOS-RAM and other parts. Data lines of RAM1 comprise 4 bits and are connected to data lines D0 to D3 of the integrated circuit VG2. Address lines of all the memory chips are connected commonly to output terminals Q1 to Q12 of the counter CO4. An output terminal Q13 of the counter CO4 serves to select either one of the upper and lower four memory chips.

Although only one unit of the voice memory RAM1 is shown in the figure, there are provided 16 units of voice memories in total for practical use. All these voice memory units are connected to output terminals S0 to S15 of the decoder DE1, respectively. Therefore, any one of the voice memory units RAM1 is selected in accordance with a signal applied to input terminals D1 to D4 of the decoder DE1.

Both voice memory unit RAM1 and dial code memory RAM2 are powered-on at all times from the constant-voltage source or the battery incorporated in the apparatus, thereby to prevent cancellation of the memory content.

The voltage detection circuit VDE inhibits to select either one chip of the dial code memory RAM2 and prevent erroneous writing, and further it resets the microcomputer 130 to prevent the same from malfunctioning, when the source voltage is lower than a predetermined value.

The timing circuit TM serves to apply the predetermined timing pulses to the analog/digital converter ADC, shift register SR1 and the integrated circuit VG2 in synchronous relation with the clock pulses from the microcomputer 130 or so.

The integrated circuit VG2 serves to analyze the serial data applied to its input terminal ADSI and store the audio data encoded by the ADPCM (Adapted Differential Pulse Code Modulation) system into the predetermined voice memory RAM1 in the voice analysis mode, and it serves to read out the encoded audio data sequentially from the voice memory RAM1, synthesize an audio analog signal based on the read-out data and then issue the synthesized signal to its output terminal DAOUT in the voice synthesis mode.

Figure 14:
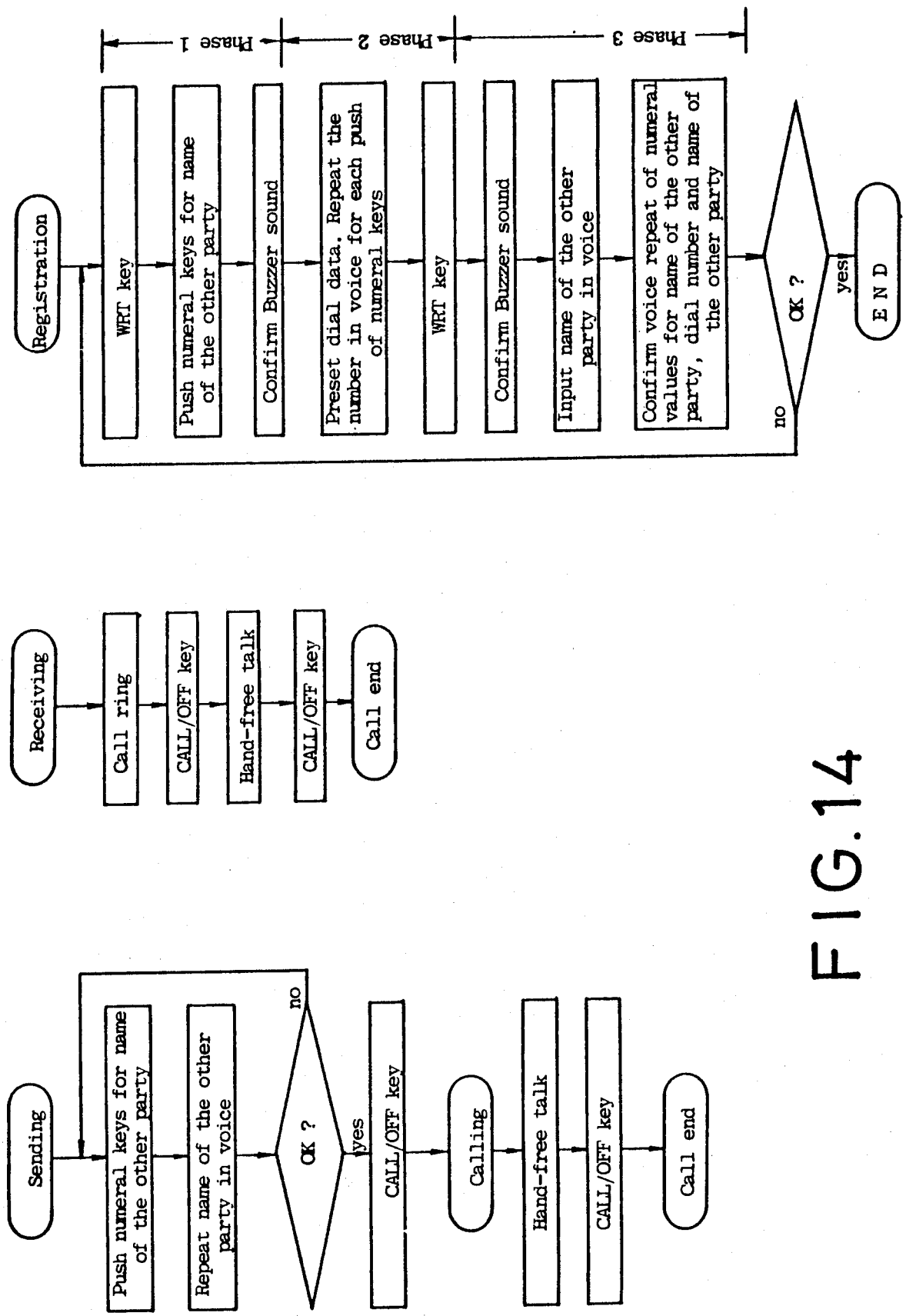
FIG. 14 is a schematic flow chart showing the sending, receiving and registering operation when a telephone call is made by a telephone set incorporated in the apparatus shown in FIG. 12.
Figure 15A:
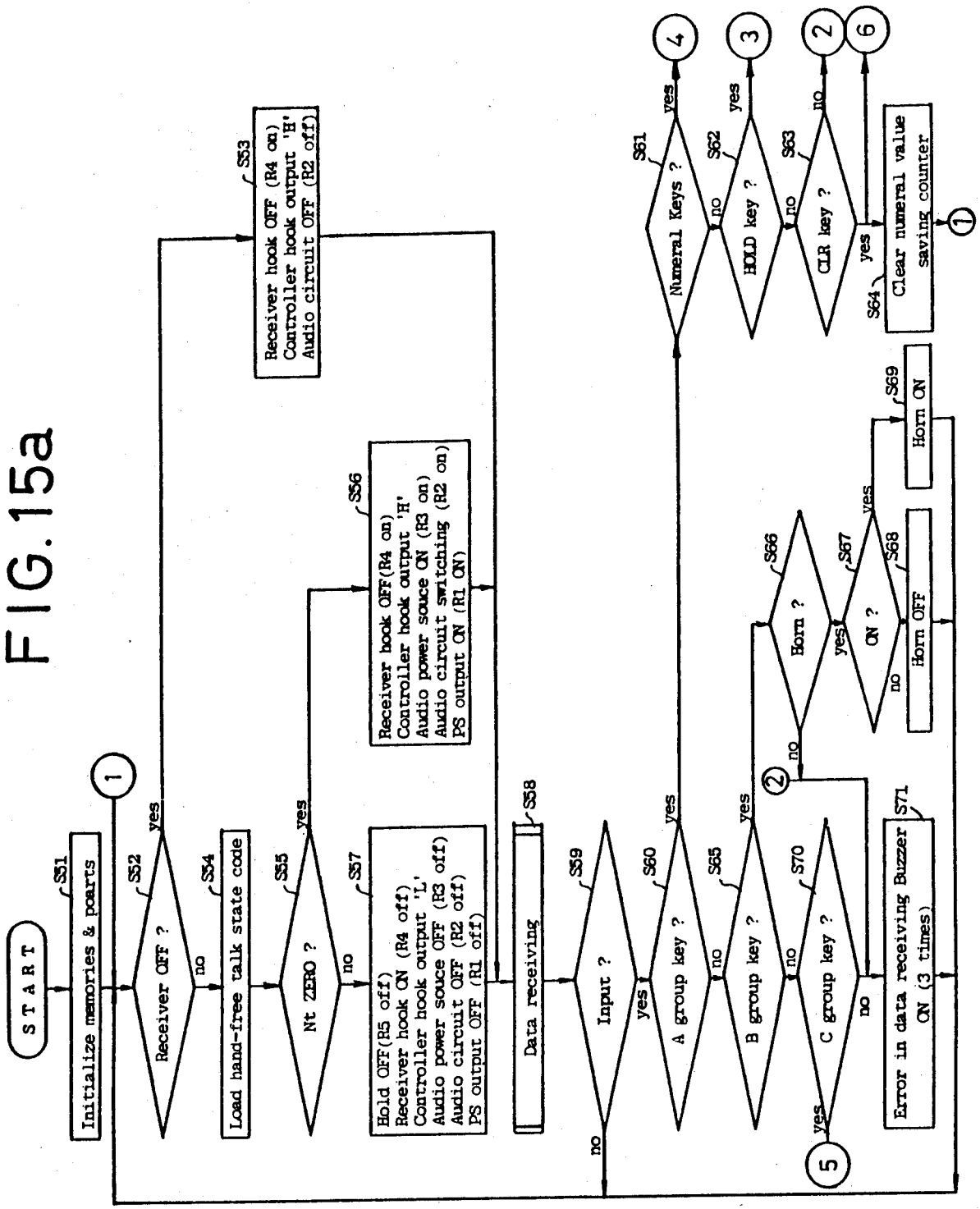
FIGS. 15a, 15b, 15c, 15d and 15e are flow charts showing the operation of the microcomputer 130 in FIG. 12.
Figure 15B:
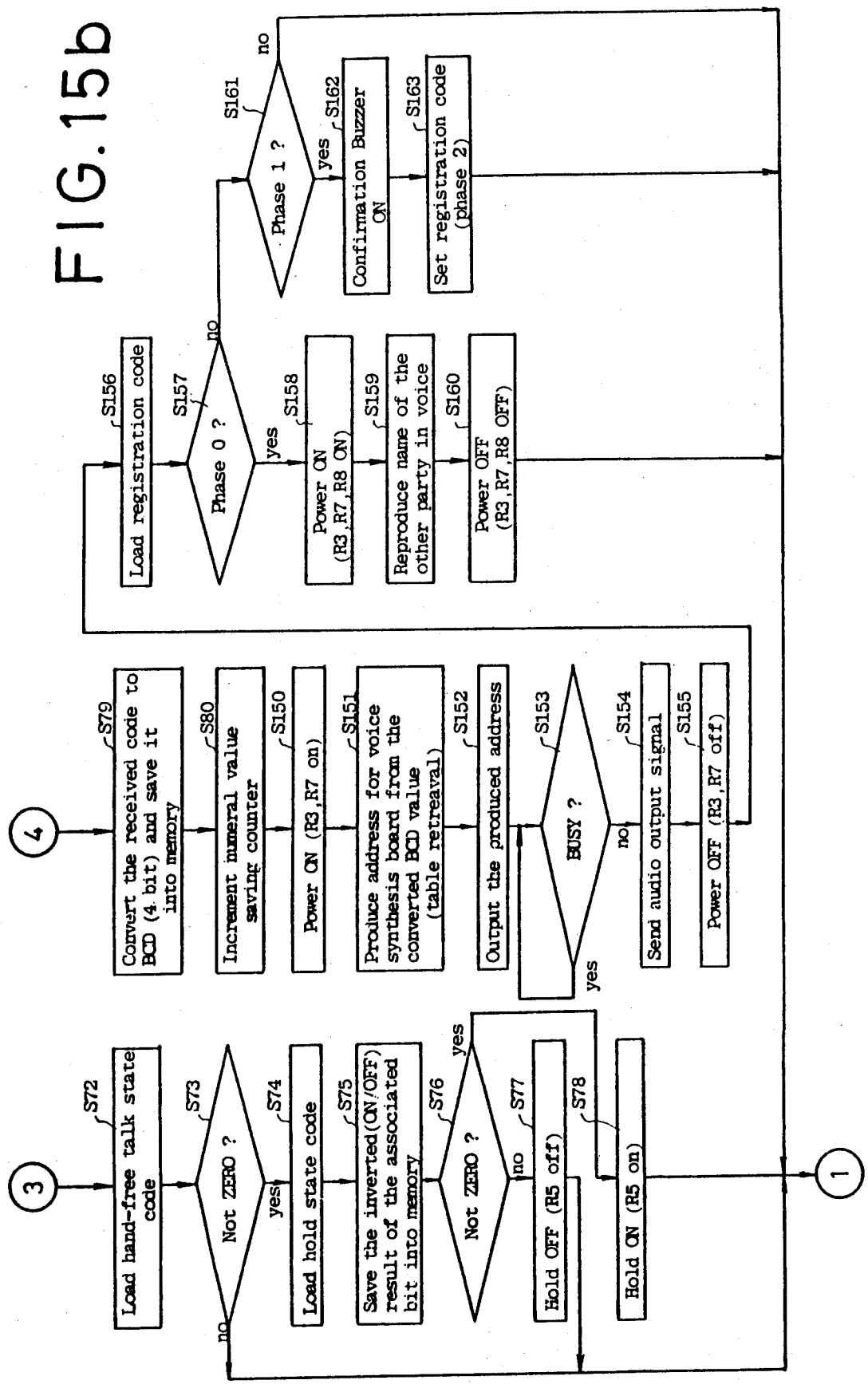
Figure 15C:
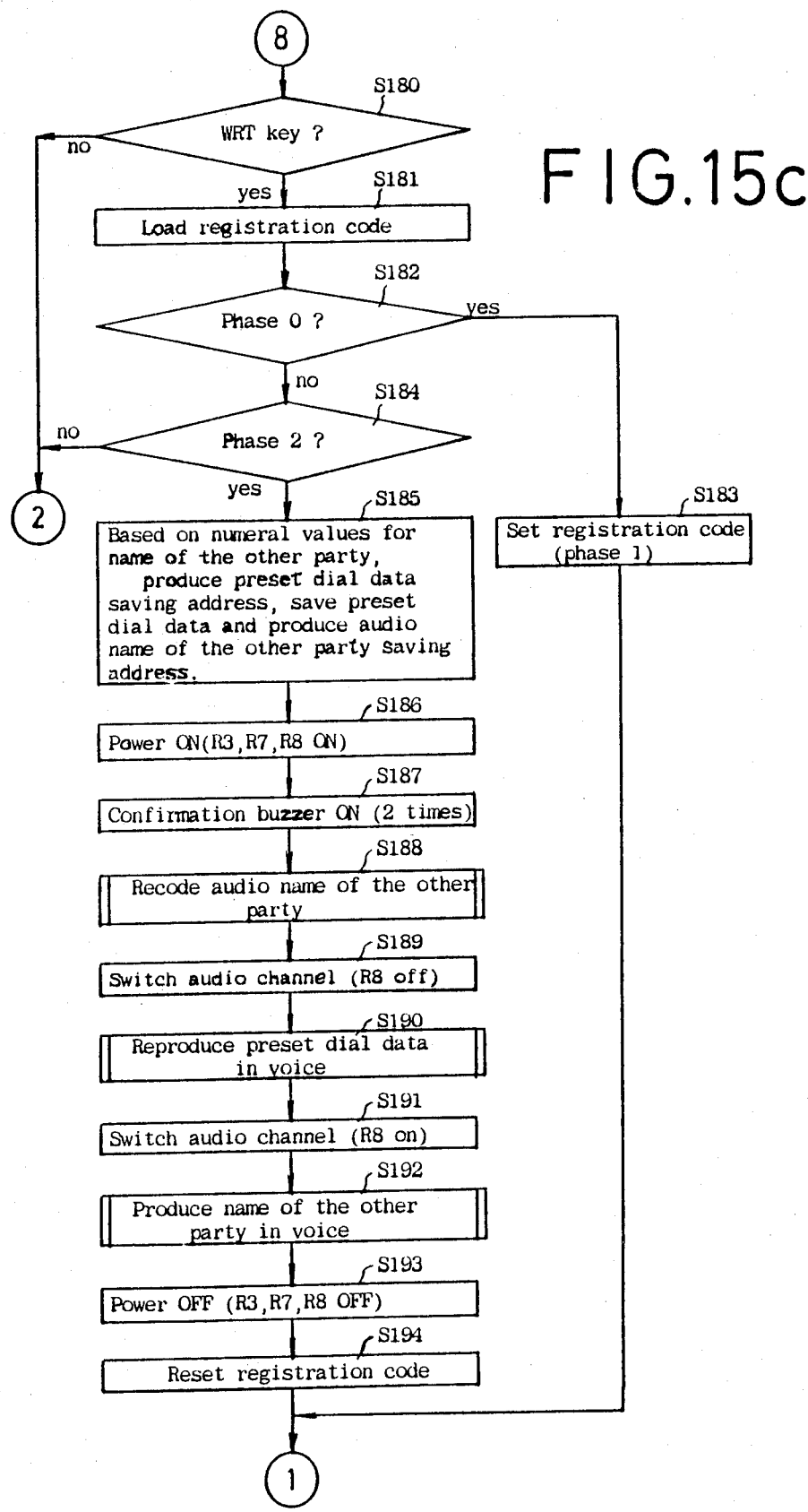
Figure 15D:
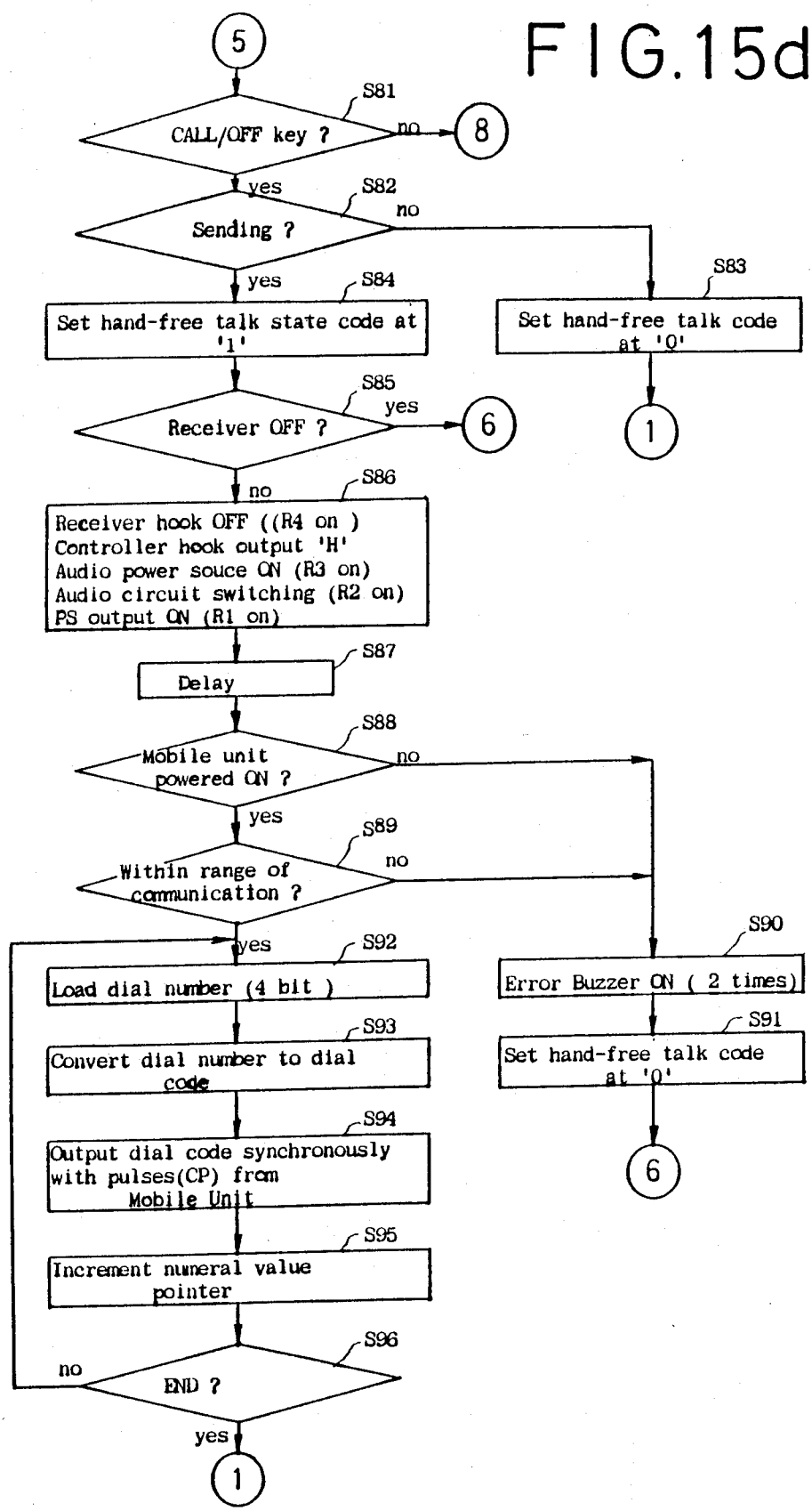
Figure 15E:
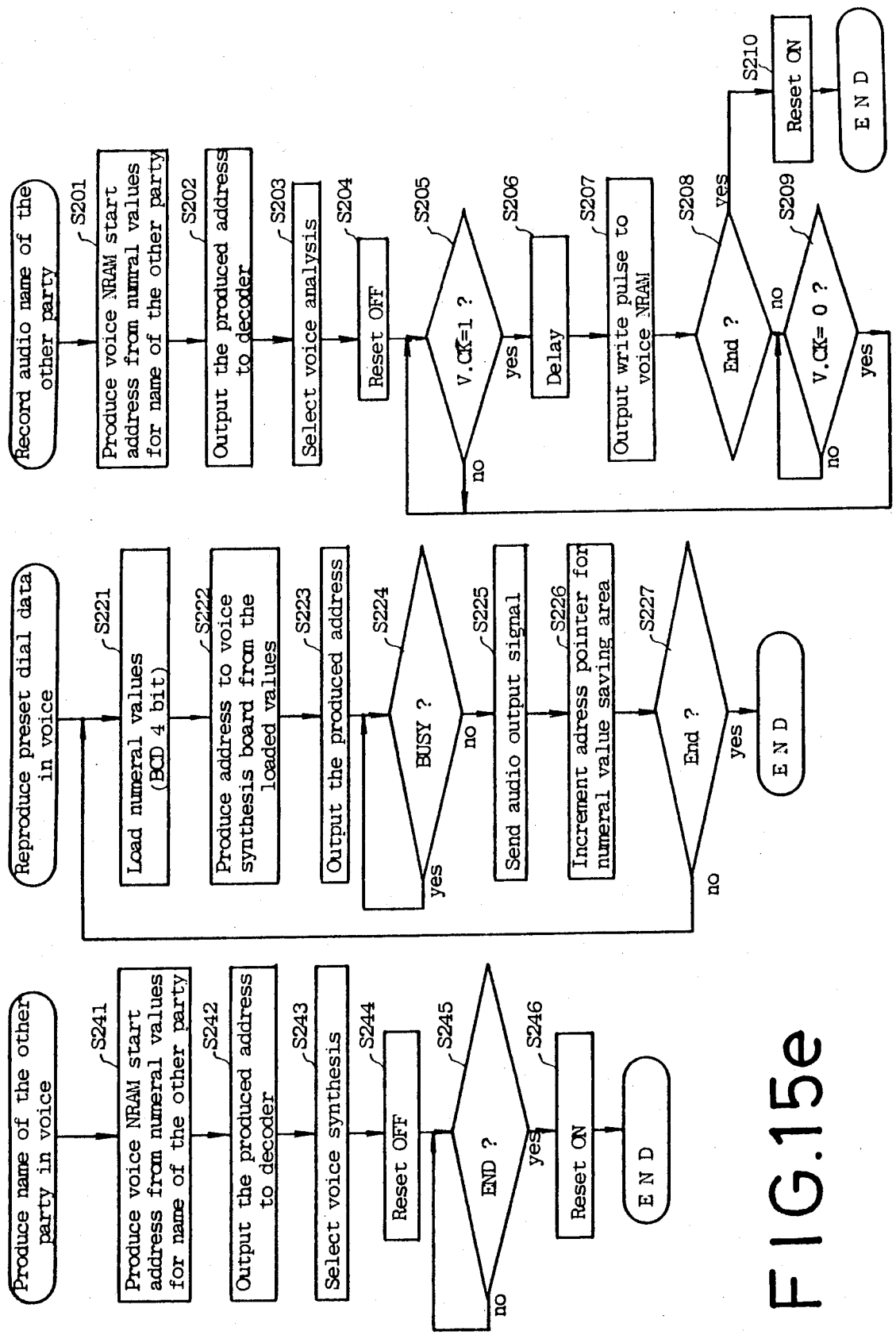

FIG. 14 shows schematically operation of the apparatus in case of actuating the load-vehicle telephone into the sending and receiving modes from the steering operation board, as well as operation of registering the shortened dial code and the audio data on the other party. The description will be now made by referring to FIG. 14.

Sending Operation

The telephone number of the other party is input using the numeral keys, * key and # key on the steering operation board. With this, the microcomputer stores the key-input telephone number. At the time of keying input, every time any one of the numeral keys 0 to 9 is operated, the microcomputer 130 commands the voice synthesis board VG1 to issue audio output, so that voices corresponding to the respective numerals, e.g., "4", "3" . . . , are issued from the speaker SP in accordance with the keys operated. Also, when the "registration" operation has been effected in advance, upon completion of dial keying input there informs the name of the other party or other data in voice in accordance with the input dial keys.

The microcomputer waits for operation of the call-off key CALL/OFF.

When the call-off key CALL/OFF is operated, the other party corresponding to the stored telephone number is called automatically. When the called party takes up the receiver (i.e., off the hook), the apparatus comes into the state permitting a hand-free talk. In this connection, with the hold key HOLD being operated, the relay R5 is actuated and the transmitter, namely, the microphones MC1 and MC2 on the steering wheel, is interrupted from the mobile unit TRX, whereby sending voices from the vehicle is stopped.

When the call-off key CALL/OFF is operated once again, this is judged as completion of a telephone call and communication is ended.

Receiving Operation

When the load-vehicle telephone set is called from the other party, there sounds a call ring.

It waits for operation of the call-off key CALL/OFF.

When the call-off key CALL/OFF is operated, the apparatus comes into the same state as where the receiver is being taken up in the normal case, so that voices of the other party are issued from the speaker SP and the microphones MC1 and MC2 on the steering operation board are connected to the road-vehicle telephone set as a transmitter. When the call-off key CALL/OFF is operated once again, this is judged as completion of a telephone call and communication is ended.

Registration Operation

Phase 0

It waits for operation of the write key WRT.

The telephone number of the other party to be registered is input by pushing the numeral keys.

There come buzzer sounds for confirmation.

Phase 1

The numeral values of the shortened dial code to be preset are input. At this time, there issue in voice the numeral values in accordance with the keys operated for each keying input.

It waits for operation of the write key WRT.

Phase 2

There come buzzer sounds for confirmation.

The name of the other party or other data to be registered is input in voice to the microphones MC1 and MC2 on the steering operation board.

For confirmation, the telephone number of the other party, the numeral values of the shortened dial code, the name of the other party, etc. to be registered are output in voice sequentially.

It is checked whether the output content may be directly registered or not. If correction is required, operation returns to the Phase 0.

FIGS. 15a, 15b, 15c, 15d and 15e show operation of the apparatus on the vehicle body as shown in FIG. 12. Its operation steps will be now described in order by referring to FIGS. 15a, 15b, 15c, 15d and 15e.

S51. The content of the memory is initialized and the state of each output port of the microcomputer 130 is set at the initial level. With this processing, the output port P12 assumes a low level L, so that output of the FSK signal is inhibited.

S52. It is checked whether the receiver of the telephone set TEL is off or not.

S53. Since the receiver of the telephone set TEL is off, a high level H is issued at the output port HK20 to turn the relay R4 ON, H is issued at the output port HK10, and a low level L is issued at the output port Audio thereby to set the relays R2 and R3 (RL2) OFF. Upon this, the telephone set TEL becomes usable to be operated in the same manner as that of the normal road-vehicle telephone set.

S54. The content of the memory storing the command of hand-free talk from the steering wheel operation board is loaded.

S55. It is checked whether there exists the command of hand-free talk or not. In the initial state, the flow is forwarded to the step S57 because a hand-free talk is not commanded. But, when the call-off key CALL/OFF on the steering wheel operation board is set ON (CALL), it is forwarded to the step S56 by the presence of the command of hand-free talk.

S56. A high level H is issued at the output port HK20 to turn the relay R4 ON, H is set at the output port HK10, H is set at the output port Audio to turn the relays R2 and R3 (RL2) ON, and a low level L is issued at the output port PS to turn the relay R1 ON. Upon this, both telephone unit TEL and the mobile unit TRX are powered-on, the power source of the FM demodulation circuit 170 is turned ON, and the amplifier AMP is connected to the voice receiving line of the mobile unit TRX.

S57. A low level L is issued at the output port HOLD to turn the relay R5 OFF, L is issued at the output port HK20 to turn the relay R4 OFF, L is set at the output port HK10, L is issued at the output port Audio to turn the relays R2 and R3 (RL2) OFF, and a high level H is issued at the output port PS to set the relay R1 OFF. Upon this, the power sources of the telephone set TEL, the mobile unit TRX and the FM demodulation circuit 170 are turned OFF, and the telephone set TEL is connected to the mobile unit TRX.

S58. The data from the steering operation board is received. This will be described later in more detail.

S59. It is judged whether data transmission generated by keying operation on the steering operation board has come or not actually from the steering operation board.

S60. It is judged whether the transmitted data corresponds to the key code of the group A or not.

S61. It is judged whether the key code corresponds to the numeral keys, * key or # key or not.

S62. It is judged whether the key code corresponds to the hold key HOLD or not.

S63. It is judged whether the key code corresponds to the clear key CLR or not.

S64. The address counter of the memory for storing the key codes corresponding to the numeral keys which have been transmitted until that time, is cleared. Namely, the numeral keying inputs until that time are cancelled.

S65. It is judged whether the key code corresponds to the group B or not.

S66. It is judged whether the key code corresponds to the horn keys HS1 and HS2 or not.

S67. Does the key code correspond to key switch-on?

S68. Since the horn key is pulled, the horn is set OFF.

S69. Since the horn key is pushed, the horn is set ON.

S70. It is checked whether the key code corresponds to the group C or not.

S71. Since the key code received as data does not correspond to any one of the groups A, B and C, this is processed as an error in data receiving and the buzzer BZ is buzzed three times.

S72. The content of the memory for storing the command of hand-free talk from the steering operation board is loaded.

S73. It is checked whether the data loaded in the step S72 commands a hand-free talk or not.

S74. The content of the memory for storing the command from the hold key HOLD is loaded.

S75. The data state of 1/0 (i.e., ON/OFF) loaded in the step S74 is inverted and then stored in the original memory. Thus, if there has been no hold command in advance, the predetermined bit of the data is set at "1", i.e., the hold-on command.

S76. It is checked whether there is the hold-on command or not.

S77. Since hold-off is commanded, L is issued at the output port HOLD to set the relay R5 OFF. Upon this, the signal output terminal of the FM demodulation circuit 170 is connected to the sending voice input terminal T of the mobile unit TRX, whereby it becomes possible to talk through the microcphones MC1 and MC2 on the steering wheel.

S78. Since hold-on is commanded, H is issued at the output port HOLD to set the relay R5 ON. Upon this, the output terminal of the FM demodulation circuit 170 is disconnected from the mobile unit TRX.

S79. Since the key code corresponding to the numeral keys has come, the code is converted to the BCD (Binary Coded Decimal) code in accordance with the numeral values of the pushed numeral keys and then stored in the memory at the predetermined address.

S80. The content of the counter specifying the memory address which stores the BCD code corresponding to the numeral keys therein is incremented.

S150. Both relays R3 and R7 are turned ON, so that the voice synthesis board 190 is powered-on and the signal output terminal OUT of the voice synthesis board 190 is connected to the input port of the power amplifier PA.

S151. With reference to a BCD/voice-code address conversion table in the ROM, address of the voice code to be output to the voice synthesis board 190 is produced based on the BCD code corresponding to the numeral keys which was attained in the step S79.

S152. The address code attained in the step S151 is sent to the voice synthesis board 190.

S153. A level of the signal line BUSY leading from the voice synthesis board 190 is checked. Then, it waits until the signal line becomes free of the BUSY state (i.e., sate incapable of receiving the audio output command).

S154. The signal line SD is set at an audio output command level. Upon this, the voice synthesis board 190 reads the audio data in accordance with the specified address and converts it into an analog audio signal which is issued at the output terminal OUT.

S155. Both relays R3 and R7 are turned OFF, so that the power source of the voice synthesis board 190 is turned OFF and the input terminal of the power amplifier PA is connected to the output terminal of the amplifier AM2.

S156. The registration code corresponding to the key-input numeral values is loaded.

S157. It is checked whether the loaded code corresponds to the Phase 0 (or others except for the phases of registration operation) or not.

S158. Relays R3, R7 and R8 are set ON, so that the respective associated circuits are powered-on and the output terminal of the amplifier AM3 is connected to the input terminal of the power amplifier PA.

S159. The name of the other party corresponding to the registration code which has been registered in advance, is issued in voice. This will be described later in detail.

S160. Since the name of the other party has been issued completely, the relays R3, R7 and R8 are set OFF to power-off the respective associated circuits.

S161. It is checked whether the loaded code indicates the Phase 1 or not.

S162. Since it indicates Phase 1, the buzzer is buzzed for a predetermined time for confirmation.

S163. Since the Phase 1 has been completed, the present registration code is set and the flow is forwarded to the Phase 2.

S180. It is checked whether the key code corresponds to the write key WRT or not.

S181. Since the write key WRT has been operated, the specified registration code is loaded.

S182. It is checked whether the loaded code indicates the Phase 0.

S183. Since the write key WRT has been operated in the Phase 0, the present registration code is set and the flow is forwarded to the Phase 1.

S184. It is checked whether the loaded code indicates the Phase 2 or not.

S185. Since the write key WRT has been operated in the Phase 2, it is forwarded to the Phase 3. The address for saving the preset dial data is first produced based on the set numeral values of the other party, the preset dial data is saved (stored) in the produced address, and then the memory address where the audio data on the other party is to be registered is produced.

S186. The relays R3, R7 and R8 are set ON, so that the associated circuits are powered-on, the output terminal of the amplifier AM3 (i.e., output terminal of an audio signal on the name of the other party) is connected to the input terminal of the power amplifier PA, and the output terminal of the FM demodulation circuit 170 is connected to the input terminal VIN of the analog/digital signal converter ADC.

S187. The buzzer is buzzed two times for confirmation.

S188. The audio data on the name of the other party is input and registered. This will be described later in detail.

S189. The relay R8 is set OFF, so that the audio signal output port OUT of the voice synthesis board VG1 is switched to be connected to the input terminal of the power amplifier PA.

S190. The numeral values of the shortened dial code to be registered is issued in voice. This will be described later in detail.

S191. The relay R8 is set ON, so that the output terminal of the amplifier AM3 is switched to be connected to the input terminal of the power amplifier PA.

S192. The input audio data of the other party is reproduced and issued for confirmation. This will be described later in detail.

S193. The relays R3, R7 and R8 are set OFF to power-off the respective associated circuits.

S194. The registration code is cleared.

S81. It is checked whether the key code coming from the steering operation board indicates operation of the call-off key CALL/OFF or not.

S82. It is judged whether the key code indicates the ON (CALL) state of the call-off key or not.

S83. Since the call-off key is set OFF, the content of the memory for storing the command of hand-free talk is set 0 (hand-free talk OFF).

S84. Since the call-off key is set CALL, the content of the memory for storing the command of hand-free talk is set "1" (hand-free talk ON).

S85. It is checked whether the receiver of the telephone set TEL is taken off or not.

S86. H is issued at the output port HK20 to turn the relay R4 ON, H is set at the output port HK10, H is issued at the output port Audio to turn both relays R2 and R3 (RL2) ON, and L is issued at the output port PS to set the relay R1 ON. Upon this, the power sources of both telephone set TEL and mobile unit TRX are turned ON, the power source of the FM demodulation circuit 170 is turned ON, and the amplifier AMP is connected to the voice receiving line of the mobile unit TRX.

S87. It waits for a given time allowing actuation of the relays as well as allowing the mobile unit to come into the predetermined operation state from power-on.

S88. It is checked whether the mobile unit TRX is powered-on or not.

S89. It is checked whether the vehicle locates in an area permitting communication or not (i.e., whether the transmitted wave can reach the other party or not). This is judged by checking whether the output terminal CI of TRX indicates a call enable level or not.

S90. Since there occurs any trouble or the vehicle locates in an area disabling communication, the buzzer BZ is buzzed two times to inform the driver of error occurrence.

S91. The content of the memory for storing the command of hand-free talk is set "0" (hand-free talk off).

S92. The content of the memory for storing the 4-bit BCD code corresponding to the numeral values input by the numeral keys is read out from the address specified by the numeral pointer (address counter) and then loaded in the predetermined register.

S93. The BCD code obtained in the step S92 is converted into the same code as the dial code produced by the telephone set TEL.

S94. The dial code obtained in the step S93 is output to the DI terminal sequentially in synchronous relation with a pulse signal issued from the CP terminal of the mobile unit TRX.

S95. The value of the numeral pointer is incremented.

S96. It is checked whether all of the BCD codes are completely read out of the memory or not. This is judged by checking the value of the numeral pointer. If not completed, the flow returns to the step S92 to read out the BCD code from the next numeral pointer.

There will be now described the subroutine for voice recording of the name of the other party in the step S188.

S201. The address of the voice memory starting to store the data from the input numeral values on the other party is produced. This address corresponds to that which one of 16 units of the voice memories RAM1 is selected.

S202. The data obtained in S201 is output to the decoder DE. Herein, if the data is 0, a memory selection signal is issued at an output terminal So of the decoder DE1.

S203. A signal is applied to the analysis/synthesis input terminal of the integrated circuit VG2 to select a voice analysis function.

S204. The output port P20 is set at a predetermined level to release the respective associated circuits from the reset state.

S205. It waits for that an output terminal V·CK of the integrated circuit VG2 becomes "1" (i.e., high level H).

S206. It waits for a predetermined time.

S207. A write pulse is output to the voice memory RAM1. Upon this, the data analyzed and encoded is written into the predetermined address of the voice memory RAM1.

S208. It is checked whether the data has been completely written into all the addresses of the selected voice memory.

S209. It waits for that the output terminal V·CK of the integrated circuit VG2 becomes "0".

S210. The port P20 is set at a reset level.

There will be now described the subroutine for voice reproduction of the preset dial data the step S190.

S221. The BCD code of the shortened dial code is loaded.

S222. With reference to the table, the address of the numeral value audio output data is produced from the BCD code obtained in the step S221.

S223. The address data obtained in S222 is output to the voice synthesis board VG1.

S224. It waits for that the BUSY line of VG1 becomes a signal receipt enable level.

S225. An audio output signal is sent out to the SD line.

S226. The content of the memory (pointer) specifying the address from which the preset data is to be read out, is incremented.

S227. The content of the memory specifying the preset data reading-out address is checked to know whether all the data have been read out completely.

There will be now described the subroutine for voice reproduction of the name of the other party in the step S192.

S241. The data indicating which one unit of the voice memories RAM1 is to be selected, is produced from the input numeral values on the other party.

S242. The data obtained in S241 is output to the decoder DE1.

S243. A voice synthesis function selecting signal is applied to the analysis/synthesis input terminal of the integrated circuit VG2.

S244. The output port P20 is set at a reset-off level.

S245. All the data from the specified voice memory RAM1 are read out and then it waits for that the audio signal has been output completely.

S246. The output port P20 is set at a reset level.

Figure 16:
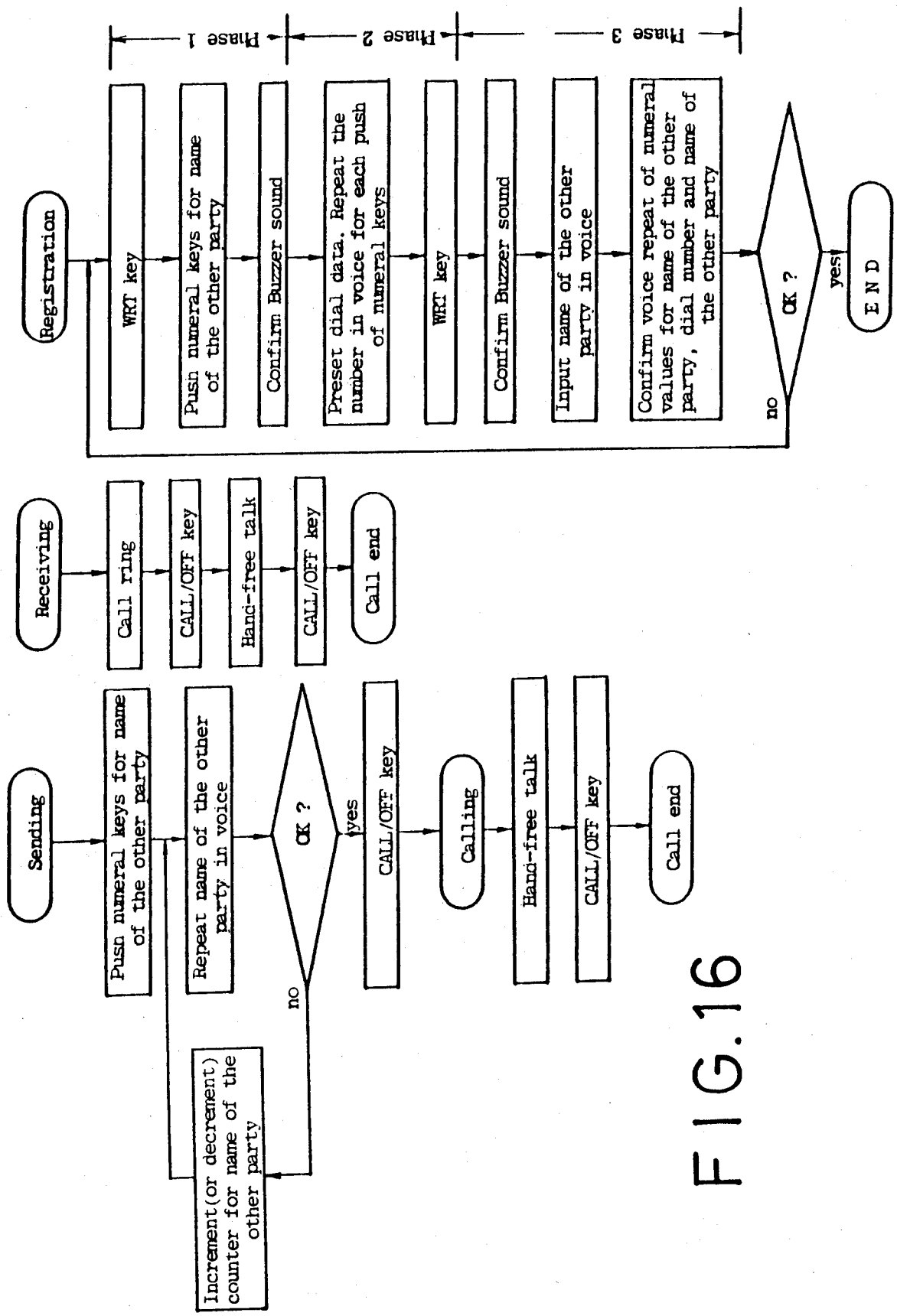
FIG. 16 is a schematic flow chart showing the sending, receiving and registering operation in still another embodiment of this invention.
Figure 17A:
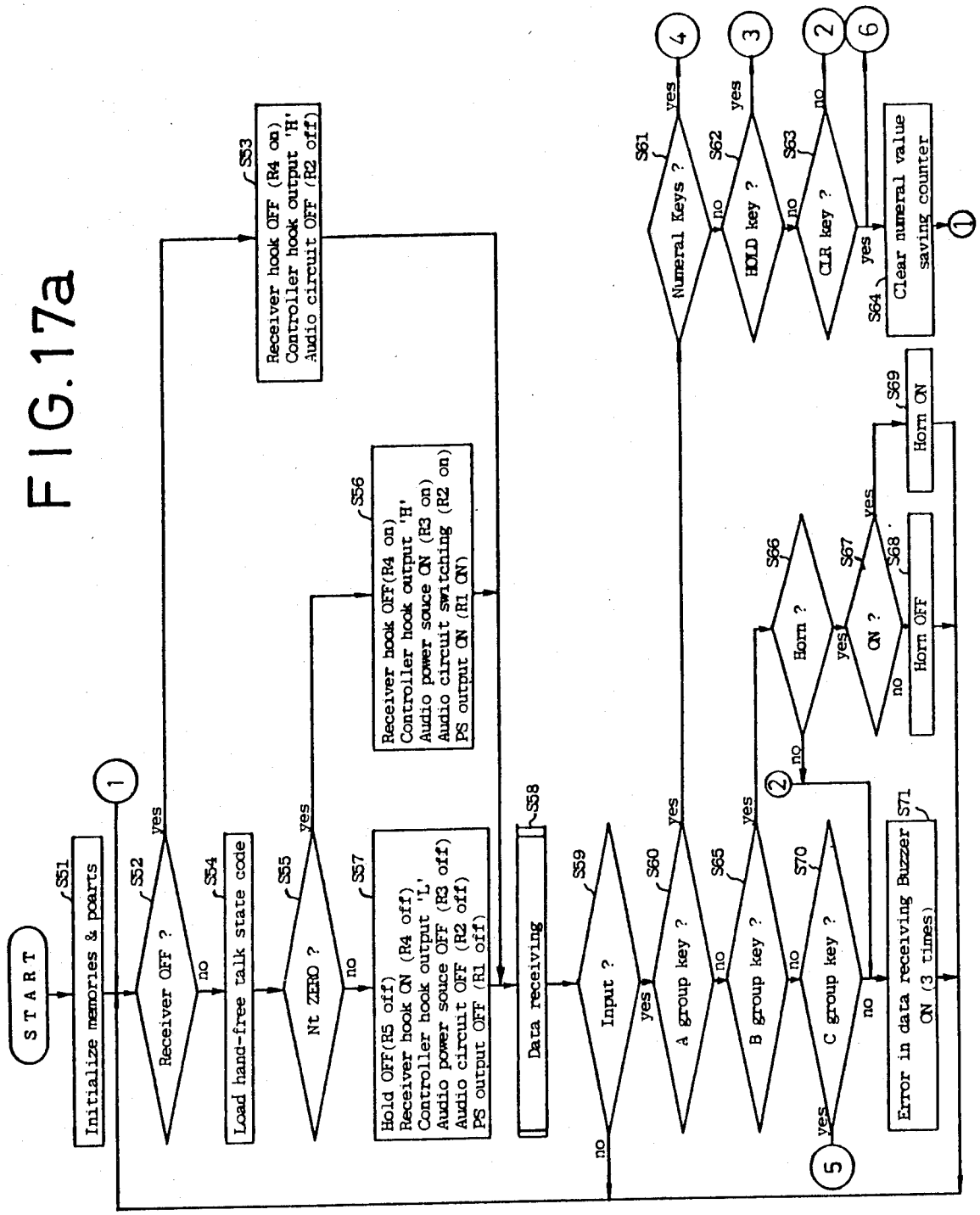
Figure 17B:
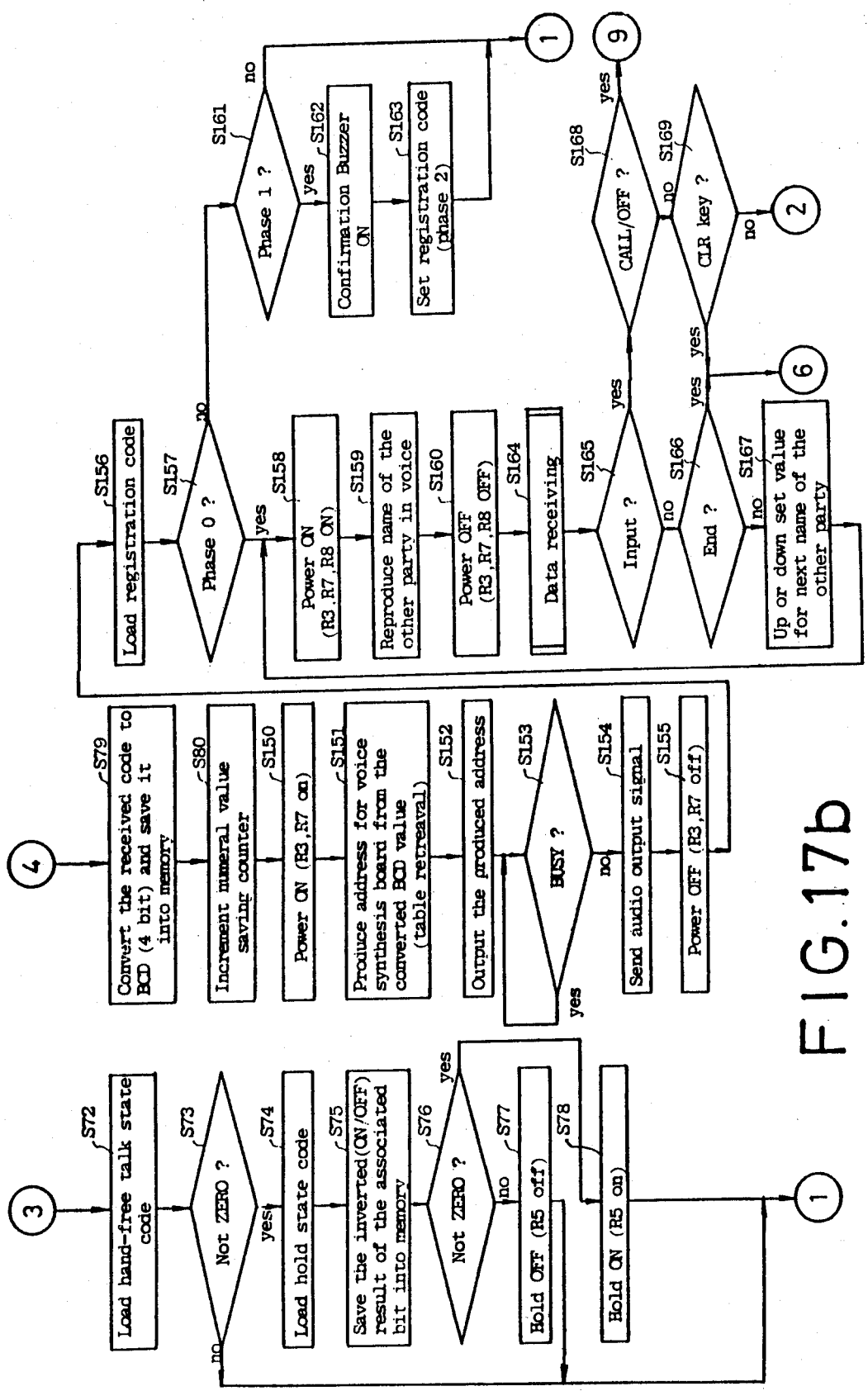
Figure 17E:
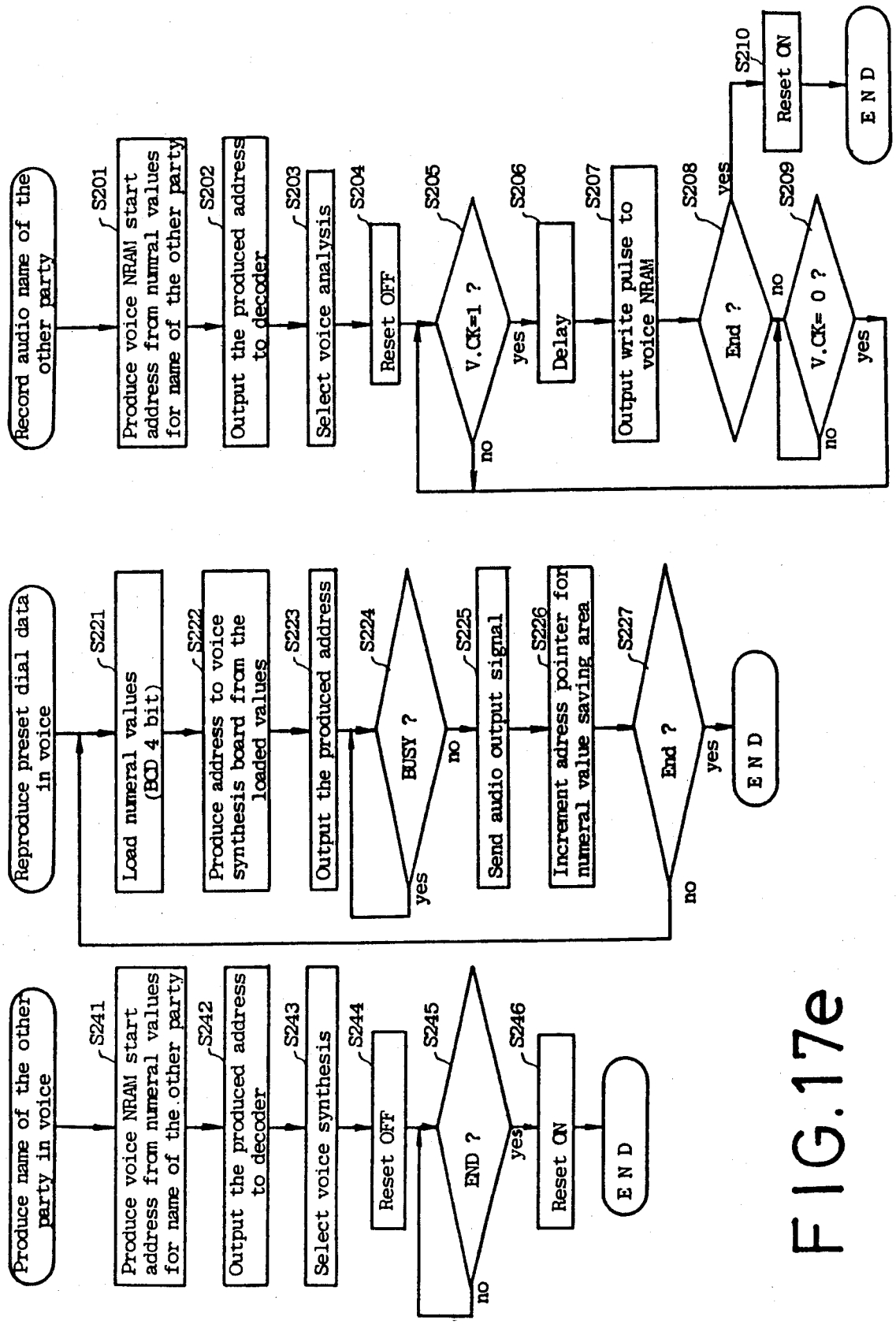

Hereinafter there will be described still another embodiment of this invention. FIG. 16 shows schematically operation of the apparatus in case of actuating the road-vehicle telephone into the sending and receiving modes from the steering operation board, as well as operation of registering the shortened dial code and the voice data on the other party. The description will be now made by referring to FIG. 16.

Sending Operation

The telephone number of the other party is input using the numeral keys, * key and # key on the steering wheel operation board. With this, the microcomputer stores the key-input telephone number. At the time of keying input, every when any one of the numeral keys 0 to 9 is operated, the microcomputer 130 commands the voice synthesis board VG1 to issue audio output, so that voices corresponding to the respective numerals, e.g., "4", "3" . . . , are issued from the speaker SP in accordance with the keys operated. Also, when the "registration" operation has been effected in advance, upon completion of dial keying input there informs the name of the other party of other data in voice in accordance with the input dial keys.

It is confirmed whether the informed name of the other party is the desired one or not.

If the dial code is erroneous one, the content of the counter (register) for holding the input dial code is incremented (or decremented), thereby to inform another name of the other party in voice corresponding to the updated dial code once again.

The microcomputer waits for operation of the call-off key CALL/OFF.

When the call-off key CALL/OFF is operated, the other party corresponding to the stored telephone number is called automatically. When the called party takes up the receiver (i.e., off the hook), the apparatus comes into the state permitting a hand-free talk. In this connection, with the hold key HOLD being operated, the relay R5 is actuated and the transmitter, namely, the microphones MC1 and MC2 on the steering wheel, is interrupted from the mobile unit TRX, whereby sending voices from the vehicle is stopped.

When the call-off key CALL/OFF is operated once again, this judged as completion of a telephone call and communication is ended.

Receiving Operation

When the road-vehicle telephone set is called from the other party, there sounds a call ring.

It waits for operation of the call-of key CALL/OFF.

When the call-off key CALL/OFF is operated, the apparatus comes into the same state as where the receiver is being taken up in the normal case, so that voices of the other party are issued from the speaker SP and the microphones MC1 and MC2 on the steering operation board are connected to the road-vehicle telephone set as a transmitter. When the call-off key CALL/OFF is operated once again, this is judged as completion of a telephone call and communication is ended.

Registration Operation

Phase 1

It waits for operation of the write key WRT.

The telephone number of the other party to be registered is input by pushing the numeral keys.

There come buzzer sounds for confirmation.

Phase 2

The numeral values of the shortened dial code to be preset are input. At this time, there issue in voice the numeral values in accordance with the keys operated for each keying input.

It waits for operation of the write key WRT.

Phase 3.

There come buzzer sounds for confirmation.

The name of the other party or other data to be registered is input in voice to the microphones MC1 and MC2 on the steering operation board.

For confirmation, the telephone number of the other party, the numeral values of the shortened dial cide, the name of the other party, etc. to be registered are output in voice sequentially.

It is checked whether the output content may be directly registered or not. If correction is required, operation returns to the Phase 0.

FIGS. 17a, 17b, 17c, 17d and 17e show operation of the apparatus on the vehicle body. Its operation steps will be now described in order by referring to FIGS. 17a, 17b, 17c, 17d and 17e.

S51. The content of the memory is initialized and the state of each output port of the microcomputer 130 is set at the initial level. With this processing, the output port P12 assumes a low level L, so that output of the FSK signal is inhibited.

S52. It is checked whether the receiver of the telephone set TEL is off or not.

S53. Since the receiver of the telephone set TEL is off, a high level H is issued at the output port HK20 to turn the relay R4 ON, H is issued at the output port HK10, and a low level L is issued at the output port Audio thereby to set the relays R2 and R3 (RL2) OFF. Upon this, the telephone set TEL becomes usable to be operated in the same manner as that of the normal road-vehicle telephone set.

S54. The content of the memory storing the command of hand-free talk from the steering wheel operation board is loaded.

S55. It is checked whether there exists the command of hand-free talk or not. In the initial state, the flow is forwarded to the step S57 because a hand-free talk is not commanded. But, when the call-off key CALL/OFF on the steering wheel operation board is set ON (CALL), it is forwarded to the step S56 by the presence of the command of hand-free talk.

S56. A high level H is issued at the output pot HK20 to turn the relay R4 ON, H is set at the output port HK10, H is set at the output port Audio to turn the relays R2 and R3 (RL2) ON, and a low level L is issued at the output port PS to turn the relay R1 ON. Upon this, both telephone unit TEL and the mobile unit TRX are powered-on, the source of the FM demodulation circuit 170 is turned ON, and the amplifier AMP is connected to the voice receiving line of the mobile unit TRX.

S57. A low level L is issued at the output port HOLD to turn the relay R5 OFF, L is issued at the output port HK20 to turn the relay R4 OFF, L is set at the output port HK10, L is issued at the output port Audio to turn the relays R2 and R3 (RL2) OFF, and a high level H is issued at the output port PS to set the relay R1 OFF. Upon this, the power sources of the telephone set TEL, the mobile unit TRX and the FM demodulation circuit 170 are turned OFF, and the telephone set TEL is connected to the mobile unit TRX.

S58. The data from the steering operation board is received. This will be described later in more detail.

S59. It is judged whether data transmission generated by keying operation on the steering operation board has come or not actually from the steering operation board.

S60. It is judged whether the transmitted data corresponds to the key code of the group A or not.

S61. It is judged whether the key code corresponds to the numeral keys, * key or # key or not.

S62. It is judged whether the key code corresponds to the hold key HOLD or not.

S63. It is judged whether the key code corresponds to the clear key CLR or not.

S64. The address counter of the memory for storing the key codes corresponding to the numeral keys which have been transmitted until that time, is cleared. Namely, the numeral keying inputs until that time are cancelled.

S65. It is judged whether the key code corresponds to the group B or not.

S66. It is judged whether the key code corresponds to the horn keys HS1 and HS2 or not.

S67. Does the key code correspond to key switch-on?

S68. Since the horn key is pulled, the horn is set OFF.

S69. Since the horn key is pushed, the horn is set ON.

S70. It is checked whether the key code corresponds to the group C or not.

S71. Since the key code received as data does not correspond to any one of the groups A, B and C, this is processed as an error in data receiving and the buzzer BZ is buzzed three times.

S72. The content of the memory for storing the command of hand-free talk from the steering operation board is loaded.

S73. It is checked whether the data loaded in the step S72 commands a hand-free talk or not.

S74. The content of the memory for storing the command from the hold key HOLD is loaded.

S75. The data state of 1/0 (i.e., ON/OFF) loaded in the step S74 is inverted and then stored in the original memory. Thus, if there has been no hold command in advance, the predetermined bit of the data is set at "1", i.e., the hold-on command.

S76. It is checked whether there is the hold-on command or not.

S77. Since hold-off is commanded, L is issued at the output port HOLD to set the relay R5 OFF. Upon this, the signal output terminal of the FM demodulation circuit 170 is connected to the sending voice input terminal T of the mobile unit TRX, whereby it becomes possible to make a talk through the microphones MC1 and MC2 on the steering wheel.

S78. Since hold-on is commanded, H is issued at the output port HOLD to set the relay R5 ON. Upon this, the output terminal of the FM demodulation circuit 170 is disconnected from the mobile unit TRX.

S79. Since the key code corresponding to the numeral keys has come, the code is converted to the BCD (Binary Coded Decimal) code in accordance with the numeral values of the pushed numeral keys and then stored in the memory at the predetermined address.

S80. The content of the counter specifying the memory address which stores the BCD code corresponding to the numeral keys therein is incremented.

S150. Both relays R3 and R7 are turned ON, so that the voice synthesis board 190 is powered-on and the signal output terminal OUT of the voice synthesis board 190 is connected to the input port of the power amplifier PA.

S151. With reference to a BCD/voice-code address conversion table in the ROM, address of the voice code to be output to the voice synthesis board 190 is produced based on the BCD code corresponding to the numeral keys which was attained in the step S79.

S152. The address code attained in the step S151 is sent to the voice synthesis board 190.

S153. A level of the signal line BUSY leading from the voice synthesis board 190 is checked. Then, it waits until the signal line becomes free of the BUSY state (i.e., state incapable of receiving the audio output command).

S154. The signal line SD is set at an audio output command level. Upon this, the voice synthesis board 190 reads the audio data in accordance with the specified address and converts it into an analog audio signal which is issued at the output terminal OUT.

S155. Both relays R3 and R7 are turned OFF, so that the power source of the voice synthesis board 190 is turned OFF and the input terminal of the power amplifier PA is connected to the output terminal of the amplifier AM2.

S156. The registration code corresponding to the key-input numeral values is loaded.

S157. It is checked whether the loaded code corresponds to the Phase 0 (or others except for the phases of registration operation) or not.

S158. Relays R3, R7 and R8 are set ON, so that respective associated circuits are powered-on and the output terminal of the amplifier AM3 is connected to the input terminal of the power amplifier PA.

S159. The name of the other party corresponding to the registration code which has been registered in advance, is issued in voice. This will be described later in detail.

S160. Since the name of the other party has been issued completely, the relays R3, R7 and R8 are set OFF to power-off the respective associated circuits.

S161. It is checked whether the loaded code indicates the Phase 1 or not.

S162. Since it indicates Phase 1, the buzzer is buzzed for a predetermined time for confirmation.

S163. Since the Phase 1 has been complete the present registration code is set and the flow is forwarded to the Phase 2.

S164. To detect the subsequent key operation, data receiving operation is effected for a predetermined time.

S165. It is checked whether there exists keying input or not.

S166. It is checked whether the set dial code corresponds to the upper limit value (or lower limit value) or not.

S167. Since there has not been key operation (CALL) for confirmation of the other party within a predetermined time, the dial code is updated to the larger (or smaller) value sequentially until the dial code reach the upper limit value (or lower limit value).

S168. It is checked whether the operated key is the call-off key CALL-OFF or not. If it is CALL/OFF, the flow comes into the step S82 where the other party corresponding to the set dial code is called.

S169. It is checked whether the operated key is the clear key CLR or not.

S180 through S194, S81 through S96, S201 through S210 and S221 through S246 are identical to the FIGS. 15a, 15b, 15c, 15d and 15e.

Although the above-mentioned embodiment was arranged that the dial code is updated unless there comes key operation for confirmation within a predetermined time after dial operation, it may be also arranged that there is provided another one key and the dial code is updated immediately upon operation of another key. There may be further provided a switch adapted to specify an increase or decrease in the numeral values of the dial code at the time of updating. Moreover, in the above-mentioned embodiment a means for storing the data on the other party is composed of a read/write memory and the user can register the data on the other party in voice optionally, it may be also possible that a ROM is employed which has stored the desired data in advance with a syllable being as a unit and the voice data is compiled in terms of a syllable unit, thereby to synthesize voices. As an alternative, such a ROM may be employed which has stored the voice data in advance with a combination of phonemes being as a unit.

According to this invention, as fully described in the above, since there produces an answer-back in voice in accordance with keying input, it becomes possible to surely prevent erroneous dialing due to mistake in key operation or so, and further to perform dial operation of the road-vehicle telephone free from anxiety without a need of looking at the keys.

Having now fully set forth both structure and operation of preferred embodiment of the concept upderlying the present invention, various other embodiments as well as certain variations and modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What we claim is:

1. A road-vehicle telephone apparatus comprising:
   a steering operation board composed of a dial key switches, a hook key switch, a first modulation means, and a first control means for applying a signal in accordance with key switch operation to said first modulation means, all these parts being equipped on or near a steering wheel;
   a stationary control unit composed of a first demodulation means adapted to demodulate the signal from said first modulation means, a mobile telephone unit, a voice synthesis unit for generating voices, and a second control means which judges switch operation made on said steering operation board based on a signal demodulated by said first demodulation means, which applies a dial signal in accordance with the switch operation to said mobile telephone unit, and which commands said voice synthesis unit to generate voices in accordance with the switch operation, said control unit being equipped at a fixed position on the vehicle body mechanically separated from said steering operation board; and
   a signal transmission means for connecting said steering operation board and said stationary control unit through at least one of electrical, optical and magnetic means.

2. A road-vehicle telephone apparatus according to claim 1, wherein said voice synthesis unit includes a means wherein said voice synthesis unit includes a means adapted to issue at least the numeral values 0, 1, 2, 3, 4, 5, 6, 7, 8 and 9 in voice, and said second control means commands said voice synthesis unit to issue the numeral values in voice in accordance with the dial key switches operated.

3. A road-vehicle telephone apparatus according to claim 1, wherein said steering operation board includes a repeat key switch, and upon detecting operation of said repeat key switch said second control means commands said voice synthesis unit to issue voices in accordance with all dial inputs having been made until that time.

4. A road-vehicle telephone apparatus according to claim 1, wherein if a predetermined time has lapsed from the last dial input to the next dial input, said second control means commands said voice synthesis unit to issue voices in accordance with all dial inputs having been made until that time.

5. A road-vehicle telephone apparatus according to claim 1, wherein said steering operation board includes at least one acoustic-electric conversion means and a second modulation means adapted to modulate a signal from said acoustic-electric conversion means, said stationary control unit includes a second demodulation means adapted to demodulate a signal modulated by said second modulation means, and said second control means applies a signal output from said second demodulation means to said mobile telphone unit in accordance with the signal from said first demodulation means.

6. A road-vehicle telephone apparatus according to claim 5, wherein said signal transmission means is composed of plural slip rings and brushes in contact with said slip rings which are formed concentrically about a steering operation shaft, an output terminal of said first modulation means, an output terminal of said second modulation means, an input terminal of said first demodulation means and an input terminal of said second demodulation means are connected to a first set of slip ring and brush, and a road-vehicle battery is connected to a second set of slip ring and brush.

7. A road-vehicle telephone apparatus comprising:
   steering operation board composed of a dial key switch, a hook key switches, a first modulation means, and a first control means for applying a signal in accordance with key switch operation to said first modulation means, all these parts being equipped on or near a steering wheel;
   a stationary control unit composed of a first demodulation means adapted to demodulate the signal from said first modulation means, a mobile telephone unit, the other party data storing means adapted to store the data in accordance with dial codes, a voice synthesis means for generating voices in accordance with the data from said the other party data storing means, and a second control means which judges switch operation made on said steering operation board based on a signal demodulated by said first demodulation means, which produces the dial code and applies it to said mobile telephone unit, and which commands said voice synthesis means to generate voices in accordance with the corresponding dial code, said control unit being equipped at a fixed position on the vehicle body mechanically separated from said steering operation board; and
   a signal transmission means for connecting said steering operation board and said stationary control unit through at least one of electrical, optical and magnetic means.

8. A road-vehicle telephone appartus according to claim 7, wherein if a dial code entered via said switches is a shortened is a shortened dial code corresponding to a longer dial code, said second control means commands said voice synthesis means to generate voices in accordance with the the corresponding longer dial code.

9. A road-vehicle telephone apparatus according to claim 7, wherein said the other party data storing means is a write/read memory, and wherein said steering operation board includes at least one acoustic-electric conversion means for converting a voice signal to a corresponding electrical signal, and said second control means, in accordance with a predetermined switch operation, produces the data corresponding to a signal from said acoustic-electric conversion means and then memorizes the produced data into said the other party data storing means at a predetermined address.

10. A road-vehicle telephone apparatus according to claim 7, wherein said steering operation board includes at least one acoustic-electric conversion means and a second modulation means adapted to modulate a signal from said acoustic-electric conversion means, said stationary control unit includes a second demodulation means adapted to demodulate a signal modulated by said second modulation means, and said second control means, in accordance with the signal from said first demodulation means, produces the data corresponding to a signal output from said second demodulation means and then memorizes it into said the other party data storing means.

11. A road-vehicle telephone apparatus according to claim 10, wherein said second control means applies the signal output from said second demodulation means to said mobile telephone unit in accordance with the signal from said first modulation means.

12. A road-vehicle telephone apparatus according to claim 10, wherein said signal transmission means is composed of plural slip rings and brushes in contact with said slip rings which are formed concentrically about a steering operation shaft, an output terminal of said first modulation means, an output terminal of said second modulation means, an input terminal of said first demodulation means and an input terminal of said second demodulation means are connected to a first set of slip ring and brush, and a road-vehicle battery is connected to a second set of slip ring and brush.

13. A road-vehicle telephone apparatus comprising;
a steering operation board composed of a dial key switch, a hook key switch, a first modulation means, and a first control means for applying a signal in accordance with key switch operation to said first modulation means, all these parts being equipped on or near a steering wheel;
a stationary control unit composed of a first demodulation means adapted to demodulate the signal from said first modulation means, a mobile telephone unit, the other party data storing means adapted to store the other party's name data allocated to dial codes, a voice synthesis means, and a second control means which judges switch operation made on said steering operation board based on a signal demodulated by said first demodulation means, which produces a dial code and then commands said voice synthesis means to issue the name of the other party in voice in accordance with the produced dial code, which applies the dial code allocated to the name of the other party to said mobile telephone unit upon detecting the key operation to command calling of the other party, and which when there comes no key operation within a predetermined time or key operation other than the above is detected, reads out sequentially other data on the other party stored in said the other party's data storing means, then repeats such reading-out until there comes a predetermined key operation, and then upon detecting the key operation to command calling of the other party, applies the dial code allocated to the name of the other party which has been commanded to said voice synthesis means immediately before such detection, to said mobile telephone unit, said control unit being equipped at a fixed position on the vehicle body mechanically separated from said steering operation board; and
a signal transmission means for connecting said steering operation board and said stationary control unit through at least one of electrical, optical and magnetic means.

14. A road-vehicle telephone apparatus according to claim 13, wherein if the dial code is a shortened dial code corresponding to a longer dial code, said second conntrol means commands said voice synthesis means to generate voices in accordance with the corresponding longer dial code.

15. A road-vehicle telephone apparatus according to claim 14, wherein if there comes no key operation within a predetermined time or key operation than the predetermined one is detected, said second control means updates the value of the dial code into another value different from the former by one.

16. A road-vehicle telephone apparatus according to claim 13, wherein said the other party data storing means is a write/read memory, and wherein said steering operating board includes at least one acoustic-electric conversion means for converting a voice signal to a corresponding electrical signal, and said second control means, in accordance with the predetermined key operation, produces the data corresponding to a signal from said acoustic-electric conversion means and then memorizes the produced data into said the other party data storing means at a predetermined address.

17. A road-vehicle telephone apparatus according to claim 13, wherein said steering operation board includes at least one acoustic-electric conversion means and a second modulation means adapted to modulate a signal from said acoustic-electric conversion means, said stationary control unit includes a second demodulation means adapted to demodulate a signal modulated by said second modulation means, and said second control means, in accordance with the signal from said first demodulation means, produces the data corresponding to a signal output from said second demodulation means and then memorizes it into said the other party data storing means.

18. A road-vehicle telephone apparatus according to claim 17, wherein said second control means applies the signal output from said second demodulation means to said mobile telephone unit in accordance with the signal from said first modulation means.

19. A road-vehicle telephone apparatus according to claim 17, wherein said signal transmission means is composed of plural slip rings and brushes in contact with said slip rings which are formed concentrically about a steering operation shaft, an output terminal of said first modulation means, an output terminal of said second modulation means, an input terminal of said first demodulation means and an input terminal of said second demodulation means are connected to a first set of slip ring and brush, and a road-vehicle battery is connected to a second set of slip ring and brush.

20. A road-vehicle telephone apparatus comprising:
a steering operation board composed of a dial key switches, a hook key switch, a first modulation means, at least one acoustic-electric conversion means, a second modulation means adapted to modulate a signal from said acoustic-electric conversion means, and a first control means for applying a signal in accordance with key switch operation to said first modulation means, all these parts being equipped on or near a steering wheel;
a stationary control unit composed of a first demodulation means adapted to demodulate the signal from said first modulation means, a second demodulation means adapted to demodulate the signal from said second modulation means, a mobile telephone unit, the other party data storing means adapted to store the other party's name data allocated to dial codes, a voice synthesis means, and a second control means which judges switch operation made on said steering operation board based on a signal demodulated by said first demodulation means, which in accordance with the predetermined key operation produces the data corresponding to a signal output from said second demodulation means and then memorizes the produced data in said the other party data storing means, which produces a dial code in accordance with key operation and then commands said voice synthesis means to issue the name of the other party in voice in accordance with the produced dial code, which applies the dial code allocated to the name of the other party to said mobile telephone unit upon detecting the key operation to command calling of the other party, and which, when there comes no key operation within a predetermined time or key operation other than the above is detected, reads out sequentially other data on the other party stored in said the other party data storing means, then repeats such reading-out until there comes the predetermined key operation, and then upon detecting the key operation to command calling of the other party, applies the dial code allocated to the name of the other party which has been commanded to said voice synthesis means immediately before such detection, to said mobile telephone unit, thereby to apply the signal from said second demodulation means to said mobile telephone unit, said control unit being equipped at a fixed position on the vehicle body mechanically separated from said steering operation board; and a signal transmission means for connecting said steering operation board and said stationary control unit through at least one of electrical, optical and magnetic means.

* * * * *